US007889935B2

(12) United States Patent
Ishikawa et al.

(10) Patent No.: US 7,889,935 B2
(45) Date of Patent: Feb. 15, 2011

(54) DATA PROCESSING APPARATUS, IMAGE PROCESSING APPARATUS, AND METHOD THEREFOR

(75) Inventors: Hisashi Ishikawa, Chiba (JP); Ryoko Mise, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/430,735

(22) Filed: Apr. 27, 2009

(65) Prior Publication Data

US 2009/0202161 A1  Aug. 13, 2009

Related U.S. Application Data

(62) Division of application No. 11/826,215, filed on Jul. 13, 2007, now Pat. No. 7,822,296, which is a division of application No. 10/365,551, filed on Feb. 13, 2003, now Pat. No. 7,266,254.

(30) Foreign Application Priority Data

| Feb. 13, 2002 | (JP) | ............................. 2002-035434 |
| Jan. 10, 2003 | (JP) | ............................. 2003-004947 |
| Jan. 16, 2003 | (JP) | ............................. 2003-008573 |
| Jan. 16, 2003 | (JP) | ............................. 2003-008574 |

(51) Int. Cl.
*G06K 9/40* (2006.01)

(52) U.S. Cl. ....................... 382/233; 382/235; 382/236; 382/252

(58) Field of Classification Search ................. 382/235, 382/236, 252, 274, 275; 358/3.26, 3.27, 358/463

See application file for complete search history.

(56) References Cited

U.S. PATENT DOCUMENTS 5,146,592 A    9/1992  Pfeiffer et al.

(Continued)

FOREIGN PATENT DOCUMENTS

EP    0793390 A2    9/1997

(Continued)

OTHER PUBLICATIONS

Office Action dated Dec. 29, 2009 in U.S. Appl. No. 11/826,215.

(Continued)

*Primary Examiner*—Yosef Kassa
(74) *Attorney, Agent, or Firm*—Fitzpatrick, Cella, Harper & Scinto

(57) ABSTRACT

There are provided a data processing apparatus which makes an I/F for data processing modules (processors) versatile to facilitate addition/modification on a data processing module basis in accordance with processing contents, an image processing apparatus, and a method for the apparatuses. A data processing module (3) includes a read address generator (11), read FIFO (7), write address generator (13), write FIFO (9), and arbiter (10) and is connected to a host arbiter (4) through a 1-channel port. The read address generator (11) and write address generator (13) generate interrupts upon acceptance of final access requests so as to control activation of each data processing module (8-1-8-m) in accordance with the state of each data processing module in interrupt processing. Note that data transfer among the respective data processing modules is performed on a RAM (6).

3 Claims, 42 Drawing Sheets

U.S. PATENT DOCUMENTS

| | | |
|---|---|---|
| 5,359,437 A | 10/1994 | Hibi |
| 5,392,390 A | 2/1995 | Crozier |
| 5,847,836 A | 12/1998 | Suzuki |
| 5,872,577 A | 2/1999 | Perrin |
| 5,887,079 A | 3/1999 | Endo et al. |
| 5,920,343 A | 7/1999 | Watanabe et al. |
| 5,974,238 A | 10/1999 | Chase, Jr. |
| 6,188,440 B1 | 2/2001 | Toujima et al. |
| 6,188,693 B1 | 2/2001 | Murakami |
| 6,198,848 B1 | 3/2001 | Honma et al. |
| 6,233,361 B1 | 5/2001 | Downs |
| 6,331,902 B1 | 12/2001 | Lin |
| 6,424,385 B1 | 7/2002 | Koyama et al. |
| 6,429,415 B1 | 8/2002 | Rhoads |
| 6,493,878 B1 | 12/2002 | Kassatly |
| 6,529,642 B1 | 3/2003 | Lai et al. |
| 6,563,960 B1 | 5/2003 | Chan et al. |
| 6,614,914 B1 | 9/2003 | Rhoads et al. |
| 6,618,117 B2 | 9/2003 | Silverbrook |
| 6,618,185 B2 | 9/2003 | Sandstrom |
| 6,629,161 B2 | 9/2003 | Matsuki et al. |
| 6,640,019 B2 | 10/2003 | Kosugi et al. |
| 6,671,418 B2 | 12/2003 | Rengakuji et al. |
| 6,803,953 B2 | 10/2004 | Wada |
| 6,813,062 B2 | 11/2004 | Sandstrom |
| 6,915,014 B1 | 7/2005 | Honma et al. |
| 6,930,798 B1 | 8/2005 | Kaneko |
| 7,027,054 B1 * | 4/2006 | Cheiky et al. ............... 345/473 |
| 7,092,965 B2 * | 8/2006 | Easwar ............................. 1/1 |
| 7,106,366 B2 * | 9/2006 | Parker et al. ............. 348/222.1 |
| 7,128,270 B2 * | 10/2006 | Silverbrook et al. ... 235/472.01 |
| 7,295,334 B2 | 11/2007 | Hashimoto et al. |
| 2002/0089680 A1 | 7/2002 | Ishikawa |
| 2003/0107577 A1 | 6/2003 | Obara et al. |

FOREIGN PATENT DOCUMENTS

| | | |
|---|---|---|
| EP | 1081602 A1 | 3/2001 |
| JP | 63263573 A | 10/1988 |
| JP | 4317259 A | 11/1992 |
| JP | 9116660 A | 5/1997 |
| JP | 11-168610 A | 6/1999 |
| JP | 2000-138777 A | 5/2000 |
| JP | 2000-181648 | 6/2000 |
| JP | 2001-028662 A | 1/2001 |
| JP | 2001-109656 A | 4/2001 |
| JP | 2001-283211 A | 10/2001 |
| JP | 2001-312457 A | 11/2001 |
| JP | 2001-338286 | 12/2001 |
| JP | 2002-010277 | 1/2002 |

OTHER PUBLICATIONS

Office Action dated Aug. 28, 2009 in U.S. Appl. No. 12/430,014.

* cited by examiner

F I G. 7
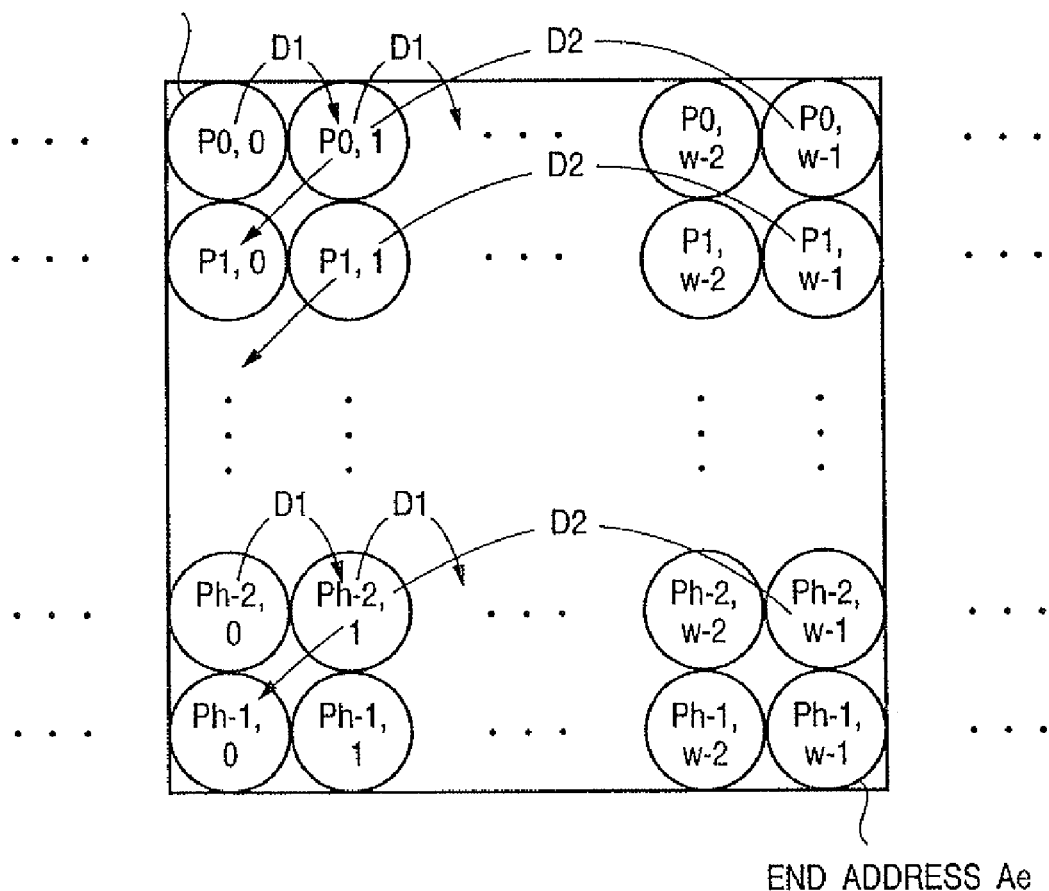

FIG. 25
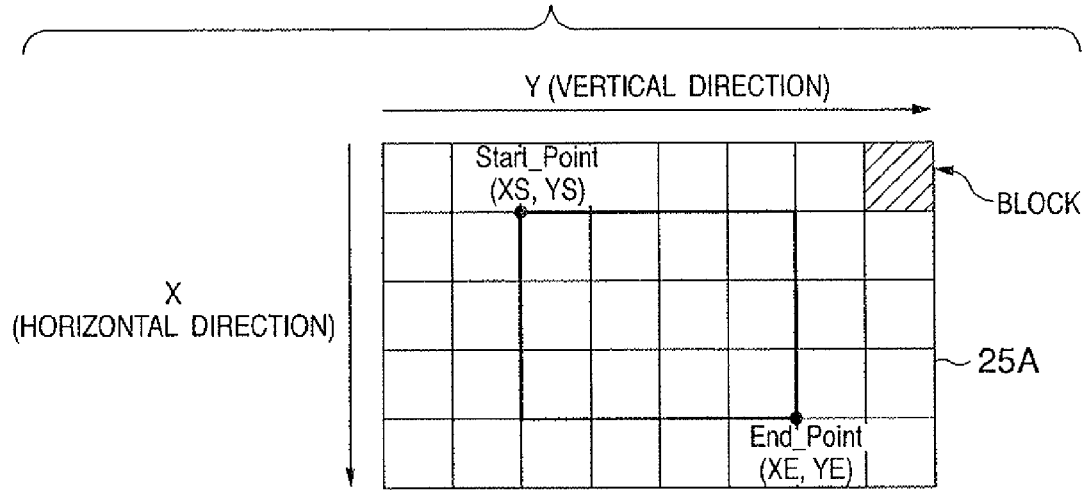
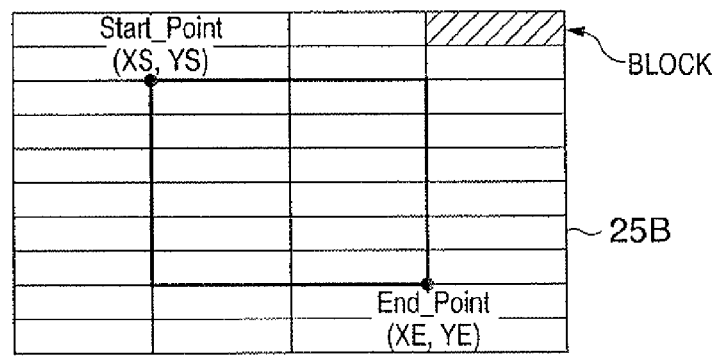
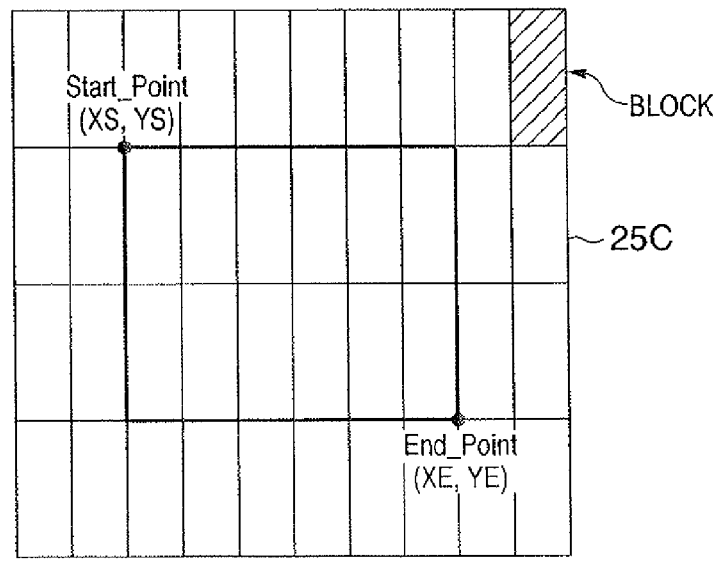

FIG. 29

| X\W | 0 α | 0 1-α | 1 α | 1 1-α | 2 α | 2 1-α | 3 α | 3 1-α | 4 α | 4 1-α | 5 α | 5 1-α | 6 α | 6 1-α | 7 α | 7 1-α |
|---|---|---|---|---|---|---|---|---|---|---|---|---|---|---|---|---|
| 7 | 256 | 0 | 219 | 0 | 183 | 73 | 146 | 110 | 110 | 146 | 73 | 183 | 37 | 219 | 0 | 256 |
| 6 | 256 | 0 | 171 | 0 | 85 | 171 | 0 | 256 | 256 | 0 | 171 | 85 | 85 | 171 | 0 | 256 |
| 5 | 256 | 0 | 102 | 0 | 205 | 51 | 205 | 51 | 51 | 205 | 51 | 205 | 154 | 102 | 0 | 256 |
| 4 | 256 | 0 | 256 | 0 | 256 | 0 | 256 | 0 | 256 | 0 | 256 | 0 | 256 | 0 | 256 | 0 |
| 3 | 256 | 0 | 171 | 0 | 85 | 171 | 0 | 256 | 256 | 0 | 171 | 85 | 85 | 171 | 0 | 256 |
| 2 | 256 | 0 | 256 | 0 | 256 | 0 | 256 | 0 | 256 | 0 | 256 | 0 | 256 | 0 | 256 | 0 |
| 1 | 256 | 0 | 256 | 0 | 256 | 0 | 256 | 0 | 256 | 0 | 256 | 0 | 256 | 0 | 256 | 0 |

| 00 | 01 | 02 | 03 | 04 | 05 | 06 |
|----|----|----|----|----|----|----|
| 10 | 11 | 12 | 13 | 14 | 15 | 16 |
| 20 | 21 | 22 | 23 | 24 | 25 | 26 |
| 30 | 31 | 32 | 33 | 34 | 35 | 36 |
| 40 | 41 | 42 | 43 | 44 | 45 | 46 |
| 50 | 51 | 52 | 53 | 54 | 55 | 56 |
| 60 | 61 | 62 | 63 | 64 | 65 | 66 |

37B

| 00 | 01 | 02 | 04 | 05 | 06 |
|----|----|----|----|----|----|
| 10 | 11 | 12 | 14 | 15 | 16 |
| 20 | 21 | 22 | 24 | 25 | 26 |
| 40 | 41 | 42 | 44 | 45 | 46 |
| 50 | 51 | 52 | 54 | 55 | 56 |
| 60 | 61 | 62 | 64 | 65 | 66 |

37C

| 00 | 01 | 03 | 04 | 06 |
|----|----|----|----|----|
| 10 | 11 | 13 | 14 | 16 |
| 30 | 31 | 33 | 34 | 36 |
| 40 | 41 | 43 | 44 | 46 |
| 60 | 61 | 63 | 64 | 66 |

37D

| 00 | 01 | 02 | 03 | 04 | 05 | 06 | 07 |
|----|----|----|----|----|----|----|----|
| 10 | 11 | 12 | 13 | 14 | 15 | 16 | 17 |
| 20 | 21 | 22 | 23 | 24 | 25 | 26 | 27 |
| 30 | 31 | 32 | 33 | 34 | 35 | 36 | 37 |
| 40 | 41 | 42 | 43 | 44 | 45 | 46 | 47 |
| 50 | 51 | 52 | 53 | 54 | 55 | 56 | 57 |
| 60 | 61 | 62 | 63 | 64 | 65 | 66 | 67 |
| 70 | 71 | 72 | 73 | 74 | 75 | 76 | 77 |

37E

| 00 | 01 | 02 | 03 | 04 | 05 | 06 | 07 |
|----|----|----|----|----|----|----|----|
| 10 | 11 | 12 | 13 | 14 | 15 | 16 | 17 |
| 20 | 21 | 22 | 23 | 24 | 25 | 26 | 27 |
| 30 | 31 | 32 | 33 | 34 | 35 | 36 | 37 |
| 40 | 41 | 42 | 43 | 44 | 45 | 46 | 47 |
| 50 | 51 | 52 | 53 | 54 | 55 | 56 | 57 |
| 60 | 61 | 62 | 63 | 64 | 65 | 66 | 67 |
| 70 | 71 | 72 | 73 | 74 | 75 | 76 | 77 |

37F

| 00 | 01 | 02 | 03 | 04 | 05 | 06 | 07 |
|----|----|----|----|----|----|----|----|
| 10 | 11 | 12 | 13 | 14 | 15 | 16 | 17 |
| 20 | 21 | 22 | 23 | 24 | 25 | 26 | 27 |
| 30 | 31 | 32 | 33 | 34 | 35 | 36 | 37 |
| 40 | 41 | 42 | 43 | 44 | 45 | 46 | 47 |
| 50 | 51 | 52 | 53 | 54 | 55 | 56 | 57 |
| 60 | 61 | 62 | 63 | 64 | 65 | 66 | 67 |
| 70 | 71 | 72 | 73 | 74 | 75 | 76 | 77 |

DATA PROCESSING APPARATUS, IMAGE PROCESSING APPARATUS, AND METHOD THEREFOR

This application is a division of U.S. patent application Ser. No. 11/826,215, filed on Jul. 13, 2007 (pending), which is a division of application Ser. No. 10/365,551, filed on Feb. 13, 2003 (now U.S. Pat. No. 7,266,254), the contents of which are incorporated by reference herein.

FIELD OF THE INVENTION

The present invention relates to a data processing apparatus which performs data processing by exchanging data through a memory, an image processing apparatus, and a method for these apparatuses.

BACKGROUND OF THE INVENTION

In general, a processor can access a memory through a memory interface to read out data to be processed or write processed data. This processor generates an internal address for the memory interface, and the memory interface generates appropriate control signals for accessing data corresponding to the internal address. These control signals activate a specific memory cell corresponding to the internal address.

Assume that the processor has a 23-bit internal address A[22:0]. The memory interface generates, for a DRAM type memory, a page number from A[22:12], a bank selection signal from A[11:10], a column number from A[9:2], and a word selection signal from A[1:0]. The memory interface generates, for an SRAM type memory, an SRAM address signal from A[22:2] and a word selection signal from lower 2-bit data A[1:0].

In contrast to the above memory interface, the processor always uses the same communication mode and internal address independently of the memory type to be used, e.g., a DRAM or SRAM. A data processing method executed in cooperation with a memory has been conventionally known (see, for example, European Patent Laid-Open No. 793390).

There is also disclosed a data processing apparatus (see, for example, Japanese Patent Laid-Open No. 2001-109656) which includes, in order to facilitate the design of a data processing apparatus which operates in cooperation with a memory, a plurality of processors for generating logical requests, a plurality of address processing circuits for generating macro commands as physical requests on the basis of the logical requests, an arbiter which receives a plurality of macro commands and selects one of the macro commands in accordance with an arbitration scheme, and an access interface for establishing access so as to specify part of the memory and its address by processing the plurality of macro commands in the order in which they are selected by the arbiter. According to this method, since access to the memory is made by converting a logical request from a processor into a physical request by using an address processing circuit, the processor is free from the influences of an access method and storage method for the memory. This improves the portability (versatility) of each processor.

According to the method disclosed in Japanese Patent Laid-Open No. 2001-109656, however, since data read/write addresses are generated by one functional block, the processor side must control to avoid read/write contention, resulting in complicated control. In addition, a plurality of data processing modules (processors) cannot be pipelined, and data must always be transferred through the memory interface. Furthermore, since a buffer memory is provided on the memory interface and shared among a plurality of processors, it is difficult to optimize the buffer memory.

If the number of data processing modules (processors) increases, not only the arbiter must be modified, but also a control circuit and buffer memory must be added, resulting in difficulty in making a modification. When a module that needs to simultaneously acquire a plurality of (discontinuous) data, e.g., a resizing or filter module, is to be added, the above address generating circuit as well as the buffer memory becomes complicated.

In order to obtain a good image output when image data taken by a digital camera or the like is output by a printer, various types of image processing are generally required. FIG. 22 is a block diagram showing the arrangement of a conventional image processor which performs image processing when image data taken by a digital camera is to be output by a printer.

First of all, a JPEG decoder 201 decodes JPEG image data (data taken by the digital camera) input from an input unit 200. The decoded data are output in the order of Y, Cr, and Cb blocks and hence temporarily stored in an MCU buffer 203. A pixel sequential unit 202 then reads out these data as pixel sequential YCrCb data. If Cr and Cb color difference data are sub-sampled, they are output after being interpolated at the read time. The pixel sequential image data are output in MCU order and hence temporarily stored in an MCU line buffer 205. A rasterizing unit 204 then reads them out as rasterized YCrCb data. The rasterized image data are subjected to color adjustment such as white balance adjustment in a color adjustment unit 206 and contrast adjustment in a contrast adjustment unit 207. The resultant data are converted into kGB data by an RGB converter 208.

If the orientation of printing differs from that of an image, orientation matching is made by a rotating unit 209 using a frame buffer 210. For an image with noticeable noise, noise reduction processing is performed by a noise reducer 211. At this time, a line interface unit 233 is used to refer to neighboring pixel data.

A resizing unit 212 then resizes the image into an image having a size matched with a printing resolution. At this time, a line buffer 213 is used to refer to neighboring pixel data. A clipping unit 214 removes (trims) a portion that is unnecessary to be output from the resized image data. In addition, in order to save the capacity of a page memory, data in an effective band area is extracted in band processing in which part of a page is sequentially cut out on a band and processed.

A background compositing unit 215 composites background data with the clipped image data. A frame compositing unit 217 composites frame data with the image data. The resultant data is stored in a band buffer 219. When an image having small images tiled is to be used as background data, a tiling unit 216 is used to repeatedly reading out the background data in the horizontal and vertical directions. The resultant data is used. When the frame data needs to be resized in accordance with various paper sizes and layouts, the frame data is resized by a resizing unit 218 before composited with image data. At this time, a line buffer 220 is used to refer to neighboring pixel data.

The print image data stored in the band buffer 219 is converted into a density linear signal by an input γ converter 221. This signal is converted into color material data (output device color) of the printer by a color converter 222. This data is subjected to output γ correction in an output γ converter 223. The resultant data is converted into bitmap data (dot pattern) by a halftone processor 224. In this case, if an error diffusion method is used for halftone processing of the image data, a line buffer 225 is used to diffuse a quantization error into neighboring pixels. The bitmap data is temporarily stored in a band buffer 226.

When a print engine (not shown) is started, an H-V converter 228 reads out the bitmap data from the band buffer 226 in accordance with the arrangement of the dot constituent elements (e.g., nozzles in an ink-jet scheme) of the head in synchronism with a sync signal from the print engine, and stores the data in a block buffer 230. In general, since bitmap data is stored in the band buffer 226 with a plurality of dots in the scan direction of the head being one word, data in the dot constituent element array (nozzle array) direction of the head is extracted. In addition, a registration unit 229 shifts the positions of bits simultaneously read out for each dot constituent element array (nozzle array) of the head, thereby performing registration.

When a print image is to be formed in a plurality of passes (scans of the head) to reduce streaks and unevenness at the time of printout, a pass divider 231 distributes the output dots of the bitmap data to a plurality of passes in accordance with the mask signal generated by a mask generator 232. The divided dot data are converted into a transmission format for the head by a line interface unit 233, and output to the head by an output unit 234.

When complicated processing like that described above is to be performed, the respective types of processing are implemented into modules to facilitate development and maintenance. For example, an image processing method is disclosed (see, for example, Japanese Patent Laid-Open No. 9-116660), in which each type of image processing is implemented into a module, and the respective modules are connected to each other through buffer memories, thereby facilitating updating.

The method disclosed in Japanese Patent Laid-Open No. 9-116660 has a drawback that many buffer memories are required in proportion to the number of image processing modules. In addition, an enormous local memory is required to cope with an arbitrary image size. For example, the line buffers 205 and 213 and frame buffer 210 in FIG. 22 depend on the input image size, and the band buffers 219 and 226 and line buffer 225 depend on the output size (e.g., the paper size, output resolution, and band height). In order to match these buffers with image data having various sizes, a buffer memory capacity corresponding to the maximum size must be estimated.

The necessary image processing contents differ depending on each output image. If, for example, the orientation of printing coincides with the orientation of an input image, no rotation processing is required. In addition, if there are no background, frame, and the like, no compositing processing is required. In such a case, in the prior art, unnecessary processing is performed by making parameter setting for nothing in effect, e.g., performing 0° rotation and setting an α value for opaque.

According to the method disclosed in Japanese Patent Laid-Open No. 9-116660, it is impossible to replace some function after the completion of hardware. Assume that a specification change has occurred in an RGB conversion module. In this case, if the above series of processing modules is implemented by hardware, it is impossible to replace only the RGB conversion module with another processing (software processing). As a consequence, the series of processing modules including the RGB conversion module is wasted. If a critical defect is caused in some module, all the associated processing modules become unusable.

In a conventional image processing apparatus designed to generate desired data by performing image processing such as clipping processing, resizing processing, and rotation processing with respect to blocked image data, each image processing operation is performed after the input blocked image data is rasterized.

According to the conventional image processing method, however, since image processing is performed after rasterization, it takes much time to perform overall image processing, and many memories for processing which are required for image processing must be mounted in the image processing apparatus. In addition, when permutation processing such as rotation is to be performed, the conventional method requires a buffer for permutation processing. If permutation is executed by using write addresses in order to omit the buffer for permutation processing, since the addresses do not become continuous, a burst mode cannot be used. This increases the access time.

SUMMARY OF THE INVENTION

The present invention has been proposed to solve the conventional problems, and has as its object to provide a data processing apparatus which can facilitate addition/modification on a data processing module (processor) basis by making an I/F for each data processing module versatile, and a method for the apparatus.

In order to solve the above problems, a data processing apparatus according to the present invention is comprising:
storage means for storing data;
a plurality of data processing means for performing a series of processing of reading out the data from the storage means, performing data processing, and writing the processed data in the storage means;
activation control means for activating predetermined data processing means of the plurality of data processing means; and
access control means for controlling access of the activated predetermined data processing means to the storage means.

In addition, according to the present invention, in order to solve the above problems, it is an object to provide an image processing apparatus, in which each type of image processing for input image is divided into a plurality of processing blocks, each processing block is formed into a module, and data transfer among the respective modules is performed through a shared memory, thereby making an I/F for each image processing module versatile, facilitating addition/modification on an image processing module basis, and reducing unnecessary buffers, memories, and processing, and a method for the apparatus.

In order to solve the above problems, an image processing apparatus according to the present invention is comprising:
storage means for storing image data;
a plurality of image processing means for performing a series of processing of reading out the image data from the storage means, performing predetermined image processing, and writing the processed image data in the storage means;
activation control means for activating predetermined image processing means of the plurality of image processing means; and
access control means for controlling access of the activated predetermined image processing means to the storage means, wherein
each of the image processing means comprises
first address generating means for generating an address for reading out image data from the storage means,
first data holding means for storing the image data read out from the storage means in correspondence with the address,
at least one second image processing means for processing the image data, second data holding means for storing output data processed by the second image processing means on a last stage, second address generating means for generating an address for writing the output data in the storage means, and second access control means for giving the access control means a request to access the storage means when image data can be stored in the first data holding means or output data can be output from the second data holding means.

In addition, the image processing apparatus is wherein a buffer dependent on an image size is formed on the storage means.

It is another object of the present invention to provide an image processing apparatus which can increase the image processing speed with respect to overall image data in executing image processing for blocked image data, and reduce the capacity of a memory required for image processing, and a method for the apparatus.

In order to solve the above problems, according to the present invention, there is provided an image processing apparatus comprising image processing means for executing image processing for blocked image data for each predetermined block, further comprising execution information input means for inputting execution information for determining whether to execute image processing for each block of the image data, and determination means for determining, by using the execution information, whether to execute image processing for the image data for each block, wherein the image processing means executes image processing for a block of the image data for which it is determined that image processing is to be executed.

In addition, the image processing apparatus according to the present invention is further comprising rasterization means for rasterizing the blocked image data, and resizing means for reducing a block size, wherein rasterization is performed after the block size is reduced.

Furthermore, the image processing apparatus according to the present invention is further comprising a buffer for converting a block sequential signal into a pixel sequential signal, wherein rotation processing in a block is performed by the buffer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a view for explaining parameters in an address generator according to the first embodiment of the present invention;

FIG. 25 is a schematic view for explaining clipping processing executed by a clipping unit 321-1;

FIG. 29 is a view showing interpolation coefficients at the respective sampling points in FIG. 37;

FIG. 37 is a view showing in detail sampling points after MCU reduction;

DETAILED DESCRIPTION OF THE PREFERRED EMBODIMENTS

Preferred embodiments of the present invention will now be described in detail in accordance with the accompanying drawings.

Embodiments of the present invention will be described below. Obviously, the following embodiments are disclosed to allow those skilled in the art to easily practice the present invention, and merely part of the embodiments included in the technical range of the present invention which is defined by the scope of the appended claims. It is therefore apparent to those skilled in the art that even embodiments that are not directly described in this specification are incorporated in the technical range of the present invention as long as they are common in technical idea to the embodiments described in the specification.

A plurality of embodiments will be described below for the sake of convenience. It is, however, obvious to those skilled in the art that these embodiments can be individually realized as inventions and proper combinations of a plurality of embodiments can be realized as inventions.

First Embodiment

Figure 1:
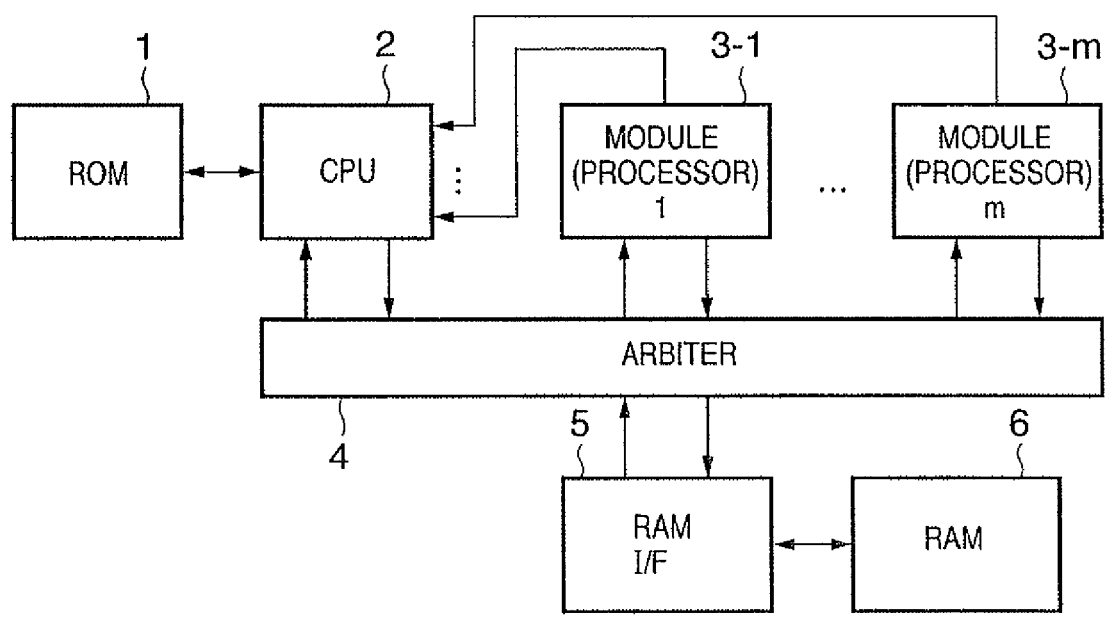
FIG. 1 is a block diagram showing an example of the arrangement of a data processing apparatus according to the first embodiment of the present invention.

The first embodiment of the present invention will be described in detail below with reference to the accompanying drawings. FIG. 1 is a block diagram showing an example of the arrangement of a data processing apparatus according to the first embodiment of the present invention.

Referring to FIG. 1, reference numeral 1 denotes a ROM storing programs and the like; 2, a CPU for controlling the data processing apparatus; 3-1 to 3-*m* (m is an integer equal to or more than 1), m data processing modules (processors); 6, a RAM; 4, an arbiter for arbitrating access to the RAM 6 between data processing modules 3-1 to 3-*m*; and 5, a RAN interface unit 5. Although the RAN 6 in this embodiment is shared by the CPU 2 and the respective data processing modules 3-1 to 3-*m*, the CPU 2 may have another RAM.

The processing operation of the data processing apparatus having the above arrangement will be described next.

The CPU 2 receives data to be processed through an I/O or the like (not shown) in accordance with a program stored in the ROM 1, and stores the data in the RAM 6 through the arbiter 4 and RAM interface unit 5. The CPU 2 then sets a configuration register in the data processing module 3-1 to activate it.

When the data processing module 3-1 executes predetermined processing and finishes reading out data to be processed which is set in the above configuration register or finishes writing processed data which is set in the configuration register, the module generates an interrupt and sends it to the CPU 2. Upon reception of the interrupt, the CPU 2 analyzes an interrupt cause. If the data processing module 3-1 has finished reading out data to be processed, the CPU 2 sets data to be processed next, and causes the data processing module 3-1 to continue processing. If the data processing module 3-1 has finished writing the processed data, the CPU 2 sets the storage location of the next processed data, and causes the data processing module 3-1 to continue processing. In addition, the CPU 2 sets a configuration register in the next data processing module 3-2 to activate the next data processing module 3-2.

The data processing module 3-2 executes predetermined processing. When the data to be processed which is set in the above configuration register is completely read out or the processed data which is set in the configuration register is completely written, the data processing module 3-2 generates an interrupt and sends it to the CPU 2. Upon reception of the interrupt, the CPU 2 analyzes an interrupt cause. If the data processing module 3-2 has finished reading out data to be processed, the CPU 2 sets data to be processed next and causes the data processing module 3-2 to continue the processing. If the data processing module 3-2 has finished writing the processed data, the CPU 2 sets the storage location of the next processed data and causes the data processing module 3-2 to continue the processing. In addition, the CPU 2 sets the configuration register in the next data processing module 3-3 to activate it.

As described above, in this data processing apparatus, each data processing module is activated immediately after the preceding processing is finished to realize pipeline processing on a data processing module basis.

That is, the data processing apparatus according to this embodiment is characterized by including a storage means (e.g. the RAM 6) for storing data, a plurality of data processing means (e.g., the data processing modules 3-1 to 3-*m*) for performing a series of processing of reading out data from the storage means, performing data processing, and then writing the data in the storage means after the processing, an activation control means (e.g., the CPU 2) for activating a predetermined data processing means of the plurality of data processing means, and an access control means (e.g., the arbiter 4) for controlling access of the activated predetermined data processing means to the storage means.

The data processing apparatus is also characterized in that when a read of data from the storage means is finished or a write of data in the storage means is finished, an interrupt request signal is output, and the activation control means activates the next data processing means on the basis of the interrupt request signal.

Figure 2:
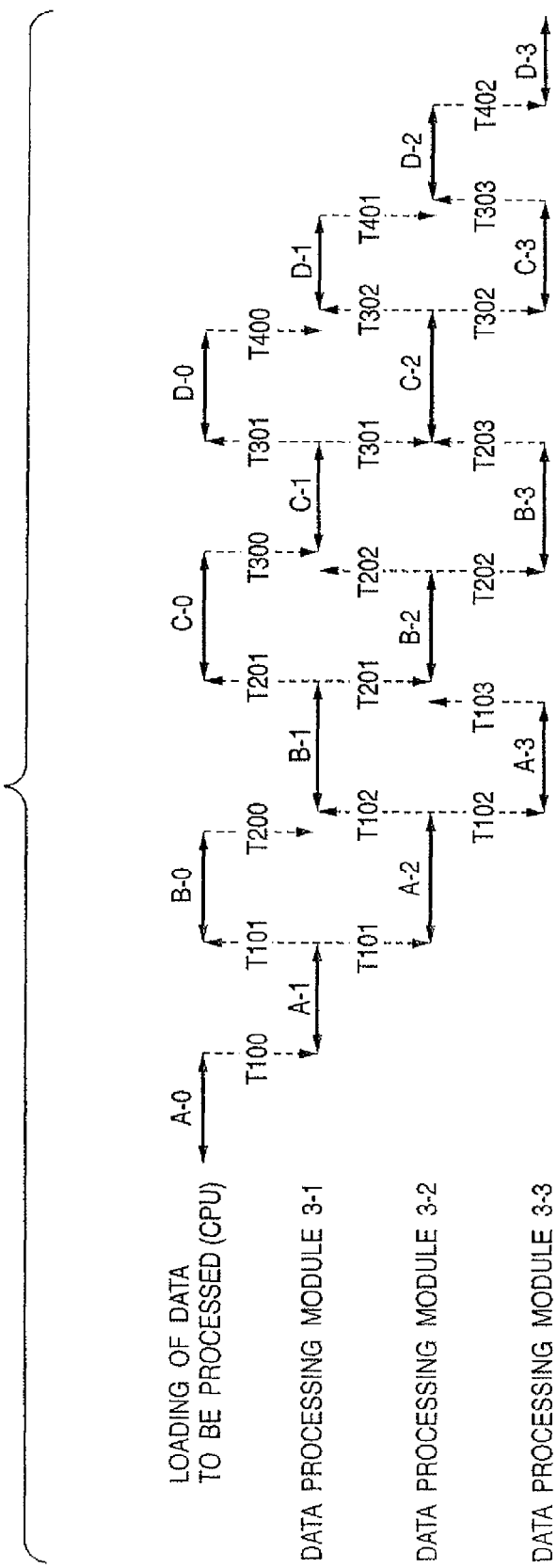
FIG. 2 is a view for explaining a flow of operation of the data processing apparatus according to the first embodiment of the present invention.

FIG. 2 is a view for explaining the flow of operation of the data processing apparatus according to the first embodiment of the present invention. Referring to FIG. 2, first of all, the CPU 2 starts loading data A. When loading of the data A is finished (T100), the CPU 2 causes the data processing module 3-1 to start processing. When the processing module 3-1 is finished (T101), the CPU 2 causes the data processing module 3-2 to start processing, and starts loading data B. Upon finishing loading the data B (T200), the CPU 2 checks whether the processing by the data processing module 3-2 is finished. If the processing by the data processing module 3-2 is finished (T102), the CPU 2 causes the data processing module 3-1 to start processing the data B. The CPU 2 also causes the data processing module 3-3 to start processing the data A.

In this manner, when loading of given data (e.g., loading of the data B) is finished, the CPU 2 checks whether processing in a data processing module (e.g., the data processing module 3-2) that is two modules ahead of the current module is finished. If the processing in this data processing module is finished, the CPU 2 causes the next data processing module (e.g., the data processing module 3-1) to start processing the data (e.g., the data B) loaded therein. The CPU 2 also checks whether processing (e.g., processing of the data B) in the immediately preceding data processing module (e.g., the data processing module 3-1) is finished. If this processing in this data processing module is finished, the CPU 2 causes the next data processing module (e.g., the data processing module 3-2) to start processing the data (e.g., the data B). The overall processing is completed by repeating the above processing until processing of all the data is finished.

In the above case, the area where data is to be loaded and the data storage area after processing by each data processing module in the RAM 6 are fixed. For this reason, in order to maintain the coherency of data, processing of new data must be started after the end of processing by the next data processing module. In an arrangement in which a data storage area is sequentially updated after processing by each data processing module, e.g., an arrangement like a ring buffer having a capacitor twice the capacitor required for one process, since the coherency of data can be ensured, pipeline processing of data which is efficient data processing like that shown in FIG. 3 can be realized.

Figure 3:
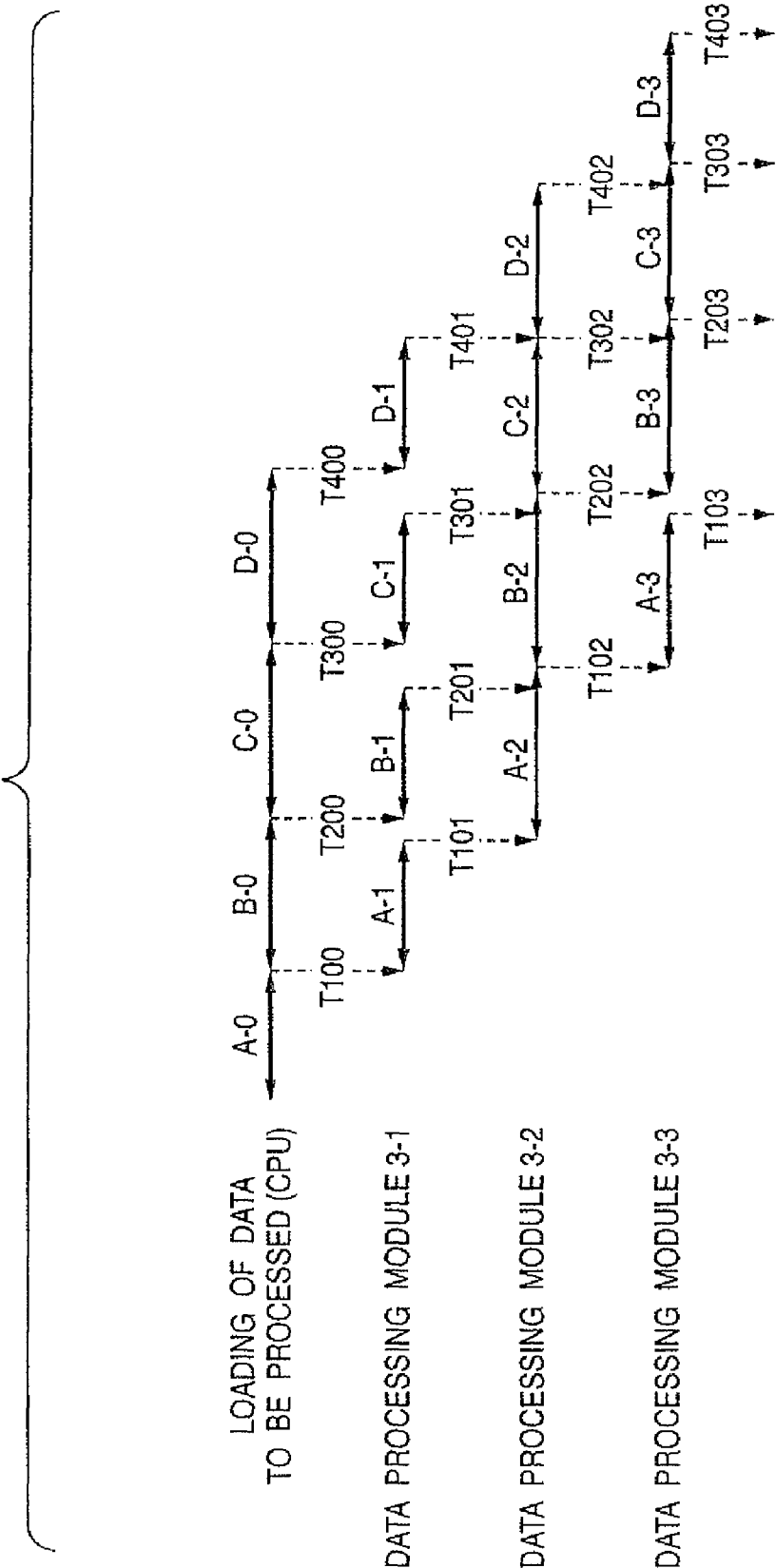
FIG. 3 is a view for explaining another flow of operation of the data processing apparatus according to the first embodiment of the present invention.

FIG. 3 is a view for explaining the flow of another operation in the data processing apparatus according to the first embodiment of the present invention.

First of all, the CPU 2 starts loading the data A. When loading of the data A is finished (T100), the CPU 2 causes the data processing module 3-1 to start processing, and starts loading the data B. When the processing by the data processing module 3-1 is finished (T101), the CPU 2 causes the next data processing module 3-2 to start processing. In this case, if loading of the data B has been finished (T200), the CPU 2 causes the data processing module 3-1 to start processing the next data, and starts loading data C. In contrast to this, if loading of the data B has not been finished, the CPU 2 waits until loading of the data B is finished. After loading of the data B is finished, the CPU 2 causes the data processing module 3-1 to start processing the next data, and starts loading the data C.

When the processing by the data processing module 3-2 is finished (T102), the CPU 2 causes the data processing module 3-3 to start processing. In this case, if the processing by the 3-1 has been finished (T201), the CPU 2 causes the data processing module 3-2 to start processing the next data. In contrast to this, if the processing by the data processing module 3-1 has not been finished, the CPU 2 waits until the processing by the data processing module 3-2 is finished. After the processing by the data processing module 3-1 is finished, the CPU 2 causes the data processing module 3-2 to start processing the next data.

In this manner, when processing (e.g., processing of the data B) in a given data processing module (e.g., the data processing module 3-2) is finished, the CPU 2 checks whether data processing in each of consecutive data processing modules (e.g., the processing modules 3-1 and 3-3) located before and after the given processing module) is finished. If the processing (e.g., processing of the data C) by the immediately preceding data processing module (e.g., the data processing module 3-1) is finished, the data processing module (e.g., the data processing module 3-1) starts processing the next data (e.g., the data C). If the processing (e.g., processing of the data A) by the immediately succeeding data processing module (e.g., the data processing module 3-3) is finished, the CPU 2 causes the immediately succeeding data processing module to start processing (e.g., processing of the data B). The overall processing is completed by repeating the above processing until processing of all the data is finished.

If, therefore, the processing times in the respective data processing modules are almost equal, the waiting time in each data processing module becomes almost zero, thus realizing very efficient data processing.

Figure 4:
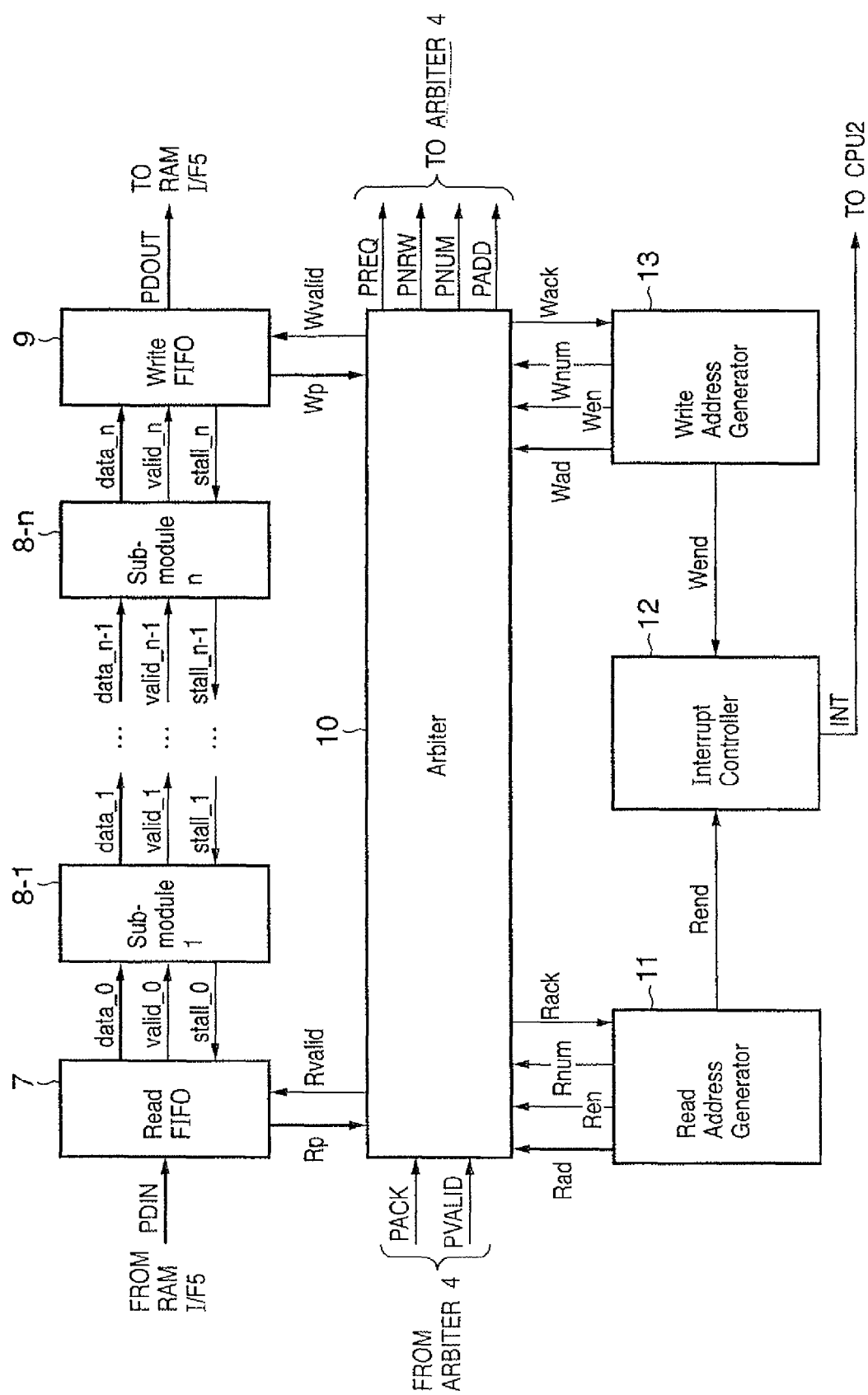
FIG. 4 is a block diagram for explaining the detailed internal arrangement of each of data processing modules 3-1 to 3-m in the data processing apparatus according to the first embodiment of the present invention.

FIG. 4 is a block diagram for explaining the detailed internal arrangement of each of the data processing modules 3-1 to 3-m (to be referred to as a "module 3" hereinafter) in the data processing apparatus according to the first embodiment of the present invention. Referring to FIG. 4, reference numeral 7 denotes a read FIFO; 8-1 to 8-n (n is an integer equal to or more than 1), sub-modules; 9, a write FIFO; 10, an arbiter; 11, a read address generator; 12, an interrupt controller; and 13, a write address generator.

The CPU 2 sets a read start address, read end address, and read enable signal Ren in the read address generator 11 by setting a configuration register in the module 3. The CPU 2 also sets a write start address, write end address, and write enable signal Wen in the read address generator 11.

The arbiter 10 in the module 3 detects a free space Rp in the buffer of the read FIFO 7 and the read enable signal Ren from the read address generator 11. If the read address is valid (Ren=1), and data can be stored in the read FIFO 7 (Rp≧Rnum), the CPU 2 issues a read request (PREQ=1, PNRW=0, PNUM=Rnum, PADD=Rad) to the arbiter 4.

When a data storage count Wp of the write FIFO 9 becomes equal to or more than a predetermined word count (Wp≧Wnum), the arbiter 10 detects the write enable signal Wen from the write address generator 13. If the write address is valid (Wen=1), and data can be output from the write FIFO 9 (Wp≧Wnum), the CPU 2 issues a write request (PREQ=1, PNRW=1, PNUM=Wnum, PADD=Wad) to the arbiter 4.

Upon reception of a request signal PREQ from the module 3, the arbiter 4 in the data processing apparatus discriminates a read/write with PNRW, and detects a word count with PNUM, and an address with PADD. If there is no request from the CPU 2 and other modules, the arbiter 4 starts accessing the corresponding data in the RAM 6 through the RAM interface unit 5. Upon acceptance of a request, the arbiter 4 returns an acknowledgement signal PACK to the module 3 as the request source. If requests are generated by the CPU 2 and other modules, the arbiter 4 accepts the requests in priority order.

Upon reception of the acknowledgement signal PACK from the arbiter 4, the arbiter 10 returns an acknowledgement signal Rack to the read address generator 11 as the request source if the request signal is a read request. Upon reception of the acknowledgement signal Rack, the read address generator 11 generates the next address. If the request address is the read end address, the read address generator 11 resets the read enable signal Ren, and outputs a read end signal Rend to the interrupt controller 12.

If the request signal is a write request, the arbiter 10 returns an acknowledgement signal Wack to the write address generator 13 as the request source. Upon reception of the acknowledgement signal Wack, the write address generator 13 generates the next address. If the request address is the write end address, the write address generator 13 resets the write enable signal Wen and outputs a write end signal Wend to the interrupt controller 12.

The interrupt controller 12 can set a read end interrupt mask and write end interrupt mask by using the above configuration register. If each interrupt mask is set to interrupt enable, the interrupt controller 12 generates an interrupt signal INT by using the read end signal Rend and write end signal Wend, and sends it to the CPU 2. Upon reception of the interrupt signal INT, the CPU 2 reads the status of the interrupt controller 12. If the interrupt cause is a read end, the CPU 2 resets the read end interrupt mask to cancel the interrupt. When the processing is to be continued, the CPU 2 sets a read start address and read end address again, and sets a read enable signal. After such processing, the CPU 2 sets the above read end interrupt mask.

Likewise, if the interrupt cause is a write end, the CPU 2 resets the write end interrupt mask and cancels the interrupt. When the processing is to be continued, the CPU 2 sets a write start address and write end address again, and sets a write enable signal. After such processing, the CPU 2 sets the above write end interrupt mask.

When data is read out from the RAM 6, the arbiter 4 returns a RAM data valid signal PVALID to the module 3 as the request source. In the module 3 as the request source, the arbiter 10 returns a data valid signal Rvalid to the read FIFO 7. The read FIFO 7 stores data on a RAM data output signal PDIN while the data valid signal Rvalid is set. With this operation, data in the RAM 6 is stored in the read FIFO 7.

When data is to be written in the RAM 6, the arbiter 4 returns the RAM data valid signal PVALID to the module 3 as the request source in synchronism with the write timing of the RAM 6. In the module 3 as the request source, the arbiter 10 returns a data valid signal Wvalid to the write FIFO 9. The write FIFO 9 outputs data to be written on a RAM data input signal PDOUT while the data valid signal Wvalid is set. With this operation, data in the write FIFO 9 is stored in the RAM 6.

The read FIFO 7 sets a valid signal valid_0 when the FIFO is not empty. If the FIFO is empty, the read FIFO 7 resets the valid signal valid_0. If a hold request signal stall_0 from the sub-module 8-1 is not set, the read FIFO 7 outputs stored data in synchronism with a clock. If the hold request signal stall_0 from the sub-module 8-1 is set, the data in the read FIFO 7 is not updated.

The sub-module 8-1 receives only data for which the valid signal valid_0 is set. Note that if no data can be received, the sub-module 8-1 sets the hold request signal stall_0 to hold the output of the read FIFO 7.

As shown in FIG. 4, in this embodiment, the internal arrangement of the module 3 is constituted by one or more sub-modules 8-1 to 8-$n$. The respective sub-modules transfer data with each other with the same operation as described above (i.e., handshaking using a valid signal valid and hold request signal stall).

That is, a characteristic feature of this embodiment is that each data processing means (e.g., the module 3) is comprised of a first address generating means (e.g., the read address generator 11) for generating an address for reading out data from a storage means (e.g., the RAM 6), a first data holding means (e.g., the read FIFO 7) for storing data read out from the storage means in accordance with the above address, one or more second data processing means (e.g., the sub-modules 8-1 to 8-$n$) for processing data, a second data holding means (e.g., the write FIFO 9) for storing output data processed by the second data processing means on the last stage (e.g., the sub-module 8-$n$), a second address generating means (e.g., the write address generator 13) for generating an address for writing output data in the storage means, and a second access control means (e.g., the arbiter 10) for giving an access control means (e.g., the arbiter 4) a request to access the storage means when data can be stored in the first data holding means or data can be output from the second data holding means.

This embodiment is characterized in that the above data processing means further includes a request means (e.g., the interrupt controller 12) for outputting an interrupt request signal when the last data is to be read out from the storage means or the last data is to be written in the storage means.

In this embodiment, each data processing module is encapsulated with an input FIFO, input address generator, output FIFO, output address generator, and arbiter, and data is transferred through the shared RAM. This makes it easy to add and modify a data processing module. In addition, since activation control can be done on a module basis, the pipeline arrangement can be adaptively modified on a module basis in accordance with the processing contents and resources. This makes it easy to optimize the cost, performance, and power consumption.

Figure 5:
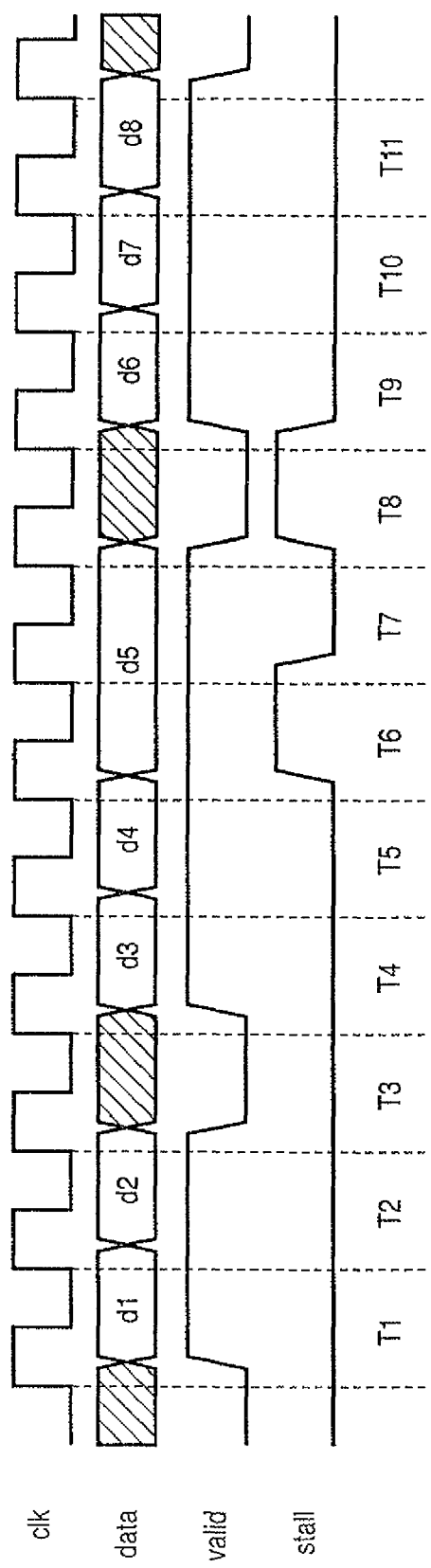
FIG. 5 is a timing chart showing the operation of an I/F between sub-modules in the first embodiment of the present invention.

FIG. 5 is a timing chart showing the operation of an I/F between sub-modules in the first embodiment of the present invention.

As shown in FIG. 5, the sub-module on the data transmitting side sets a data signal d1 and the valid signal valid in synchronism with a clock clk, if data can be output (T1). If the hold request signal stall from the receiving side is not set at the leading edge of the next clock clk, the sub-module on the data transmitting side determines that data has been received. If the next data can be output, the sub-module on the data transmitting side sets a data signal data and the valid signal valid (T2).

If the next data cannot be output, the sub-module on the data transmitting side resets the valid signal valid (T3). If the hold request signal stall from the receiving side is set at the leading edge of the next clock clk, the sub-module on the data transmitting side determines that no data has been received, and holds the data signal data and valid signal valid (T7).

Even if the hold request signal stall from the receiving side is set, the data is invalid data unless the valid signal valid is set (T8). In this case, therefore, the sub-module on the data transmitting side outputs the next valid data without holding the data signal data and valid signal valid (T9). That is, the hold request signal stall is neglected when the valid signal valid is not set.

If there is a free space in the FIFO, the write FIFO 9 stores a data signal data_n in the FIFO when a valid signal valid_n from the sub-module 8-$n$ is set. If there is no empty space in the FIFO, the write FIFO 9 sets a hold request signal stall_n to make the sub-module 8-$n$ hold its output.

Figure 6:
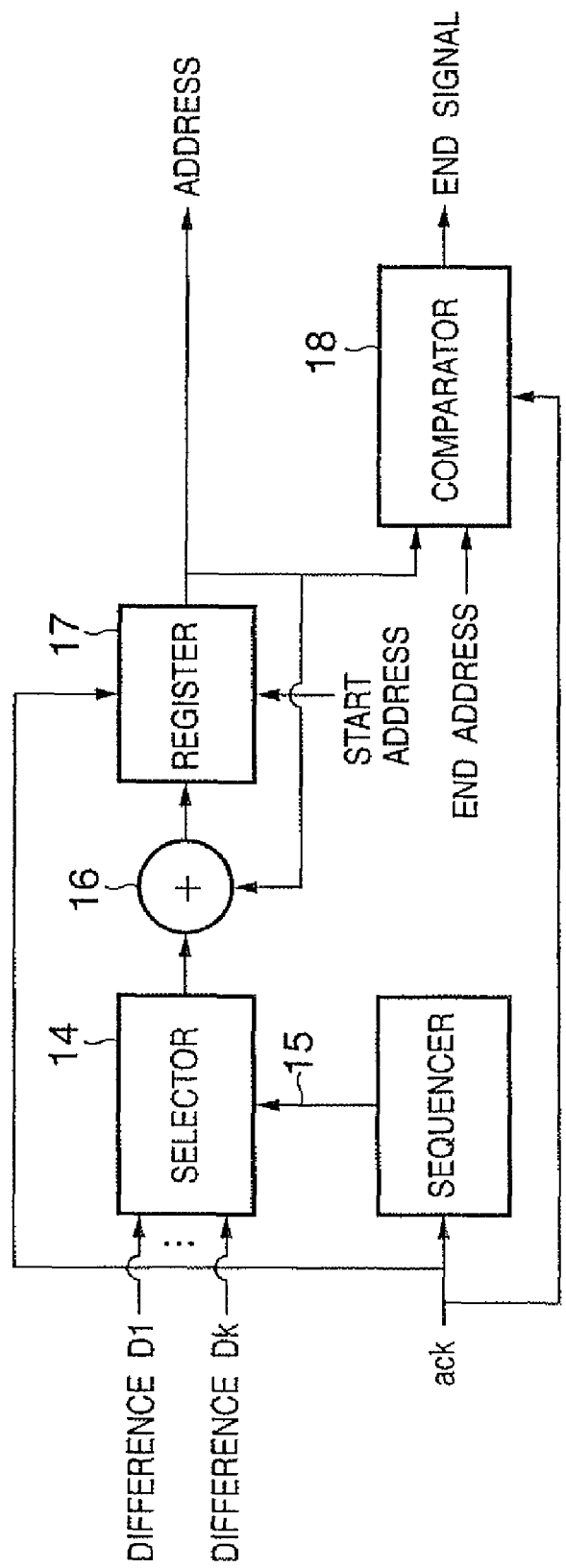
FIG. 6 is a block diagram for explaining the detailed arrangement of an address generator in a module 3 of the data processing apparatus according to the first embodiment of the present invention.

FIG. 6 is a block diagram for explaining the detailed arrangement of each address generator (i.e., the read address generator 11 or write address generator 13) inside each module 3 of the data processing apparatus according to the first embodiment of the present invention. Referring to FIG. 6, reference numeral 14 denotes a selector; 15, a sequencer; 16, an adder; 17, a register; and 18, a comparator.

First of all, the CPU 2 sets a start address in the register 17. The sequencer 15 causes a state transition in response to a request acknowledgement signal ack, and selects an address difference value from the selector 14 in accordance with the state. For example, the sequencer 15 incorporates one or more counters, and each counter counts up or down in response to the request acknowledgement signal ack. The sequencer 15 controls the selector 14 in accordance with a carry or borrow of each counter. Since the counter value changes every time access is made a predetermined number of times, the address difference value output from the selector changes.

In this embodiment, in order to improve the transfer efficiency with respect to the RAM 6, the RAM 6 is accessed in a predetermined number of words. If, therefore, unnecessary data exists in an access unit (i.e., an address becomes discontinuous within an access unit), a word count num as an access unit is changed to prevent unnecessary access.

The adder 16 adds the selected address difference value to the immediately preceding address. The resultant data is held in the register 17 in response to the acknowledgement signal ack. The comparator 18 compares the output from the register 17 (i.e., the address output from the address generator) with the end address. If the output from the register 17 coincides with the end address, the end signal is set in response to the acknowledgement signal ack.

Address difference values D1 to Dk (k is an integer equal to or more than 1) input to the selector 14 and parameters (e.g., an increment for the counter) for the sequencer 15 are set by the configuration register. A negative difference value can be expressed by making the weight of the MSB (Most Significant Bit) of an address difference value coincide with that of the MSB of an output address. Note that since access may be made to a plurality of words at once as in the burst mode, the bit count of an address difference value does not always coincide with that of an output address. In general, the number of address difference values is equal to the number of counters in the sequencer 15+1.

A characteristic feature of this embodiment is that the first or second address generating means (e.g., the read address generator 11 or write address generator 13) is comprised of a setting means (e.g., the register 17) for setting an access request address (start address), a selection means (e.g., the selector 14) for selecting one address difference value from a plurality of address difference values, a generating means (e.g., the adder 16) for generating a new access request address by using a selected address difference value and an access request address, and a control means (e.g., the sequencer 15) for controlling the selection means in selecting an address difference value.

FIG. 7 is a view for explaining parameters in each address generator according to the first embodiment of the present invention.

For example, as shown in FIG. 7, in two-dimensional addressing in which data are accessed on a data block basis, first of all, a start address As is loaded into the register 17. The sequencer 15 controls the selector 14 to select the address difference value D1. Since the selector 14 selects the address difference value D1, an output from the adder 16 becomes As+A1, thereby generating the next address. Upon reception of the acknowledgement signal ack, the register 17 outputs As+D1 as the next address. If the access count in the horizontal direction is represented by w, the address generator repeats the above operation (w−1) times. In the wth address generating operation, the sequencer 15 controls the selector 14 to select the address difference value D2. Therefore, the wth address becomes As+(w−1)·D1+D2, and first data P1,0 of the next line is accessed.

Upon reception of the next acknowledgement signal ack, the sequencer 15 controls the selector 14 to select the address difference value D1. In this manner, the sequencer 15 controls the selector 14 to select the address difference value D2 once for every w accesses and select the address difference value D1 at other times. The sequencer 15 may form a base-w counter which loads w−1, decrements (−1) in response to the acknowledgement signal ack, and reloads w−1 in response to the next acknowledgement signal ack when the counter becomes 0, and generate a signal for selecting the address difference value D2 when the base-w counter becomes 0.

In this two-dimensional addressing operation, therefore, a total of five parameters are set for the address generator, including the start address As, an end address Ae, the access count w in the horizontal direction (set value: w−1), and the two address difference values D1 and D2.

If, for example, addresses are adjacent to each other as shown in FIG. 7, D1=1. When access is to be made from right to left, D1=−1 may be set. Likewise, 90° rotation or intermittent access can be done by properly setting the above parameters. In the case of 90° rotation, however, an access count h in the vertical direction is used instead of the access count w in the horizontal direction.

Figure 8:
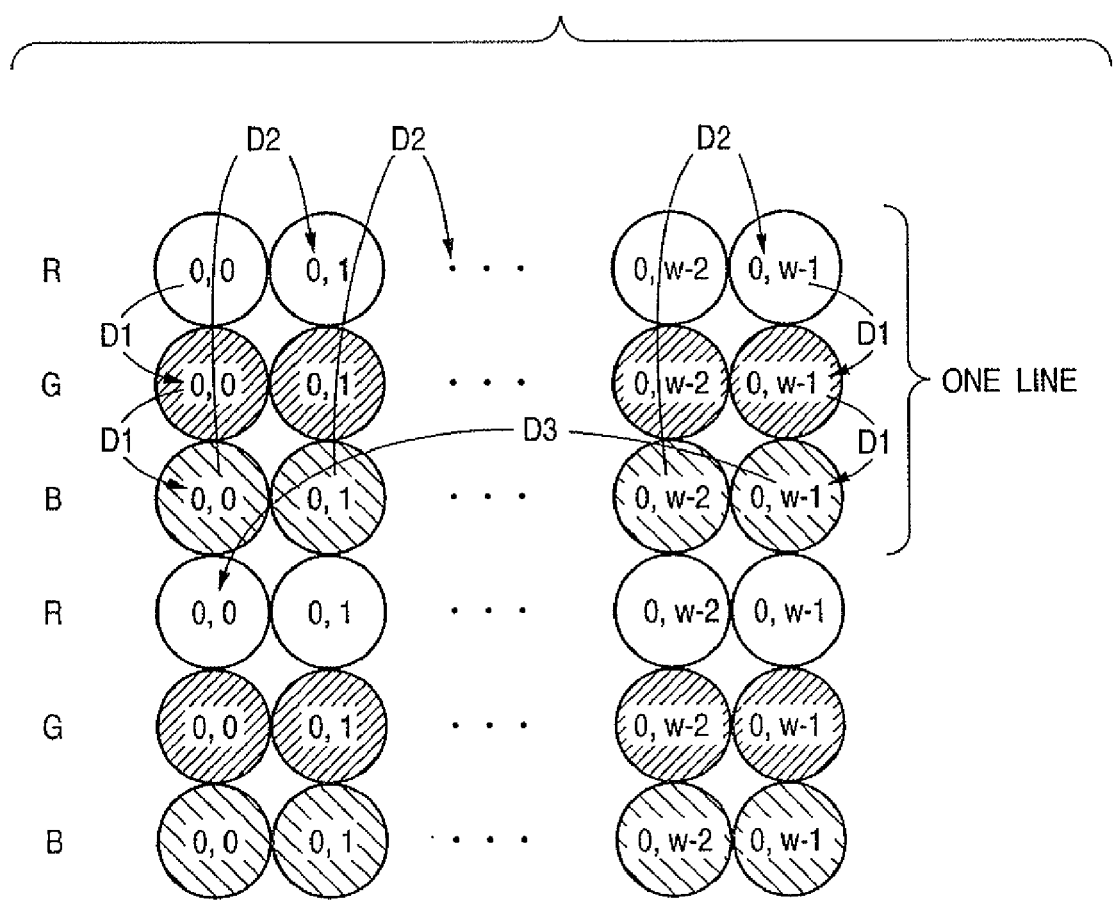
FIG. 8 is a view for explaining another sequence in the address generator according to the first embodiment of the present invention.

FIG. 8 is a view for explaining another sequence in each address generator according to the first embodiment of the present invention.

In three-dimensional addressing in which, for example, RGB line sequential data is converted into pixel sequential data, as shown in FIG. 8, the sequencer 15 controls the selector 14 to select the address difference value D2 once after selecting the address difference value D1 twice. When this sequence is repeated (w−1) times, the sequencer 15 controls the selector 14 to select a address difference value D3. Therefore, the sequencer 15 may internally form a base-c counter which loads c−1 (plane count c=3 in this embodiment), decrements by one in response to the acknowledgement signal ack, and reloads c−1 in response to the next acknowledgement signal ack when the counter becomes 0, and a base-w counter which loads w−1, decrements by one in response to the acknowledgement signal ack when the base-c counter is 0, and reloads w−1 in response to the acknowledgement signal ack when the counter is 0 and the base-c counter is 0, and generate a signal for selecting the address difference value D3 when both the base-c counter and base-w counter are 0, the address difference value D2 when only the base-c counter is 0, and the address difference value D1 in other cases.

In this three-dimensional addressing operation, therefore, a total of seven parameters are set for the address generator, including the start address As, end address Ae, plane count c (set value: c−1), access count w in the horizontal direction (set value: w−1), and three address difference values D1, D2, and D3.

Note that in order to allow the respective data processing modules to share the interface, the data input of the read FIFO and the data output of the write FIFO are matched in advance with the RAM interface unit 5. If the bit count of the data line of each sub-module in each module does not coincide with that of the RAM interface unit 5, data is converted by the sub-modules 8-1 or 8-n. In this case, if the bit count of the data line of the RAM interface unit 5 is 32 bits, the bit count of the data line of the FIFO becomes 32 bits.

In a module for generating 8-bit data of a device color (e.g., one of C, M, Y, and K which are the colors of color materials in a general printer) from 24-bit RGB data, each sub-module is constituted by four components, i.e., an RGB unpacked processor, input γ converter, color converter, and packing unit. The RGB unpacked processor segments each of 8-bit R, G, and B data from output data from the read FIFO. The input γ converter converts each of 8-bit R, G, and B data into 10-bit data. The color converter converts, for example, 10-bit RGB data (total of 30-bit) into 8-bit cyan data. The packing unit packs the data into 32-bit data and stores it in the write FIFO.

As described above, since handshaking is performed by using the valid signal valid and hold request signal stall, conversion of such a bit count can be easily realized. If such a bit count conversion processor is formed into a component, development is facilitated. In addition, if a sub-module to be tested is wrapped by the above bit count conversion processor, sub-modules can be separately tested by test bench of the module.

If a bypass mode for outputting input data without any change is provided for each sub-module, interim data can also be output. This makes it possible to add an arbitrary sub-module. If, for example, in the above color conversion module, RGB-RGB conversion needs to be newly added between input γ conversion and color conversion, input γ conversion output is stored in the RAM 6 in the first processing by the color conversion module by bypassing subsequent color conversion. The result of RGB-RGB conversion as additional processing based on software is then stored in the RAM 6. In the second processing by the color conversion module, input γ conversion is bypassed to execute processing after color conversion. In the prior art, when a sub-module needs to be added or modified, the overall data processing module becomes unusable. However, by segmenting processing using the bypass mode, the data processing module can be effectively used.

As described above, according to the first embodiment of the present invention, each data processing module is encapsulated together with an input FIFO, input address generator, output FIFO, output address generator, and arbiter, to allow data transfer through a common RAM. This makes it easy to add and modify a data processing module.

In addition, each sub-module inside a data processing module can be easily designed because only handshaking using the valid signal valid and hold request signal stall needs to be taken into consideration in terms of timing.

Since the basic arrangements of FIFOS, address generators, and arbiters are almost identical to each other because of the above encapsulation, these components can be commonly used in the respective data processing modules. Note that in each data processing module, the number of FIFOs, the counter of the address generator, and parameters can be easily optimized. For example, processing in an address generator is almost determined by the number of dimensions and the bit count of a counter. The number of dimensions and the bit count of the counter can be easily changed by using logic synthesis based on a hardware description language.

If a plurality of ports are set for the arbiter 4 in advance, almost no modification will be required to be made to the arbiter 4 due to addition/modification of a data processing module below the set number of ports.

In addition, since processing is completed within each module, a clock domain can be divided on a module basis. Therefore, a reduction in power consumption can be attained by stopping the supply of clocks to a data processing module that is not used or to a module whose processing has ended early. In forming a data processing pipeline like the one shown in FIG. 3, an unnecessary increase in the speed of a circuit can be prevented, and a reduction in hardware amount (e.g., the area of an LSI) can be achieved by adjusting a clock period to match the processing time in each data processing module. This makes it possible to further reduce the power consumption.

Furthermore, since the sequence (processing sequence) in each data processing module is controlled by software processing, an optimal sequence of necessary processing can be implemented by a data processing pipeline, as needed.

Moreover, since the buffer size of the shared memory of the respective processing module can be arbitrarily adjusted, memory allocation can be done in accordance with the processing contents. As described above, the tradeoff between the amount of memory occupied and performance can be controlled by software.

Second Embodiment

Figure 9:
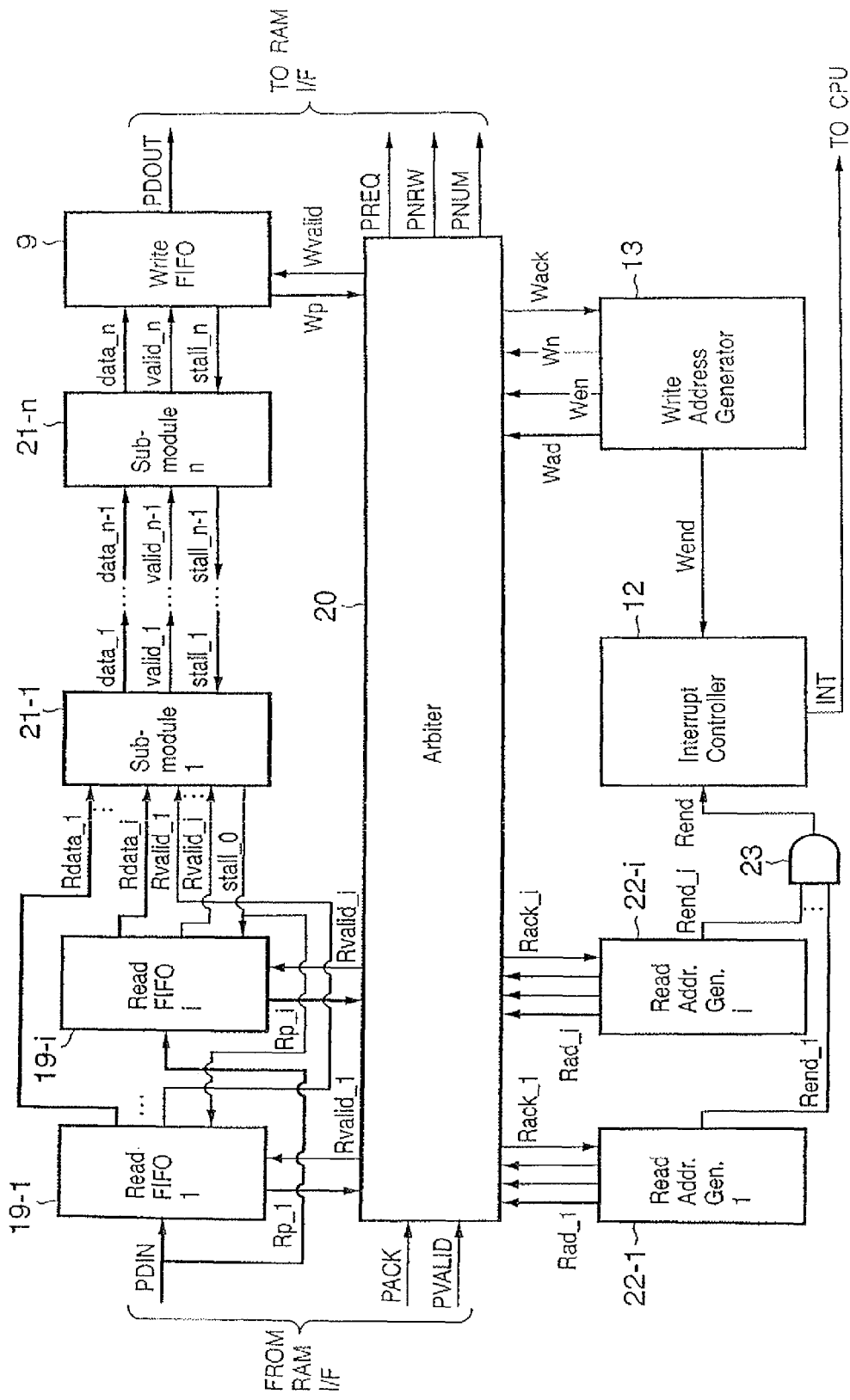
FIG. 9 is a block diagram for explaining the detailed internal arrangement of a module in a data processing apparatus according to the second embodiment of the present invention.

FIG. 9 is a block diagram for explaining the detailed internal arrangement of each module of a data processing apparatus according to the second embodiment of the present invention. Referring to FIG. 9, reference numerals 19-1 to 19-i (i is an integer equal to or more than 1) denote read FIFOs; 20, an arbiter; 21-1 to 21-n, sub-modules; 22-1 to 22-i, read address generators; and 23, a read interrupt controller. Only a portion different from the first embodiment will be described below.

Assume that in this embodiment, the sub-module 21-1 handles data stored at a plurality of discontinuous addresses. For this reason, each module in this embodiment includes a plurality of read FIFOs 19-i and a plurality of read address generators 22-i corresponding to the respective read FIFOs 19-i. If, for example, data from a plurality of lines are simultaneously required as in a case of block encoding of an image, a FIFO and read address generator are provided in correspondence with each line. This eliminates the need for a line memory and makes it possible to cope with an arbitrary image width (the number of pixels in the horizontal direction). Note that the read address generators 22-1 to 22-i and read FIFOs 19-1 to 19-i are treated equal in the following description, and hence will be described below by taking the read address generator 22-i and read FIFO 19-i as examples.

A CPU 2 sets a configuration register in a module 3 to set a read start address and read end address in the read address generator 22-i and set an read enable signal Ren_i.

The arbiter 20 detects a free space Rp-i of the read FIFO 19-i and the read enable signal Ren_i from the read address generator 22-i. If the read address is valid (Ren_i=1) and data can be stored in the read FIFO 19-i (Rp_i≧Rnum_i), the arbiter 20 issues a read request to an arbiter 4.

Upon reception of an acknowledgement signal PACK from the arbiter 4, the arbiter 20 returns an acknowledgement signal Rack_i to the read address generator 22-i as the request source. Upon reception of the acknowledgement signal Rack_i, the read address generator 22-i generates the next address. If the request address coincides with the read end address, the read address generator 22-*i* resets the read enable signal Ren_i and outputs a read end signal Rend_i to the read interrupt controller 23.

When the processing in all the read address generators 22-1 to 22-*i* is finished, the read interrupt controller 23 determines that reading of all input signals is finished, and outputs a read end signal Rend to an interrupt controller 12. In this case, the read end signal Rend is generated by calculating the AND (logical product) between read end signals Rend_1 to Rend_i from the read address generators 22-1 to 22-*i*. Alternatively, this system may be configured to generate an interrupt when a read in one of the read address generators is finished. In this case, a status indicating which read address generator has finished processing and an interrupt mask for canceling an interrupt from the read address generator which has already finished processing may be added, and the OR between the signals obtained by ANDing the read end signals Rend_1 to Rend_i from the respective read address generators 22-1 to 22-*i* with the corresponding interrupt masks described above may be used as the read end signal Rend.

When data is read out from a RAM 6, the arbiter 4 returns a RAM data valid signal PVALID to the arbiter 20 of the request source module (i.e., the module shown in FIG. 9). In the request source module, the arbiter 20 returns a data valid signal Rvalid_i to the request source read FIFO 19-*i*. The read FIFO 19-*i* stores data on a RAM data output signal PDIN while the data valid signal Rvalid_i is set. With this operation, data in the RAM 6 is stored in the read FIFO 19-*i*. That is, a characteristic feature of this embodiment is that the sub-module 21-1 performs data processing under the condition that all the read FIFOs 19-1 to 19-*i* set valid signals.

The read FIFO 19-*i* sets the data valid signal Rvalid_i when the FIFO is not empty, and resets the data valid signal Rvalid_i when the FIFO is empty. If a hold request signal stall_0 from the sub-module 21-1 is not set, the read FIFO 19-*i* outputs stored data in synchronism with a clock. If the hold request signal stall_0 from the sub-module 21-1 is set, the read FIFO 19-*i* updates no data.

The sub-module 21-1 receives only data for which the data valid signal Rvalid_i is set. If data cannot be received, the sub-module 21-1 sets the hold request signal stall_0 to hold the output of the read FIFO 19-*i*. In general, the sub-module 21-1 sets the hold request signal stall_0 until data from all the read FIFOs 19-1 to 19-*i* are received, thereby synchronizing outputs Rdata_1 to Rdata_i from the read FIFOs 19-1 to 19-*i*.

As described above, according to the second embodiment of the present invention, since a plurality of read FIFOs and a plurality of read address generators corresponding to the respective read FIFOs are provided, even if a sub-module designed to handle data stored at a plurality of discontinuous addresses is to be introduced, the interface of the module need not be changed (is allowed to remain the same). Therefore, the same effects as those of the first embodiment can be obtained. In addition, since the read address generators are arranged in one-to-one correspondence with the read FIFOs, the continuity of access to the RAM 6 improves, and hence the bus utilization ratio of the RAM increases.

Third Embodiment

Figure 10:
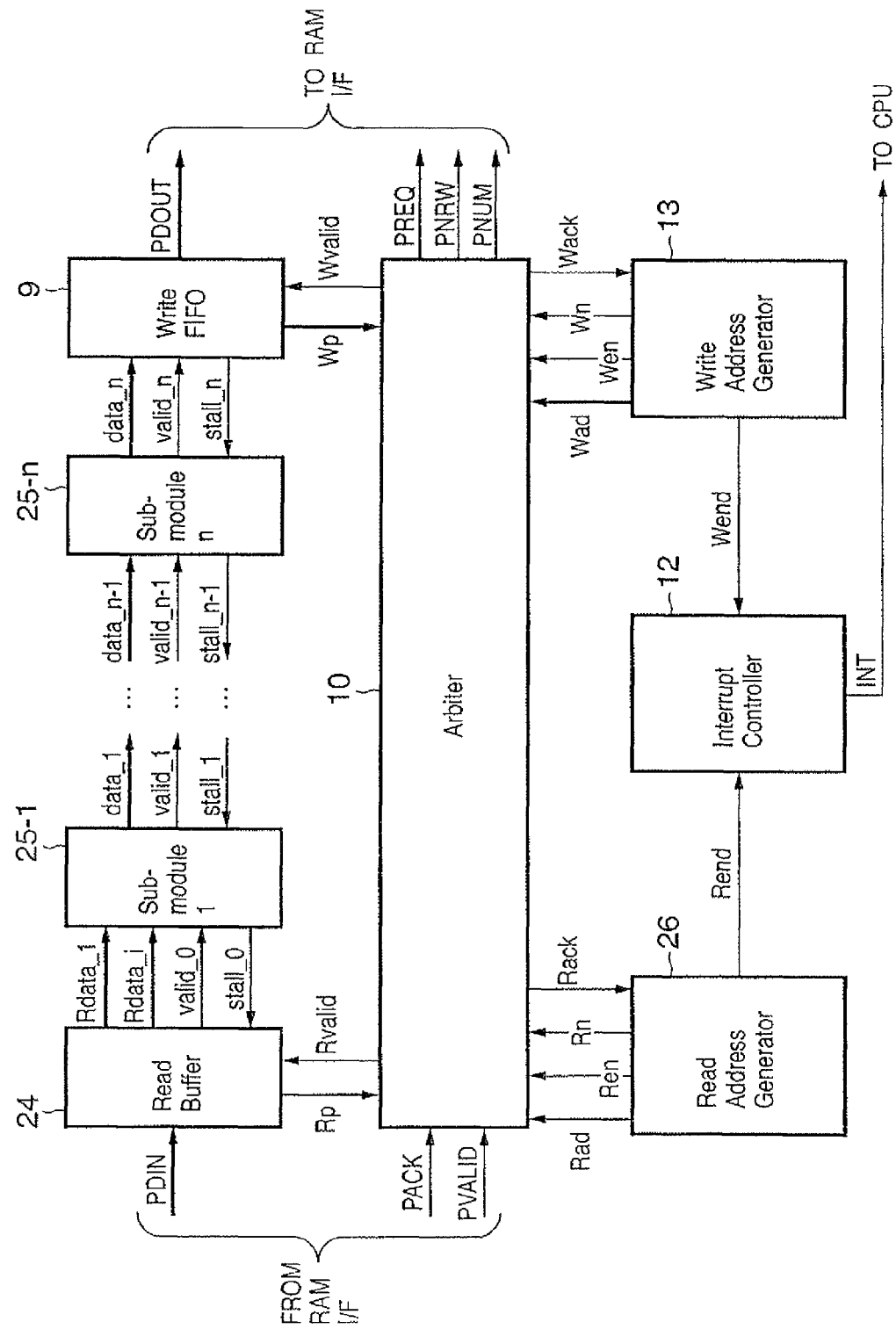
FIG. 10 is a block diagram for explaining the detailed internal arrangement of a module in a data processing apparatus according to the third embodiment of the present invention.

FIG. 10 is a block diagram for explaining the detailed internal arrangement of each module of a data processing apparatus according to the third embodiment of the present invention. Referring to FIG. 10, reference numeral 24 denotes a read buffer; 25-1 to 25-*n*, sub-modules; and 26, a read address generator. Only a portion different from the first and second embodiments will be described below.

Assume that in this embodiment, as in the second embodiment, a sub-module 25-1 handles data stored at a plurality of discontinuous addresses. Assume, however, that in this embodiment, there is predetermined regularity between the above discontinuous addresses as in block encoding of an image.

A CPU 2 sets a configuration register in a module 3 to set a read start address and read end address in the read address generator 26 and set an read enable signal Ren.

The arbiter 10 detects a free space Rp of the read buffer 24 and the read enable signal Ren from the read address generator 26. If the read address is valid (Ren=1) and data can be stored in the read buffer 24 (Rp≧Rnum), the arbiter 10 issues a read request to an arbiter 4.

Upon reception of an acknowledgement signal PACK from the arbiter 4, the arbiter 10 returns an acknowledgement signal Rack to the read address generator 26 as the request source. Upon reception of the acknowledgement signal Pack, the read address generator 26 generates the next address. If the request address coincides with the read end address, the read address generator 26 resets the read enable signal Ren and outputs a read end signal Rend to the interrupt controller 12.

When data is read out from a RAM 6, the arbiter 4 returns a RAM data valid signal PVALID to the request source module. In the request source module, the arbiter 10 returns a data valid signal Rvalid to the request source read buffer 24. The read buffer 24 stores data on a RAM data output signal PDIN while the data valid signal Rvalid is set. With this operation, data in the RAM 6 is stored in the read buffer 24.

When all data necessary for processing in the sub-module 25-1 are stored, the read buffer 24 sets the data valid signal Rvalid. If data acquisition is insufficient, the read buffer 24 resets the data valid signal Rvalid. In addition, if a hold request signal stall_0 from the sub-module 25-1 is not set, the read buffer 24 outputs data necessary for the processing in the sub-module 25-1 in synchronism with a clock. When the hold request signal stall_0 from the sub-module 25-1 is set, the read buffer 24 updates no data. The sub-module 25-1 receives only data for which the data valid signal Rvalid is set. Note that if data cannot be received, the hold request signal stall_0 is set to hold the output of the read buffer 24.

The read buffer 24 has a buffer corresponding to data simultaneously required by the sub-module 25-1, and sequentially stores data read out from the RAM 6 in the buffer in accordance with the data valid signal Rvalid. Assume that the read buffer 24 has a double-buffer arrangement to avoid contention between a read and a write. One buffer has a capacity corresponding to a predetermined burst length (e.g., burst length×4 when access is to be made to 4-line data). This allows burst access and increases the bus utilization ratio of the RAM 6.

Assume that the read address generator 26 has the same arrangement as that shown in FIG. 6. Assume that access is to be made to 4-line data, as described above. In this case, letting D1 and D2 be the address difference values necessary for two-dimensional access used in the read address generator 22 described in the second embodiment, w be the number of pixels in the horizontal direction, and D3 be an address difference corresponding to one line, a sequencer 15 controls a selector 14 to select address difference value D4=−3·D3+D1 once after the address difference D3 corresponding to one line is selected three times. This sequence is repeated (w−1) times. At the wth operation, the sequencer 15 controls the selector 14 to select the address difference value D2 instead of the address difference value D4.

As described above, if two address difference values and one counter are required in the read address generator 22, three address difference values and two counters are required in the read address generator 26 according to this embodiment. By increasing the number of counters and the number of difference values in each read address generator 22 by one each, the read address generators can be integrated into one.

As described above, according to the third embodiment, the read buffer 24 has a double-buffer arrangement in which one buffer has a predetermined capacity corresponding to (burst length)×(the number of data necessary for one data process in a sub-module), and even a sub-module designed to handle data stored at a plurality of discontinuous addresses can be introduced by increasing the number of dimensions of the read address generator 26 by one without changing the interface of the module (i.e., the interface is allowed to remain the same). Therefore, the same effects as those of the first embodiment can be obtained. In addition, since the read address generators are integrated into one, simplification of processing can be realized.

Fourth Embodiment

Figure 11:
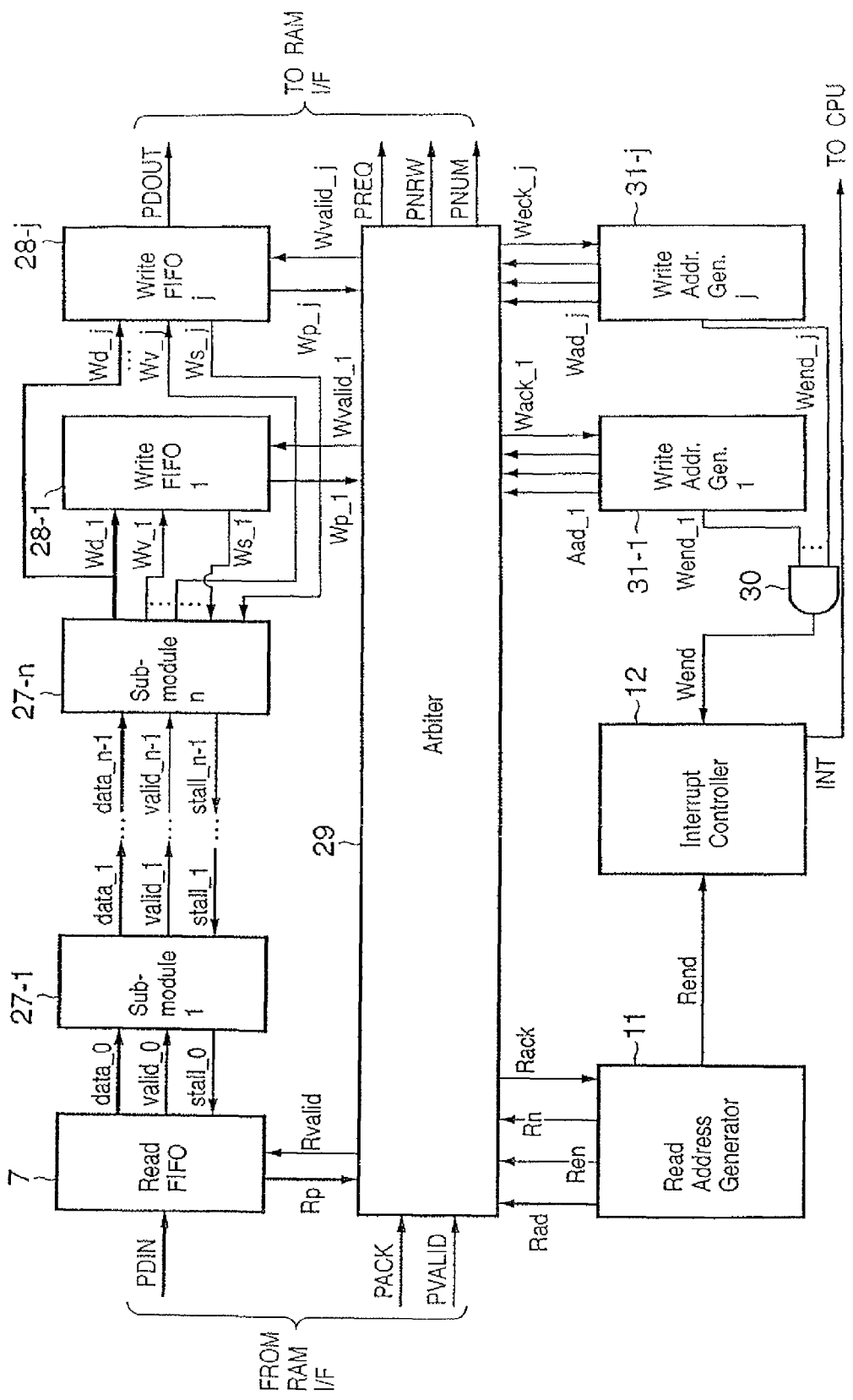
FIG. 11 is a block diagram for explaining the detailed internal arrangement of a module in a data processing apparatus according to the fourth embodiment of the present invention.

FIG. 11 is a block diagram for explaining the detailed internal arrangement of each module of a data processing apparatus according to the fourth embodiment of the present invention. Referring to FIG. 11, reference numerals 27-1 to 27-n denote sub-modules; 28-1 to 28-j (j is an integer equal to or more than 1), write FIFOs; 29, an arbiter; 30, a write interrupt controller; and 31-1 to 31-j, write address generators. Only a portion different from the first embodiment will be described below.

Assume that in this embodiment, the sub-module 27-n outputs data to a plurality of discontinuous addresses. For this reason, a module 3 in this embodiment includes a plurality of write FIFOs 28-1 to 28-j and a plurality of write address generators 31-1 to 31-j corresponding to the respective write FIFOs. If, for example, data from a plurality of lines are simultaneously output as in a case of block decoding of an image, a write FIFO 28-j and write address generator 31-j are provided in correspondence with each line. This eliminates the need for a line memory and makes it possible to cope with an arbitrary image width (the number of pixels in the horizontal direction). Note that the write address generators 31-1 to 31-j and write FIFOs 28-1 to 28-j are treated equal in the following description, and hence will be described below by taking the write address generator 31-j and write FIFO 28-j as examples.

A CPU 2 sets a configuration register in the module 3 to set a write start address and write end address in the write address generator 31-j and set an write enable signal Wen_j.

The arbiter 29 detects an occupied capacity Wp-j of the write FIFO 28-j and the write enable signal Wen_j from the write address generator 31j. If the write address is valid (Wen_j=1) and data can be output from the write FIFO 28-j (Wp_j≧Wnum_j), the arbiter 29 issues a write request to an arbiter 4.

Upon reception of an acknowledgement signal PACK from the arbiter 4, the arbiter 29 returns an acknowledgement signal Wack_j to the write address generator 31-j as the request source. Upon reception of the acknowledgement signal Wack_j, the write address generator 31-j generates the next address. If the request address coincides with the write end address, the write address generator 31-j resets the write enable signal Wen_j and outputs a write end signal Wend_j to the write interrupt controller 30.

When the processing in all the write address generators 31-1 to 31-j is finished, the write interrupt controller 30 determines that writing of all output signals is finished, and outputs a write end signal Wend to an interrupt controller 12. In this case, the write end signal Wend is generated by calculating the AND (logical product) between write end signals Wend_1 to Wend_j from the write address generators 31-1 to 31-j. Alternatively, this system may be configured to generate an interrupt when a write in one of the write address generators is finished. In this case, a status indicating which write address generator has finished processing and an interrupt mask for canceling an interrupt from the write address generator which has already finished processing may be added, and the OR between the signals obtained by ANDing the write end signals Wend_1 to Wend_j from the respective write address generators 31-1 to 31-j with the corresponding interrupt masks described above may be used as the write end signal Wend.

When data can be written in a RAM 6, the arbiter 4 returns a RAM data valid signal PVALID to the request source module. In the request source module, the arbiter 29 returns a data valid signal Wvalid_j to the request source write FIFO 28-j. The write FIFO 28-j reads out data from the FIFO and outputs write data on a RAM data input signal PDOUT while the data valid signal Wvalid_j is set. With this operation, data in the write FIFO 28-j is stored in the RAM 6.

If there is a free space in the FIFO, the write FIFO 28-j stores, in the FIFO, a data signal Wd_j obtained when a valid signal Wv_j from the sub-module 27-n is set. If there is no free space in the FIFO, the write FIFO 28-j sets a hold request signal Ws_j to hold the output of the sub-module 27-n.

As described above, according to the fourth embodiment of the present invention, since a plurality of write FIFOs and a plurality of write address generators corresponding to the respective write FIFOs are provided, even if a sub-module designed to output data to a plurality of discontinuous addresses is to be introduced, the interface of the module need not be changed (is allowed to remain the same). Therefore, the same effects as those of the first embodiment can be obtained. In addition, since the write address generators are arranged in one-to-one correspondence with the write FIFOS, the continuity of access to the RAM 6 improves, and hence the bus utilization ratio of the RAN increases.

Fifth Embodiment

Figure 12:
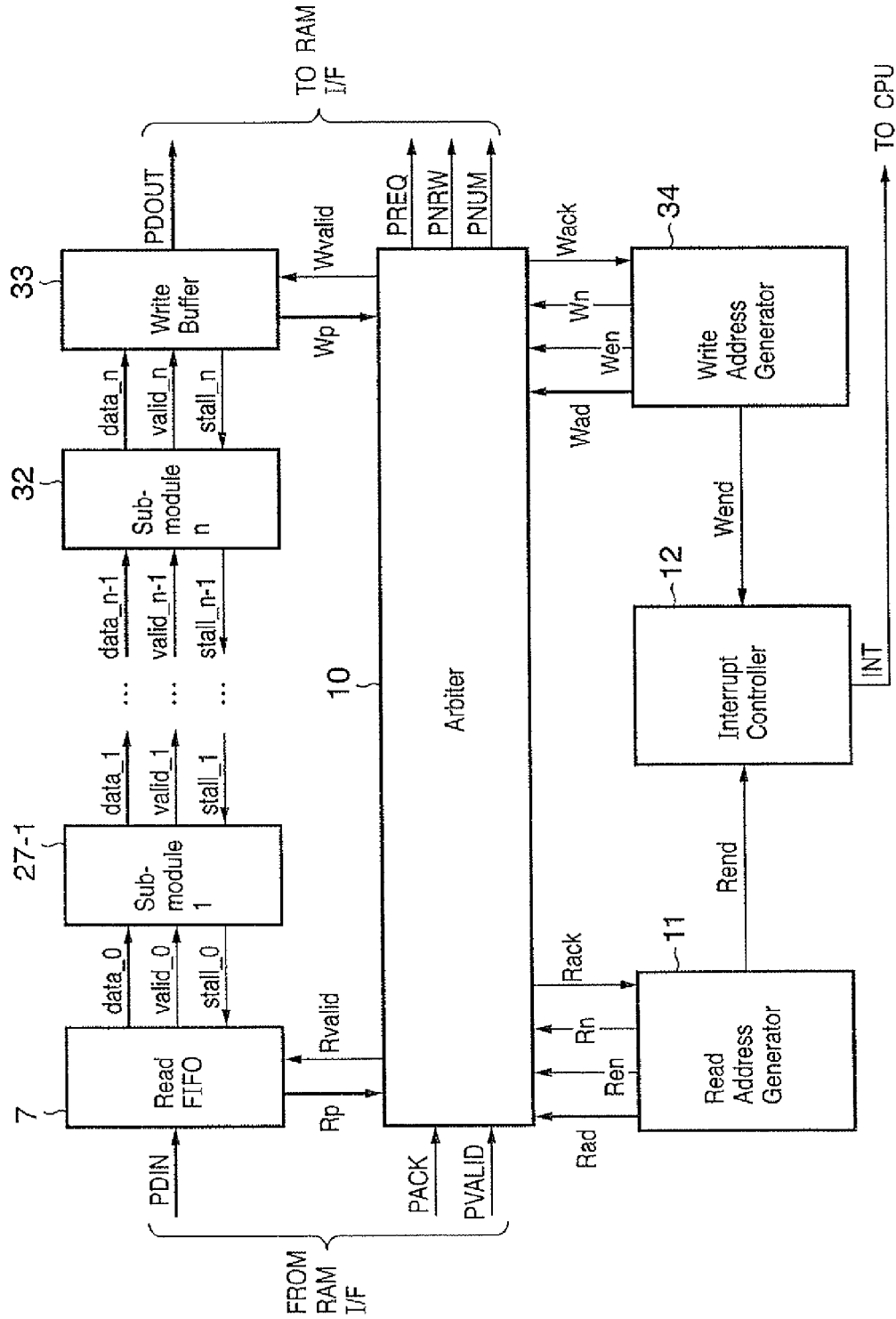
FIG. 12 is a block diagram for explaining the detailed internal arrangement of a module in a data processing apparatus according to the fifth embodiment of the present invention.

FIG. 12 is a block diagram for explaining the detailed internal arrangement of each module of a data processing apparatus according to the fifth embodiment of the present invention. Referring to FIG. 12, reference numeral 32 denotes a sub-module; 33, a write buffer; and 34, a write address generator. Only a portion different from the first and fourth embodiments will be described below.

Assume that in this embodiment, as in the fourth embodiment, a sub-module 32 handles data stored at a plurality of discontinuous addresses. Assume, however, that in this embodiment, there is predetermined regularity between the above discontinuous addresses as in block decoding of an image. Assume also that remaining n−1 sub-modules 27-1 to 27-n−1 are identical to those in the fourth embodiment. That is, this embodiment is equivalent to the fourth embodiment except that the sub-module 27-n is replaced with the sub-module 32.

A CPU 2 sets a configuration register in a module 3 to set a write start address and write end address in the write address generator 34 and set an write enable signal Wen.

The arbiter 10 detects an occupied capacity Wp of the write buffer 33 and the write enable signal Ren from the write address generator 34. If the write address is valid (Wen=1) and data can be output from the write buffer 33 (Wp≧Wnum), the arbiter 10 issues a write request to an arbiter 4.

Upon reception of an acknowledgement signal PACK from the arbiter 4, the arbiter 10 returns an acknowledgement signal Rack to the write address generator 34 as the request source. Upon reception of the acknowledgement signal Wack, the write address generator 34 generates the next address. If the request address coincides with the write end address, the write address generator 34 resets the write enable signal Wen and outputs a write end signal Wend to a write interrupt controller 12.

When data can be written in a RAM 6, the arbiter 4 returns a RAM data valid signal PVALID to the request source module. In the request source module, the arbiter 10 returns a data valid signal Rvalid to the request source write buffer 33. The write buffer 33 reads out data from the buffer and outputs write data on a RAM data input signal PDOUT while the data valid signal Wvalid is set. With this operation, data in the write buffer 33 is stored in the RAM 6.

If there is a free space in the buffer, the write buffer 33 stores, in the buffer, a data signal data_n obtained when a valid signal valid_n from the sub-module 32 is set. If there is no free space in the buffer, the write buffer 33 sets a hold request signal stall_n to hold the output of the sub-module 32.

The write buffer 33 has a buffer corresponding to data required for one sequence in the sub-module 32. The write buffer 33 reads out stored data and stores it in the RAM 6 in accordance with the data valid signal Wvalid. Assume that the write buffer 33 has a double-buffer arrangement to avoid contention between a read and a write. One buffer has a capacity corresponding to a predetermined burst length (e.g., burst length×4 when access is to be made to 4-line data). This allows burst access and increases the bus utilization ratio of the RAM 6.

Likewise, the write address generator 34 has the same arrangement as that shown in FIG. 6. Assume that access is to be made to 4-line data, as described above. In this case, letting D1 and D2 be the address difference values necessary for two-dimensional access used in the write address generator 31-$j$ as described above, w be the number of pixels in the horizontal direction, and D3 be an address difference corresponding to one liner a sequencer 15 controls a selector 14 to select address difference value D4=−3·D3+D1 once after the address difference D3 corresponding to one line is selected three times. This sequence is repeated (w−1) times. At the wth operation, the sequencer 15 controls the selector 14 to select the address difference value D2 instead of the address difference value D4.

As described above, if two address difference values and one counter are required in the write address generator 31-$j$, three address difference values and two counters are required in the write address generator 34 according to this embodiment. By increasing the number of counters and the number of difference values in each write address generator 22 by one each, the write address generators 31 can be integrated into one.

As described above, according to the fifth embodiment, the write buffer has a double-buffer arrangement in which one buffer has a predetermined capacity corresponding to (burst length)×(the number of addresses required for data output operation in one sequence by a sub-module), and even a sub-module designed to handle data stored at a plurality of discontinuous addresses can be introduced by increasing the number of dimensions of the write address generator 34 by one without changing the interface of the module (i.e., the interface is allowed to remain the same). Therefore, the same effects as those of the first embodiment can be obtained. In addition, since the write address generators are integrated into one, simplification of processing can be realized.

Sixth Embodiment

Figure 13:
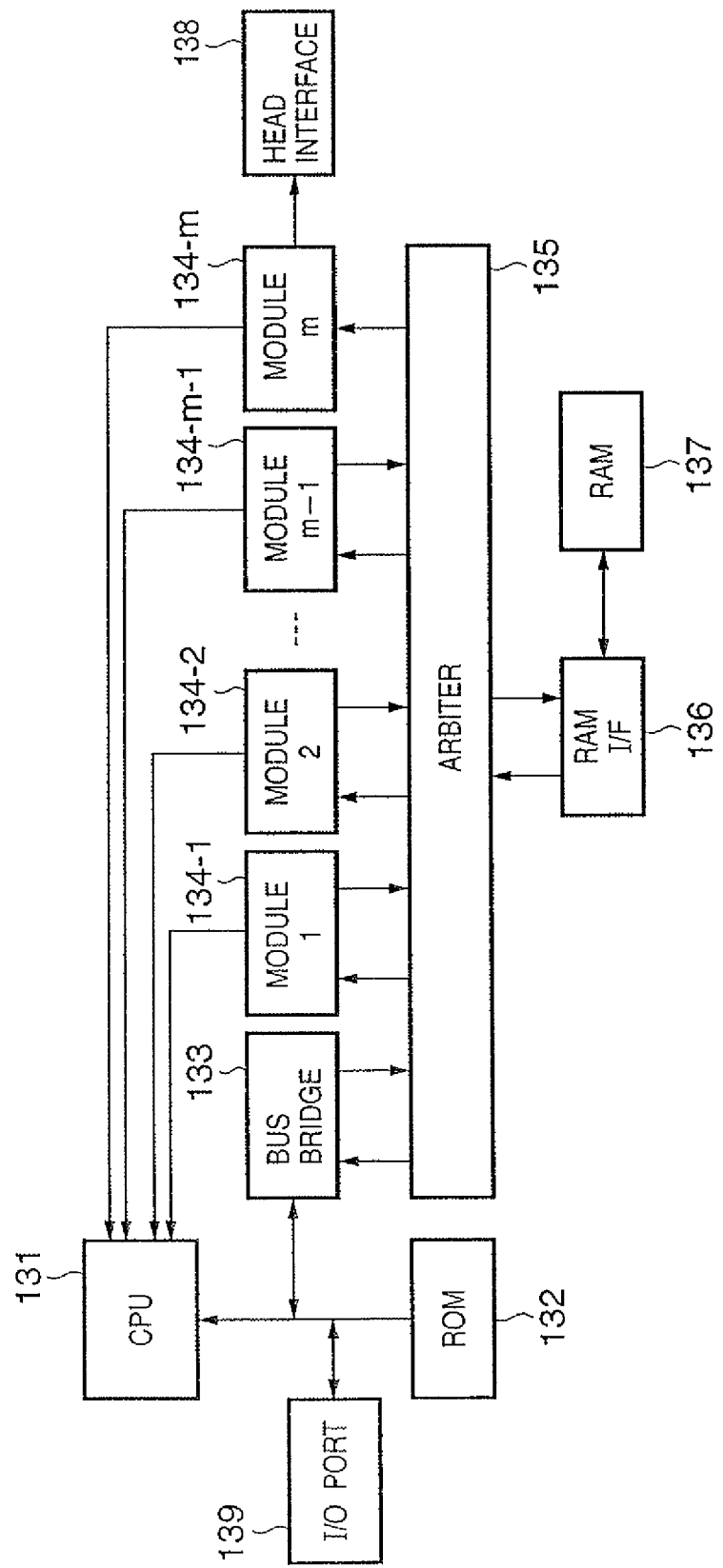
FIG. 13 is a block diagram showing an example of the arrangement of an image processing apparatus according to the sixth embodiment of the present invention.

The sixth embodiment of the present invention will be described in detail below with reference to the accompanying drawings. FIG. 13 is a block diagram showing an example of the arrangement of an image processing apparatus according to the sixth embodiment of the present invention.

Referring to FIG. 13, reference numeral 131 denotes a CPU for controlling the image processing apparatus; 132, a ROM storing programs and the like; 133, a bus bridge; 134, m (m is an integer equal to or more than 1) image processing modules (processors); 135, an arbiter for arbitrating access to a RAM 137; 136, a RAM interface unit (I/F) 136; 137, the RAM; 138, a head interface (I/F) 138; and 139, an I/O pot. Note that in this embodiment, the RAM 137 is shared by the CPU 131 and image processing modules 134-1 to 134-$m$. However, the CPU 131 may have another RAM.

The processing operation of the image processing apparatus having the above arrangement will be described next.

The CPU 131 receives data to be processed through an I/O or the like (not shown) in accordance with a program stored in the ROM 132, and stores the data in the RAM 137 through the bus bridge 133, arbiter 135 and RAM interface unit 136. The CPU 131 then sets a configuration register in the image processing module 134-1 to activate the image processing module 134-1.

When the image processing module 134-1 executes predetermined processing and finishes reading out data to be processed which is set in the above configuration register or finishes writing processed data which is set in the configuration register, the module generates an interrupt and sends it to the CPU 131. Upon reception of the interrupt, the CPU 131 analyzes an interrupt cause. If the image processing module 134-1 has finished reading out data to be processed, the CPU 131 sets data to be processed next, and causes the image processing module 134-1 to continue processing. If the image processing module 134-1 has finished writing the processed data, the CPU 131 sets the storage location of next processed data, and causes the image processing module 134-1 to continue processing. In addition, the CPU 131 sets a configuration register in the next image processing module 134-2 to activate the next image processing module 134-2.

The image processing module 134-2 executes predetermined processing. When the data to be processed which is set in the above configuration register is completely read out or the processed data which is set in the configuration register is completely written, the image processing module 134-2 generates an interrupt and sends it to the CPU 131. Upon reception of the interrupt, the CPU 131 analyzes an interrupt cause. If the image processing module 134-2 has finished reading out data to be processed, the CPU 131 sets data to be processed next and causes the image processing module 134-2 to continue the processing. If the image processing module 134-2 has finished writing the processed data, the CPU 131 sets the storage location of the next processed data and causes the image processing module 134-2 to continue the processing. In addition, the CPU 131 sets the configuration register in the next image processing module 134-3 to activate the image processing module 134-3.

As described above, in this image processing apparatus, each image processing module is activated immediately after the processing in the preceding image processing module is finished to sequentially transfer processed data to the image processing modules, thereby realizing pipeline processing on an image processing module basis.

When the processing proceeds to the image processing module 134-$m$-1, and a predetermined amount of bitmap data or more is generated, a print engine (not shown) is started, and the image processing module 134-$m$ starts processing in synchronism with a sync signal from the print engine, thereby printing the bitmap data through a head I/F 138.

Figure 14:
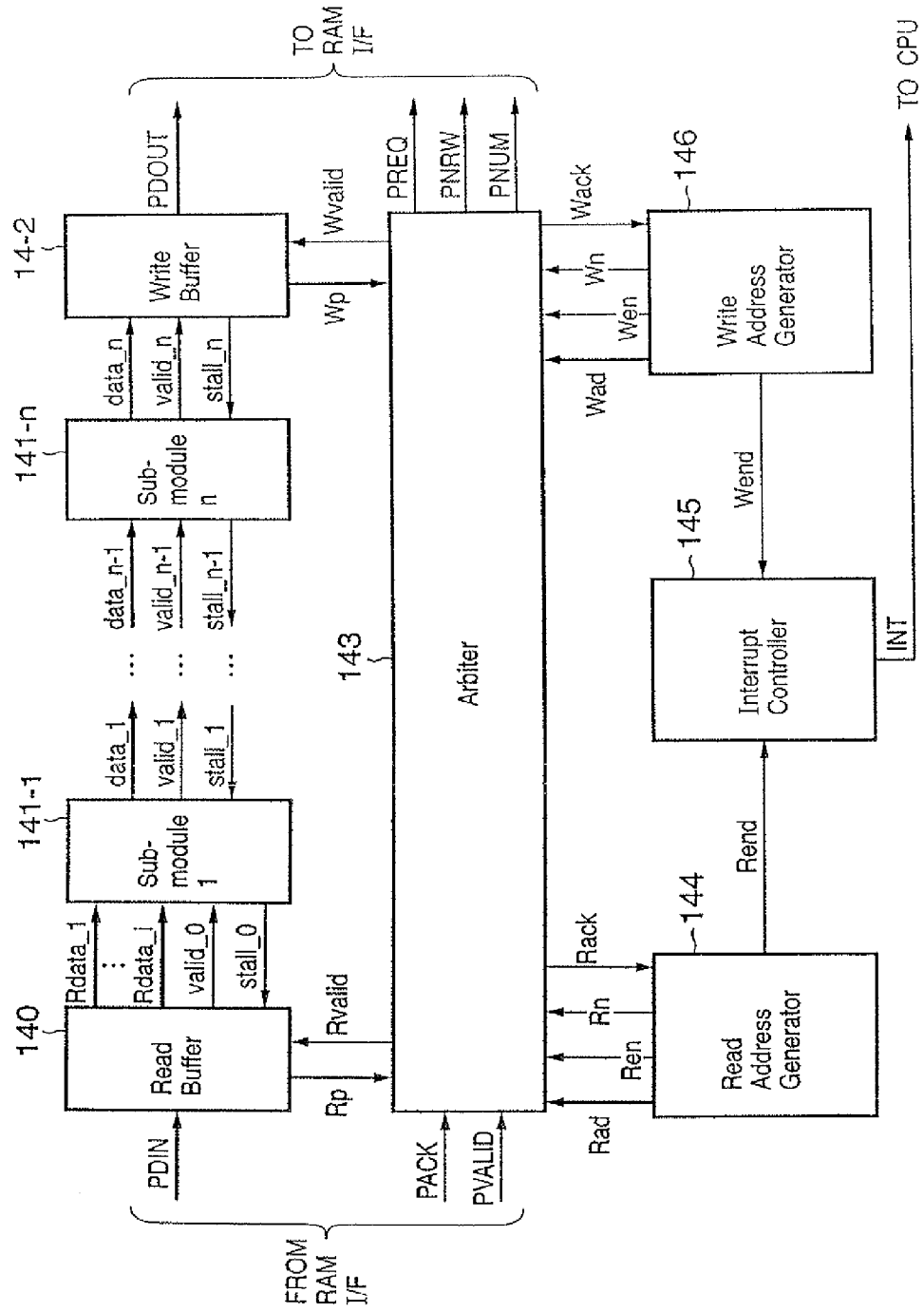
FIG. 14 is a block diagram for explaining the detailed internal arrangement of each of modules 134-1 to 134-m in the image processing apparatus according to the sixth embodiment of the present invention.

FIG. 14 is a block diagram showing the detailed internal arrangement of each of the image processing modules 134-1 to 134-$m$ (to be referred to as an "image processing module 134" hereinafter) of an image processing apparatus according to the sixth embodiment of the present invention. Referring to FIG. 14, reference numeral 140 denotes a read buffer; 141-1 to 141-$n$ ($n$ is an integer equal to or more than 1), sub-modules; 142, a write buffer; 143, an arbiter; 144, a read address generator; 145, an interrupt controller; and 146, a write address generator.

The CPU 131 sets a read start address, read end address, and read enable signal Ren in the read address generator 144 by setting a configuration register in the module 134. The CPU 131 also sets a write start address, write end address, and write enable signal Wen in the write address generator 146.

The arbiter 143 in the image processing module 134 detects a free space Rp in the buffer of the a read buffer 140 and the read enable signal Ren from the read address generator 144. If the read address is valid (Ren=1), and data can be stored in the read buffer 140 (Rp≧Rn), the arbiter 143 issues a read request (PREQ=1, PNRW=0, PNUM=Rn, PADD=Rad) to the arbiter 135.

When a data storage count Wp of the write buffer 142 becomes equal to or more than a predetermined word count (Wp≧Wn), the arbiter 143 detects the write enable signal Wen from the write address generator 146. If the write address is valid (Wen=1), and data can be output from the write buffer 142 (Wp≧Wn), the arbiter 143 issues a write request (PREQ=1, PNRW=1, PNUM=Wnum, PADD=Wad) to the arbiter 135.

Upon reception of a request signal PREQ from the image processing module 134, the arbiter 135 in the image processing apparatus discriminates a read/write with PNRW, and detects a word count with PNUM, and an address with PADD. If there is no request from the CPU 131 and other image processing modules, the arbiter 135 starts accessing the corresponding data in the RAM 137 through the RAM interface unit 136. Upon acceptance of a request, the arbiter 135 returns an acknowledgement signal PACK to the image processing module 134 as the request source. If requests are generated by the CPU 131 and other modules, the arbiter 135 accepts the requests in priority order.

Upon reception of the acknowledgement signal PACK from the arbiter 135, the arbiter 143 returns an acknowledgement signal Rack to the read address generator 144 as the request source if the request signal is a read request. Upon reception of the acknowledgement signal Rack, the read address generator 144 generates the next address. If the request address is the read end address, the read address generator 144 resets the read enable signal Ren, and outputs a read end signal Rend to the interrupt controller 145.

If the request signal is a write request, the arbiter 143 returns an acknowledgement signal Wack to the write address generator 146 as the request source. Upon reception of the acknowledgement signal Wack, the write address generator 146 generates the next address. If the request address is the write end address, the write address generator 146 resets the write enable signal Wen and outputs a write end signal Wend to the interrupt controller 145.

The interrupt controller 145 can set a read end interrupt mask and write end interrupt mask by using the above configuration register. If each interrupt mask is set to interrupt enable, the interrupt controller 145 generates an interrupt signal INT by using the read end signal Rend and write end signal Wend, and sends it to the CPU 131. Upon reception of the interrupt signal INT, the CPU 131 reads the status of the interrupt controller 145. If the interrupt cause is a read end, the CPU 131 resets the read end interrupt mask to cancel the interrupt. When the processing is to be continued, the CPU 131 sets a read start address and read end address again, and sets a read enable signal. After such processing, the CPU 131 sets the above read end interrupt mask.

Likewise, if the interrupt cause is a write end, the CPU 131 resets the write end interrupt mask and cancels the interrupt. When the processing is to be continued, the CPU 131 sets a write start address and write end address again, and sets a write enable signal. After such processing, the CPU 131 sets the above write end interrupt mask.

When data is read out from the RAM 137, the arbiter 135 returns a RAM data valid signal PVALID to the module as the request source. In the module as the request source, the arbiter 143 returns a data valid signal Rvalid to the read buffer 140. The read buffer 140 stores data on a RAM data output signal PDIN while the data valid signal Rvalid is set. With this operation, data in the RAM 137 is stored in the read buffer 140.

When data is to be written in the RAM 137, the arbiter 135 returns the RAM data valid signal PVALID to the module as the request source in synchronism with the write timing of the RAM 137. In the module as the request source, the arbiter 143 returns a data valid signal Wvalid to the write buffer 142. The write buffer 142 outputs data to be written on a RAM data input signal PDOUT while the data valid signal Wvalid is set. With this operation, data in the write buffer 142 is stored in the RAM 137.

When all data necessary for processing in the sub-module 141-1 are stored, the read buffer 140 sets a valid signal valid_0. If not all the data necessary for the processing in the sub-module 141-1 are stored, the read buffer 140 resets the valid signal valid_0. In addition, if a hold request signal stall_0 from the sub-module 141-1 is not set, the read buffer 140 outputs the stored data in synchronism with a clock. When the hold request signal stall_0 from the sub-module 141-1 is set, the read buffer 140 updates no data. The sub-module 141-1 receives only data for which the valid signal valid_0 is set. If data cannot be received, the hold request signal stall_0 is set to hold the output of the read buffer 137.

If the sub-module 141-1 need not permutate input data, a FIFO may be used as the above read buffer 140. Likewise, if there is no need to permutate output data, a FIFO may be used as the above write buffer 142.

As shown in FIG. 14, in this embodiment, the internal arrangement of the image processing modules 134 is constituted by one or more sub-modules 141-1 to 141-$n$, and data is transferred among the respective sub-modules by the same operation as described above (i.e., handshaking using a valid signal valid and hold request signal stall).

An image processing apparatus according to this embodiment is characteristic by including a storage means (e.g., the RAM 137) for storing image data, a plurality of image processing means (e.g., the image processing modules 134-1 to 134-$m$) for performing a series of processing of reading out image data from the storage means, performing predetermined image processing, and writing the processed image data in the storage means, an activation control means (e.g., the CPU 131) for activating a predetermined image processing means of the plurality of image processing means, and an access control means (e.g., the arbiter 135) for controlling access of the predetermined activated image processing means to the storage means. Each image processing means (the image processing modules 134) includes a first address generating means (e.g., the read address generator 144) for generating an address for reading out image data from the storage means, a first data holding means (e.g., the read buffer 140) for storing the image data read out from the storage means in accordance with the address, at least one second image processing means (e.g., the sub-modules 141-1 to 141-*n*) for processing image data, a second holding means (e.g., the write buffer 142) for storing the output data processed by the second image processing means on the last stage, a second address generating means (e.g., the write address generator 146) for generating an address for writing output data in the storage means, and a second access control means (the arbiter 143) for giving the access control means a request to access the storage means when image data can be stored in the first holding means or output data can be output from the second data holding means.

A characteristic feature of this embodiment is that when the image processing means finishes reading out image data from the storage means or finishes writing data in the storage means, an interrupt request signal is output, and the activation control means activates the next image processing means on the basis of the interrupt request signal.

This embodiment is characterized in that the image processing means further includes a request means (the interrupt controller 145) for outputting an interrupt request signal when a read or write of the last data from or in the storage means is finished.

In addition, the image processing apparatus according to this embodiment is characterized in that the first data holding means sets a valid signal when data can be output, the second data processing means receives only data for which a valid signal is set, the second data holding means sets a hold request signal when data cannot be input, and the second data processing means holds data output to the second holding means in which the hold request signal is held.

Furthermore, the image processing apparatus according to this embodiment is characterized in that when the image processing means includes a plurality of second image processing means, data input/output operation between the respective second image processing means is performed by using the above valid signal and hold request signal.

Note that the operation of the I/F between the image processing sub-modules in this embodiment is the same as that described with reference to the timing chart of FIG. 3 in the first embodiment.

In addition, the detailed arrangement and operation of each address generator (i.e., the read address generator 144 or write address generator 146) in each image processing module of the image processing apparatus according to this embodiment are the same as those described with reference to FIGS. 6, 7, and 8 in the first embodiment.

Note that in order to allow the respective image processing modules to share the interface, the data input of the read buffer and the data output of the write buffer are matched in advance with the RAM interface unit 136. If the bit count of the data line of each sub-module in each image processing module does not coincide with that of the RAM interface unit 136, data is converted through the sub-modules 141-1 to 141-*n*. Note that if a bypass mode of directly outputting input data to a sub-module is provided, unnecessary processing can be bypassed. At this time, unnecessary power consumption can also be saved by stopping the supply of clocks to the bypassed sub-module.

In addition, by setting all sub-modules after a given sub-module in the bypass mode, interim data can also be output. This makes it possible to additionally insert processing by another image processing module or sub-module between arbitrary sub-modules. In the prior art, when a sub-module needs to be added or modified, the overall image processing module become unusable However, by segmenting processing using the bypass mode, the image processing module can be effectively used.

Assume that an image processing module incorporates three sub-modules, i.e., sub-modules 1, 2, and 3, and the sub-module 2 is to be replaced with a sub-module 4. In this case, first of all, the image processing module is activated while the sub-module 2 and the subsequent sub-modules are set in the bypass mode. After processing in the sub-module 4 is performed, the image processing module is activated while the first and second sub-modules are set in the bypass mode. That is, the sub-module 1 is executed in the first step, the sub-module 4 is executed in the next step, and the sub-module 3 is executed in the last step. In this manner, processing by a sub-module in another image processing module can be added at an arbitrary position between sub-modules. In this case, since the processing results in the respective steps exist on the shared memory, added processing may be executed in the form of software processing by the CPU.

A method of segmenting image processing for the respective image processing module will be described next.

In the present invention, since data is transferred between image processing modules through a shared memory (e.g., the RAM 137), if the number of image processing modules increases, the bus occupancy ratio of the memory increases, and a memory access waiting state increases in frequency, resulting in a decrease in processing efficiency. If many processes are integrated in one image processing module, many local memories are required to extract (permutate) data. In addition, the usability of each image processing module deteriorates.

In this embodiment, therefore, an image processing module is segmented at a portion where data extraction (permutation) is required. More specifically, the module is segmented into five processing modules for (1) processing from JPEG decoding to rasterization, (2) noise reducing processing, (3) band data generation processing, (4) bitmap data generation processing, and (5) head data generation processing. The above five processes are pipelined to maintain coherency of band buffers and improve the processing efficiency.

Figure 22:
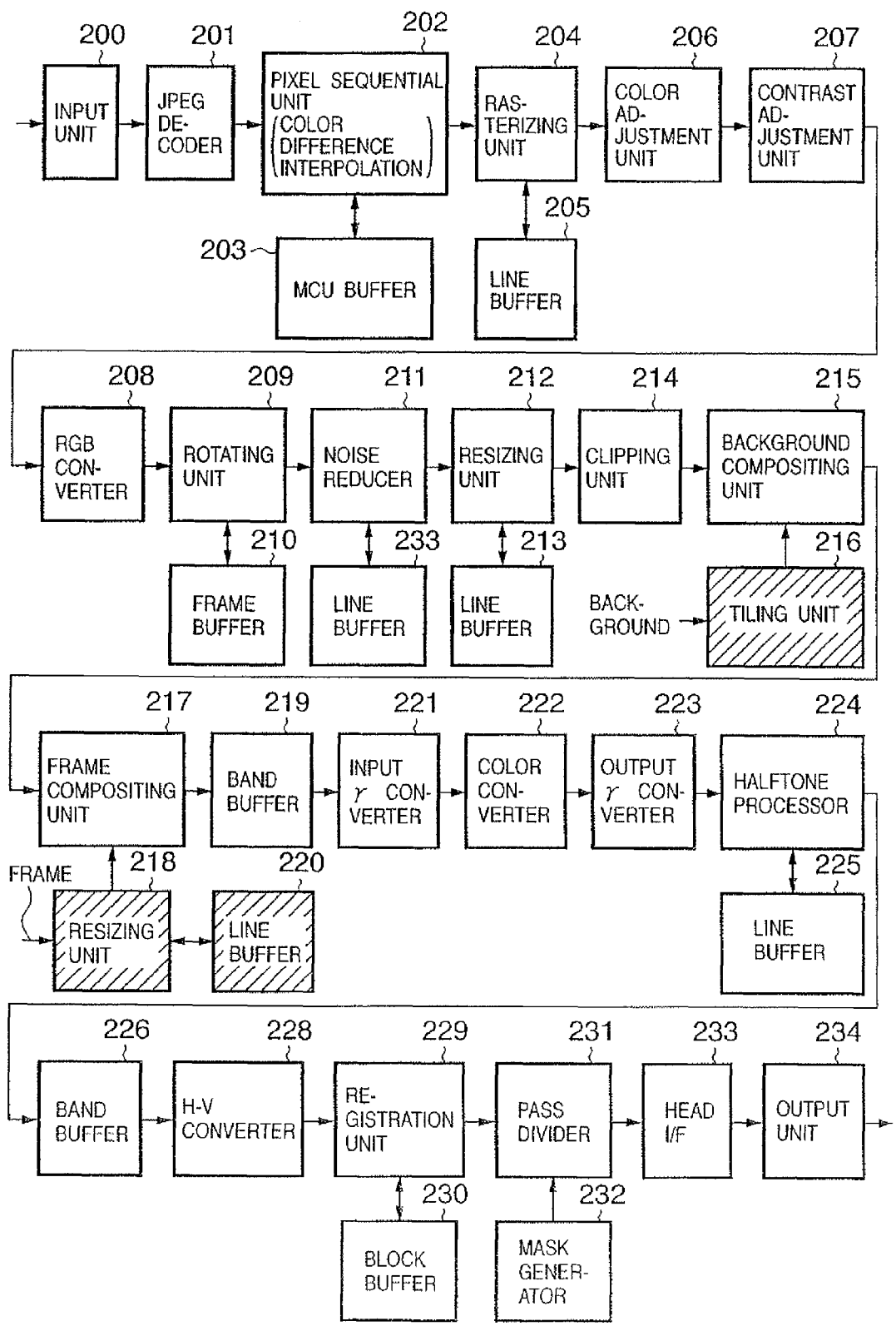
FIG. 22 is a block diagram showing the arrangement of a conventional image processor which performs image processing when image data taken by a digital camera is to be output by using a printer.

In this embodiment, data reduction processing is performed in upstream steps when possible to minimize the amount of access to the shared memory. More specifically, clipping for band extraction and reduction processing in resizing are executed as preprocessing in (1) the processing from JPEG decoding to rasterization. In addition, execution of rotation processing as preprocessing by using an MCU buffer will improve the continuity of access to the shared memory and increase the bus utilization ratio. Furthermore, buffers whose capacities are indefinite (e.g., the line buffers 205, 233, 213, 220, and 225, frame buffer 210, and band buffers 219 and 226 shown in FIG. 22) are formed on the shared memory, and the buffer capacities are optimized in accordance with processing contents.

The flow of image data processing in each image processing module will be described below.

Figure 15:
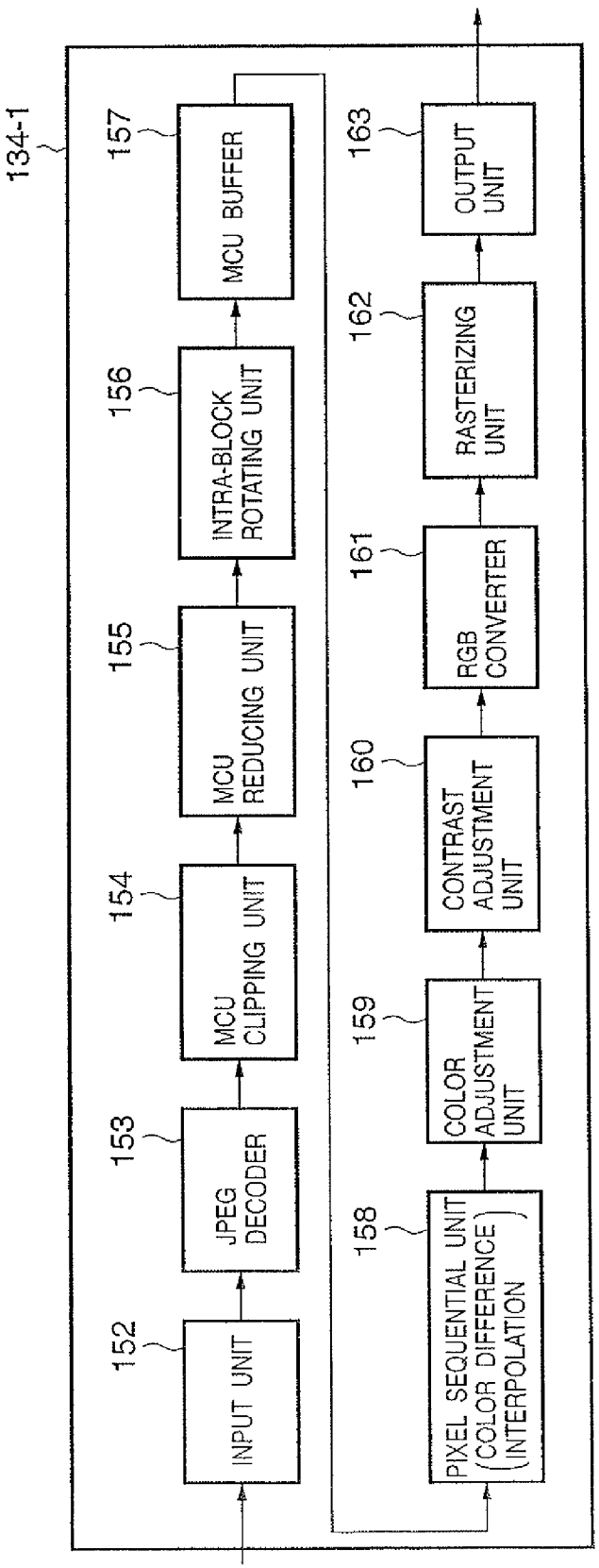
FIG. 15 is a block diagram for explaining the arrangement of an image processing module 134-1 according to the sixth embodiment of the present invention.

FIG. 15 is a block diagram for explaining the arrangement of the image processing module 1341 according to the sixth embodiment of the present invention. Referring to FIG. 15, reference numeral 152 denotes an input unit; 153, a JPEG decoder; 154, an MCU clipping unit; 155, an MCU reducing unit; 156, an intra-block rotating unit; 157, an MCU buffer; 158, a pixel sequential unit; 159, a color adjustment unit; 160, a contrast adjustment unit; 161, an RGB converter; 162, a rasterizing unit; and 163, an output unit. Assume that in order to save the capacity of the memory, the image processing module 134-1 having the above arrangement performs band processing in which part of a page is sequentially cut out on a band and processed.

First of all, JPEG compressed image data is input from the input unit 152 to the JPEG decoder 153, in which the data is decoded and output on an MCU basis. The MCU clipping unit 154 then determines the validity of data on an MCU basis on the basis of the trimming area and band processing area of the image, thereby outputting only MCU data in a valid area. The valid MCU data is reduced into a desired MCU size by the MCU reducing unit 155. The MCU reducing unit 155 reduces data in base of ⅛ or base of 1/16 (in the case of 4:2:0 sampling).

The reduced MCU data is stored at an address after rotation (mirror image) in the MCU buffer 157 upon generation of an address by the intra-block rotating unit 156. When all the data in the MCU are stored in the MCU buffer 157, the pixel sequential unit 158 simultaneously reads out the Y, Cr, and Cb data from the MCU buffer 157. In this case, if the Cr and Cb data are sub-sampled, they are interpolated at the time of pixel sequential processing. The parallel Y, Cr, and Cb data are subjected to color adjustment such as white balance adjustment in the color adjustment unit 159 and contrast adjustment in the contrast adjustment unit 160. The resultant data is further converted into RGB data by the RGB converter 161. The converted RGB data is output from the output unit 163 after address operation by the rasterizing unit 162, and stored in the RAM 137 in a rasterized form.

As described above, since permutation inside an MCU block is performed in the MCU buffer 157, the rasterizing unit 162 rasterizes the data by performing permutation on a block basis. Since this permutation on a block basis is realized by the write address generator 146 described above, the rasterizing unit 162 is a write address generator in effect. In addition, since the above intra-block rotation and pixel sequential processing are executed by addressing of the MCU buffer, the intra-block rotating unit 156, MCU buffer 157, and pixel sequential unit 158 are preferably integrated into a single sub-module. Note that when intra-block rotation processing is to be performed at the time of read operation of the block buffer, the intra-block rotating unit 156 is placed behind the MCU buffer 157.

When Cr and Cb color difference data are sub-sampled, interpolation in pixel sequential processing can be omitted by increasing the magnification of the MCU reducing unit 155 twice a luminance Y. In this case, the MCU reducing unit 155 may perform not only reduction processing but also enlargement processing, but the maximum resolution of the color difference Cr and Cb data is maintained (a deterioration due to reduction is minimized).

Note that the MCU reducing unit 155 is used to generate prescan data for color adjustment, an index image, and a resized image. When a low-magnification image such as an index image is to be generated, in particular, the amount of memory used can be greatly reduced by performing reduction in base of ⅛ or base of 1/16 in the MCU reducing unit 155. In generating an index image or resized image, rough reduction processing is performed in the MCU reducing unit 155, and fine adjustment is made in a resizing unit 168 (to be described later), thereby matching the image with a desired size while reducing the amount of memory used.

Figure 16:
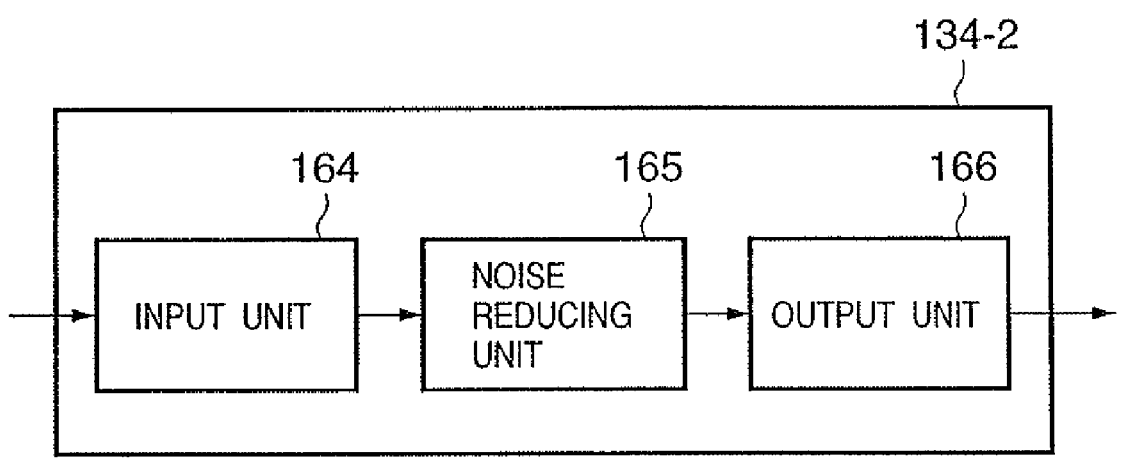
FIG. 16 is a block diagram for explaining the arrangement of an image processing module 134-2 according to the sixth embodiment of the present invention.

FIG. 16 is a block diagram for explaining the arrangement of the image processing module 134-2 according to the sixth embodiment of the present invention. Referring to FIG. 16, reference numeral 164 denotes an input unit; 165, a noise reducing unit; and 166, an output unit.

The noise reducing unit 165 reduces a noise component superimposed on image data (e.g., image data after processing by the image processing module 134-1) input through the input unit 164. The resultant image data is output from the output unit 166 to the memory.

In this case, as noise reducing algorithms, various schemes, e.g., a scheme using an edge retention type LPF (Low Pass Filter) or a scheme using a median filter, are proposed. Either of these schemes uses pixels in a target pixel neighborhood (processing window). Therefore, noise reducing can be done by operation of reading pixels in the above target pixel neighborhood using the input unit 164, i.e., address operation by the input unit 164, without using any line buffer.

Note that noise reducing processing is sequential processing to be done for each pixel, and hence cannot be directly linked with resizing processing which requires data corresponding to a plurality of lines. Therefore, this image processing module is exclusively used for noise reducing processing. If noise reducing processing need not be performed, since there is no need to activate this image processing module, the processing time and power consumption can be further reduced.

Figure 17:
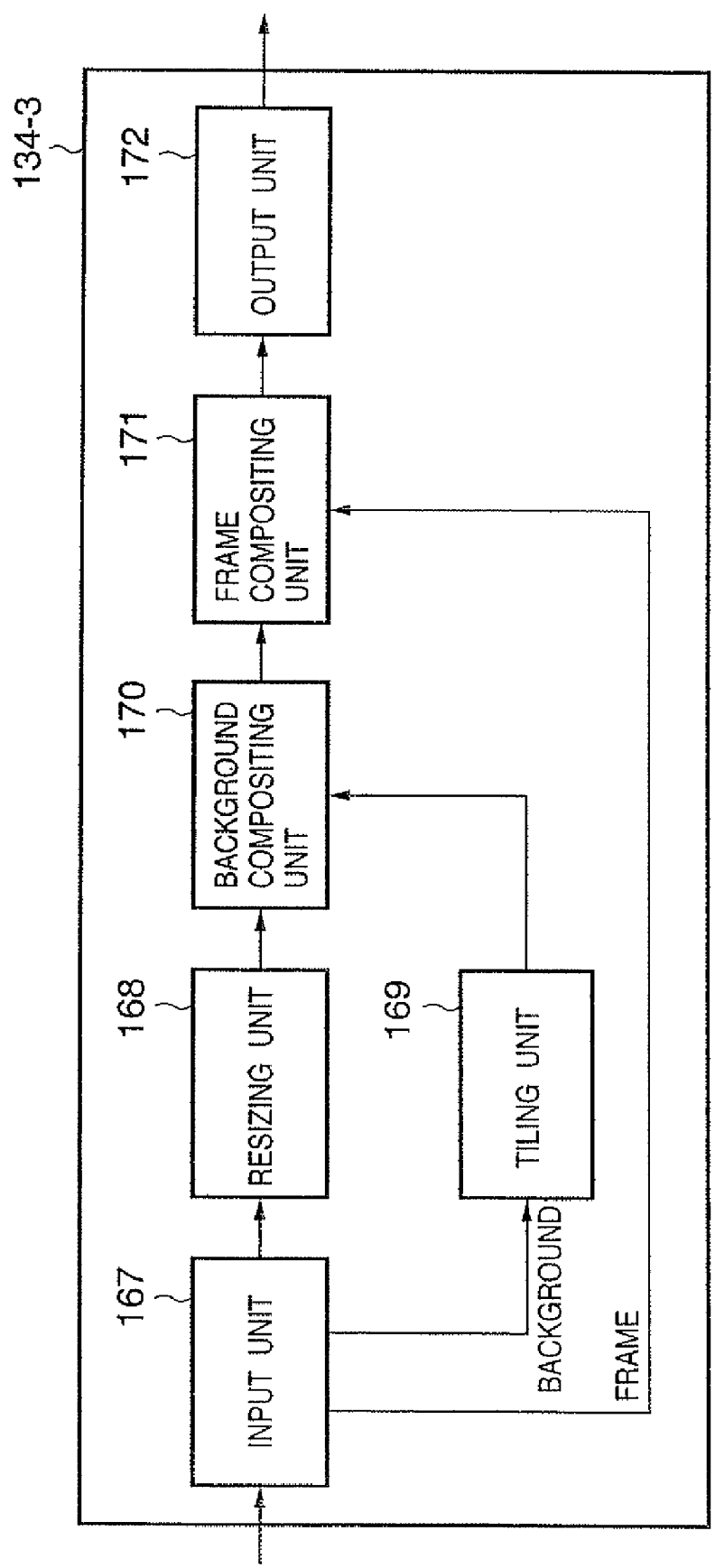
FIG. 17 is a block diagram for explaining the arrangement of an image processing module 134-3 according to the sixth embodiment of the present invention.

FIG. 17 is a block diagram for explaining the arrangement of the image processing module 134-3 according to the sixth embodiment of the present invention. Referring to FIG. 17, reference numeral 167 denotes an input unit; 168, the resizing unit; 169, a tiling unit; 170, a background compositing unit; 171, a frame compositing unit; and 172, an output unit. This image processing module having the above arrangement composites background and frame data.

Target pixel data and neighboring pixel data necessary for resizing processing are input to the resizing unit 168 through the input unit 167. The resizing unit 168 resizes the input image data in accordance with a layout size on a page. Meanwhile, background data are input to the tiling unit 169 through the input unit 167. The background data are then tiled. The background compositing unit 170 composites the image data after the resizing processing with the background data. Frame data is input to the frame compositing unit 171 through the input unit 167. The frame data is then composited with the image data. The resultant data is output from the output unit 172 to the memory. Band cutting (clipping) can be realized in the input unit 167 by reading out only pixels necessary for the processing.

Figure 18:
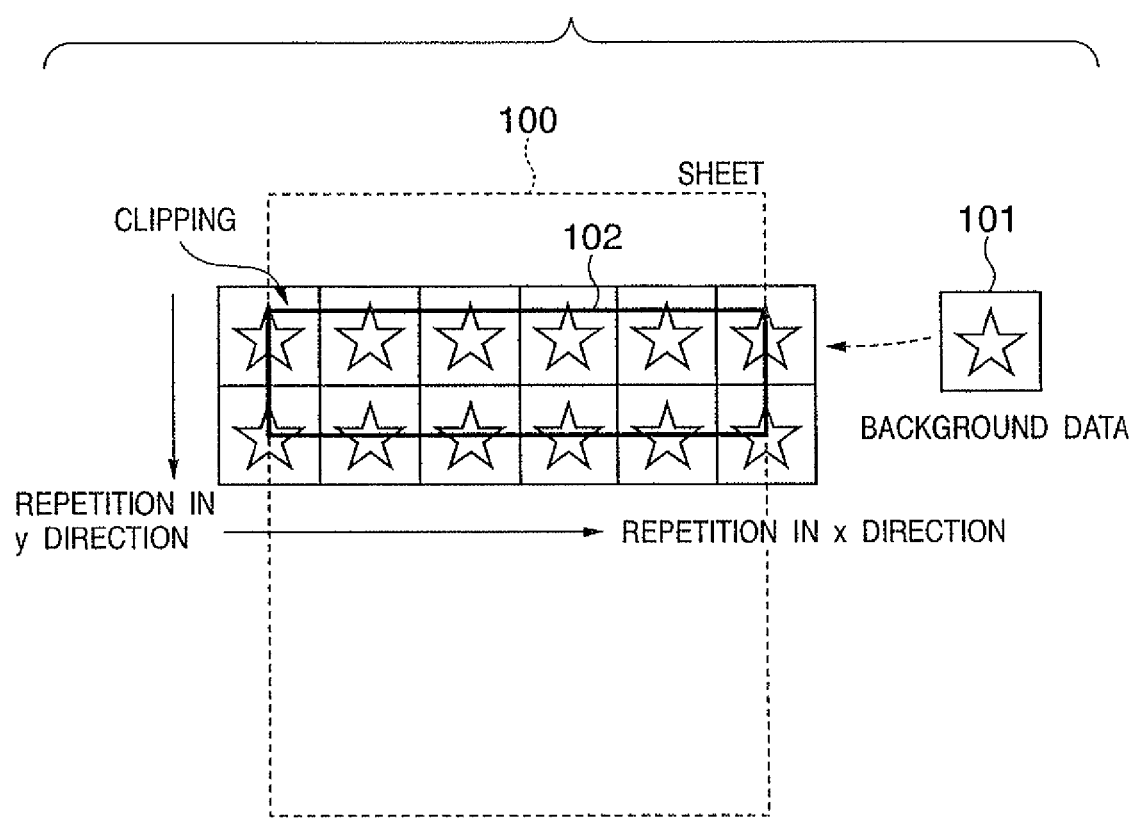
FIG. 18 is a view for explaining examples of tiling processing and clipping processing in the image processing module 134-3 according to the sixth embodiment of the present invention.

FIG. 18 is a view for explaining an example of tiling processing and clipping processing in the image processing module 134-3 according to the sixth embodiment of the present invention.

Background data 101 are tiled in a clipping effective area 102 (the band processing area enclosed with the thick line in FIG. 18) on a sheet 100. All these operations are executed by read operation from the shared memory. Letting Bw be the size of the background data 101 in the x direction, Bh the size in the y direction, and As be the start address of the background data, a read address Ar can be given as follows by using the values of two counters, i.e., a base-Bw counter Cx and base-Bh counter Cy:

$$Ar = As + Cy \times w + Cx \qquad (1)$$

In this case, by giving initial values to the two counters, an offset can be set at a repetitive start position, as shown in FIG. 18. In addition, clipping processing can be realized by reloading an initial value in the base-Bw counter and incrementing the base-Bh counter when the clipping effective area 102 is exceeded.

Figure 19:
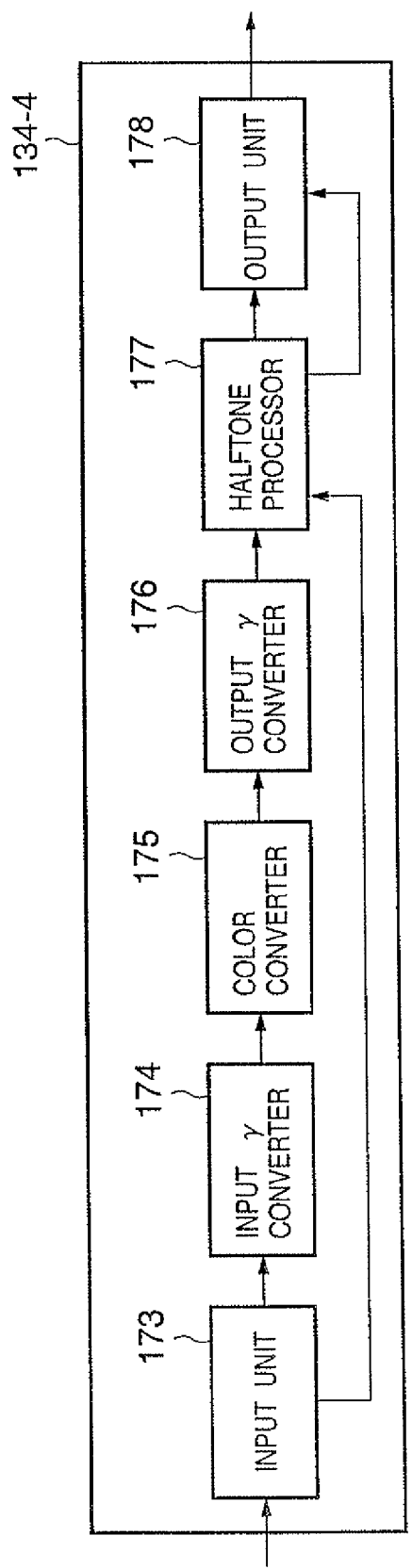
FIG. 19 is a block diagram for explaining the arrangement of an image processing module 134-4 according to the sixth embodiment of the present invention.

FIG. 19 is a block diagram for explaining the arrangement of the image processing module 134-4 according to the sixth embodiment of the present invention. Referring to FIG. 19, reference numeral 173 denotes an input unit; 174, an input γ converter; 175, a color converter; 176, an output γ converter; 177, a halftone processor; and 178, an output unit. This image processing module 134-4 performs bitmap generation processing.

Print data is read out by the input unit 173 and converted into density linear signal by the input γ converter 174. The print data converted into the density linear signal is converted into the density data (output device color) of the color material of the printer by the color converter 175. This data is subjected to output γ correction in the output γ converter 176. The resultant data is converted into bitmap data (dot pattern) by the halftone processor 177. This data is output from the output unit 178. In this case, if an error diffusion method is used for halftone processing of the image data, the quantization error of the preceding line is input to the halftone processor 177 through the input unit 173. In order to diffuse the quantization error into neighboring pixels, the quantization error is stored in the shared memory through the output unit 178. This forms an error buffer on the shared memory.

In order to reduce the processing amount (hardware amount), the color converter 175 outputs only one color material data. If, therefore, the printer uses four color materials C, M, Y, and K, 4-color bitmap data is generated by activating the image processing module 134-4 four times.

Figure 20:
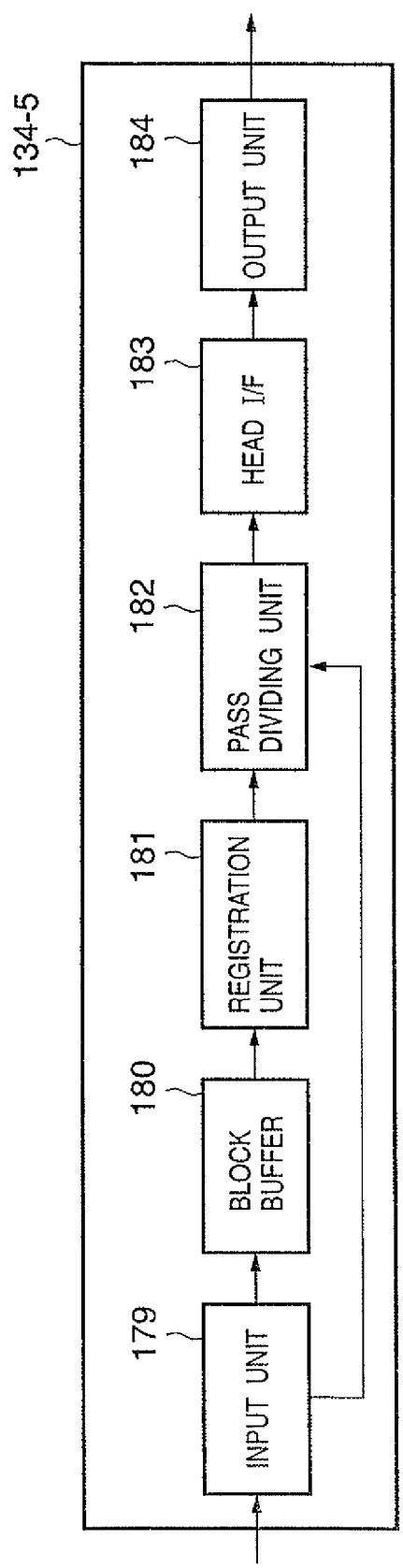
FIG. 20 is a block diagram for explaining the arrangement of an image processing module 134-5 according to the sixth embodiment of the present invention.

FIG. 20 is a block diagram for explaining the arrangement of the image processing module 134-5 according to the sixth embodiment of the present invention. Referring to FIG. 20, reference numeral 179 denotes an input unit; 180, a block buffer; 181, a registration unit; 182, a pass dividing unit; 183, a head I/F; and 184, an output unit. The image processing module 134-5 performs data processing of data to be output to the print engine.

First of all, when the print engine (not shown) is activated, the bitmap data is read out by the input unit 179 in accordance with an array of dot constituent elements (e.g., nozzles in the ink-jet scheme) of the head, and stored in the block buffer 180. The registration unit 181 extracts dot data corresponding to a dot constituent element array (nozzle array) of the head in synchronism with a sync signal from the print engine. In general, since bitmap data is stored with a plurality of dots in the scan direction of the head being one word, only predetermined bits in the block buffer 180 are selected and extracted. At this time, registration is performed by shifting the positions of simultaneously read bits for each dot constituent element array (nozzle array).

The pass dividing unit 182 divides the extracted dot data into a plurality of passes (scans) in accordance with mask data read out by the input unit 179. The divided dot data are converted into a transmission format for the head by the head I/F 183, and output from the output unit 184 to the head. By forming an output image using a plurality of passes (scans), dot kinks and dot position shifts due to mechanical precision are modulated (diffused) into high-frequency regions which is hard to perceive, thereby reducing streaks and unevenness at the time of printout.

As described above, according to the sixth embodiment, the above series of image processing is divided into a small number of processing blocks in consideration of access to input image data, and each processing block is formed into a module. Transfer of data among the respective modules is performed through a shared memory, thereby making the I/F of each image processing module versatile and facilitating addition/modification on an image processing module basis. In addition, unnecessary buffers, memories, and processing can be reduced.

In addition, by forming a buffer whose capacity is indefinite on the shared memory, optimization of a buffer capacity can be realized.

Furthermore, since the internal arrangement of each image processing module is constituted by a plurality of sub-modules, and the bypass mode is provided for the sub-modules, replacement of some sub-modules or addition of new processing can be easily done.

Moreover, by performing data reduction processing in upstream steps, the amount of access to the shared memory is greatly reduced. By performing processing so as to improve the continuity of addresses, the bus utilization ratio of the shared memory improves.

Seventh Embodiment

Figure 21:
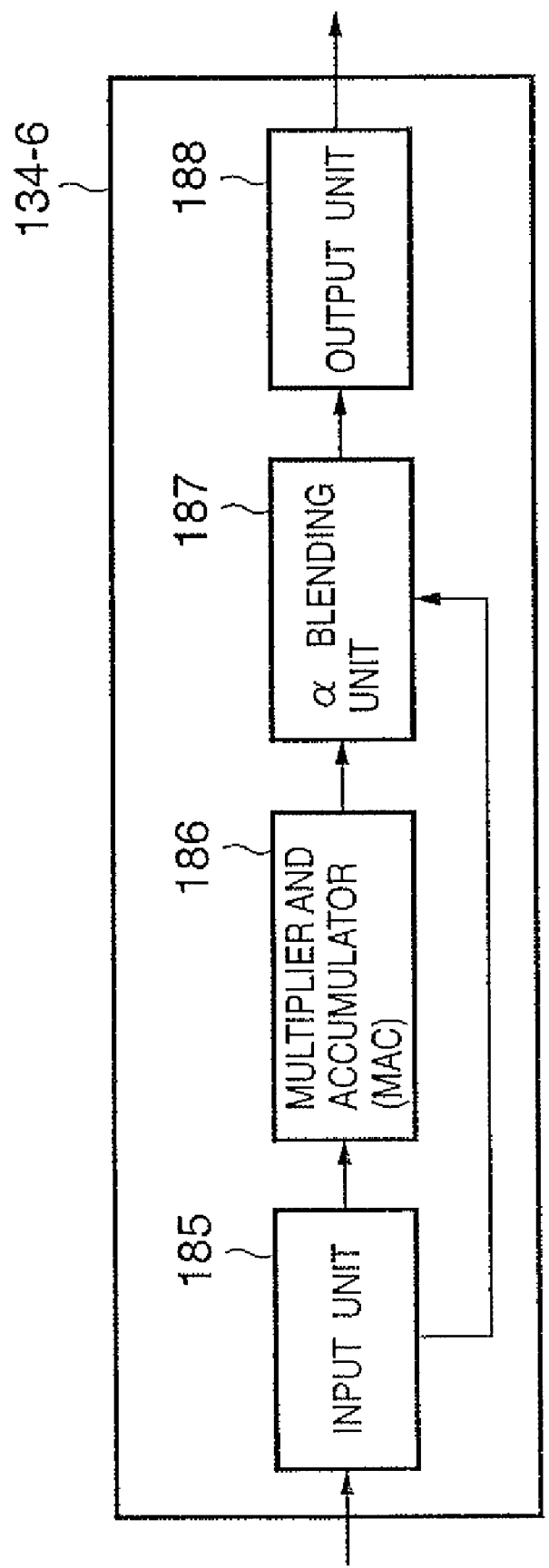
FIG. 21 is a block diagram for explaining the arrangement of an image processing module 134-6 in an image processing apparatus according to the seventh embodiment of the present invention.

FIG. 21 is a block diagram for explaining the arrangement of an image processing module 134-6 in an image processing apparatus according to the seventh embodiment of the present invention. Referring to FIG. 21, reference numeral 185 denotes an input unit; 186, a multiplier and accumulator (MAC) unit; 187, an α blending unit; and 188, an output unit. In this embodiment, the image processing in the image processing modules 134-2 and 134-3 in the image processing apparatus according to the sixth embodiment described above is implemented by using one image processing module 134-6. Therefore, a module count m in FIG. 21 is four.

A method of implementing the noise reducing function implemented by the image processing module 134-2 by using the image processing module 134-6 will be described first.

First of all, the input unit 185 extracts image data corresponding to the tap of an LPF (Low Pass Filter). The MAC unit 186 performs multiplying and accumulating for the pixel data on the tap and a tap coefficient. The α blending unit 187 determines an α value from the difference between an output (MAC output) from the MAC unit 186 and the target pixel data, and blends the MAC output and the target pixel data. The resultant data is then output from the output unit 188 to a shared memory.

The noise reducing unit 165 then compares the LPF output data with the original data. If the difference is small, the noise reducing unit 165 regards the corresponding portion as a flat portion and selects the LPF output. If the difference is large, the noise reducing unit 165 regards the corresponding portion as an edge portion and selects the original data. According to this method, the above LPF can be implemented by MAC of input data, and selection of the data can be implemented by α blending.

If, for example, the absolute difference value between input data and LPF output data is compared with a predetermined threshold, and the absolute difference value is equal to or more than the threshold, these data are blended while an input data coefficient and LPF output coefficient are set to 1 and 0, respectively. If the absolute difference value is less than the threshold, the data are blended while the input data coefficient and LPF output coefficient are set to 0 and 1, respectively. Alternatively, as the absolute difference value between input data and LPF output data decreases, the data may be blended such that the proportion of the LPF output increases.

A method of implementing the background compositing function of the image processing module 134-3 according to the sixth embodiment by using the image processing module 134-6 will be described next.

First of all, the input unit 185 extracts neighboring pixel data necessary for resizing processing. The MAC unit 186 performs multiplying and accumulating for the neighboring pixel data and an interpolation coefficient. That is, the MAC unit 186 operates as an interpolation filter. The input unit 185 inputs background pixel data to the α blending unit 187. The α blending unit 187 blends the output from the MAC unit 196 with the background pixel data by using the α value of the background pixel data. The output unit 188 then outputs the resultant data to the shared memory. As in the sixth embodiment, in this embodiment, tiling processing and clipping processing are implemented by memory access by the input unit 185.

A method of implementing the frame compositing function of the image processing module 134-3 according to the sixth embodiment by using the image processing module 134-6 will be described next.

First of all, the input unit 185 extracts neighboring frame pixel data necessary for frame resizing processing. The MAC unit 186 performs multiplying and accumulating for the neighboring frame pixel data and an interpolation coefficient. That is, the MAC unit 186 operates as an interpolation filter. In this case, the α value accompanying the frame pixel data is also interpolated. The input unit 185 also input pixel data to the α blending unit 187. The α blending unit 187 blends the output from the MAC unit 186 with the above pixel data by using the α value of the MAC output. The output unit 188 then outputs the resultant data to the shared memory. As in the sixth embodiment, in this embodiment, clipping processing is implemented by memory access by the input unit 185. This makes it possible to composite data while resizing frame data.

In this embodiment, therefore, when only noise reducing, compositing with only background data, or compositing with only frame data is to be performed in one band process, the image processing module 134-6 is activated once. When image data is to be composited with background and frame data, or image data is to be composited with background data upon noise reducing, or image data is to be composited with frame data upon noise reducing, the image processing module 134-6 is activated twice. When image data is to be composited with background and frame data upon noise reducing, the image processing module 134-6 is activated three times. If the image processing module 134-6 is activated once after data compositing, the compositing result can be tiled. That is, data can be composited in various patterns according to the activation sequences of the image processing module 134-6 according to this embodiment shown in FIG. 21.

As described above, since a plurality of functions can be implemented by making settings for one image processing module, various types of processing can be implemented by the activation sequences of the image processing module. This facilitates the optimization of a cost, performance, and power consumption.

Various types of image processing for an input image are divided into a plurality of processing blocks, and each processing block is formed into a module. Transfer of data among the respective modules is performed through a shared memory, thereby making the I/F of each image processing module versatile and facilitating addition/modification on an image processing module basis. In addition, unnecessary buffers, memories, and processing can be reduced.

Eighth Embodiment

An image processing apparatus according to the eighth embodiment of the present invention will be described below with reference to the accompanying drawings.

Figure 23:
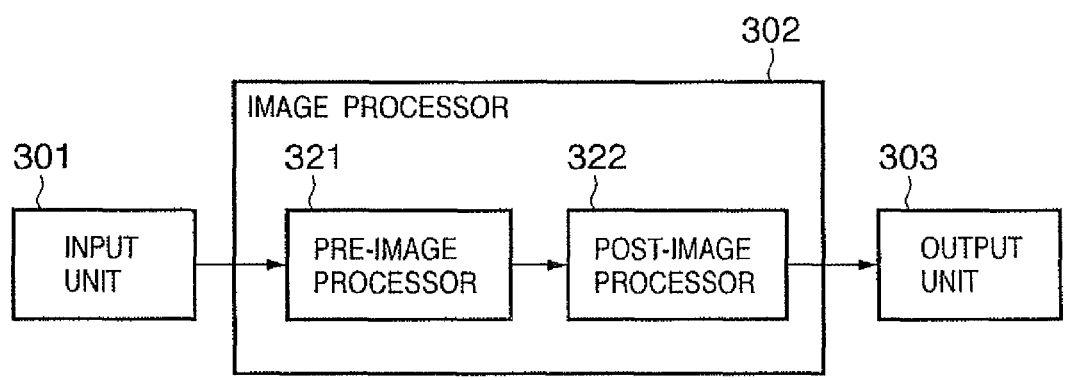
FIG. 23 is a block diagram for explaining an outline of an image processing apparatus according to the eighth embodiment of the present invention.

FIG. 23 is a block diagram for explaining an outline of the image processing apparatus according to the eighth embodiment of the present invention. Referring to FIG. 8, as image data input through an input unit 301, image data scanned within a predetermined size (e.g., 8×8 pixels) in the form of a block is input. Such data is generated when block-coded image data like JPEG data is decoded.

An image processor 302 is comprised of an image preprocessor 321 which is connected to the input unit 301 and rasterizes block-coded image data after performing various types of image processing for the blocked image data on a block basis, and a post-image processor 322 which performs image processing for the rasterized image data on a pixel basis. An output unit 303 is an output apparatus which is connected to the image processor 302 to output image data processed by the image processor 302 to the outside or store it in a storage device or the like. Note that the number of image processors in the image processor 302 is not limited to two as described above, and may be one or three or more. That is, the present invention is characterized by including a first image processing means (e.g., the image preprocessor 321) for executing image processing, for each predetermined block, with respect image data having undergone image processing. In addition, the present invention is characterized in that the second image processing means (e.g., the post-image processor 322) performs image processing for image data on a pixel basis.

Figure 24:
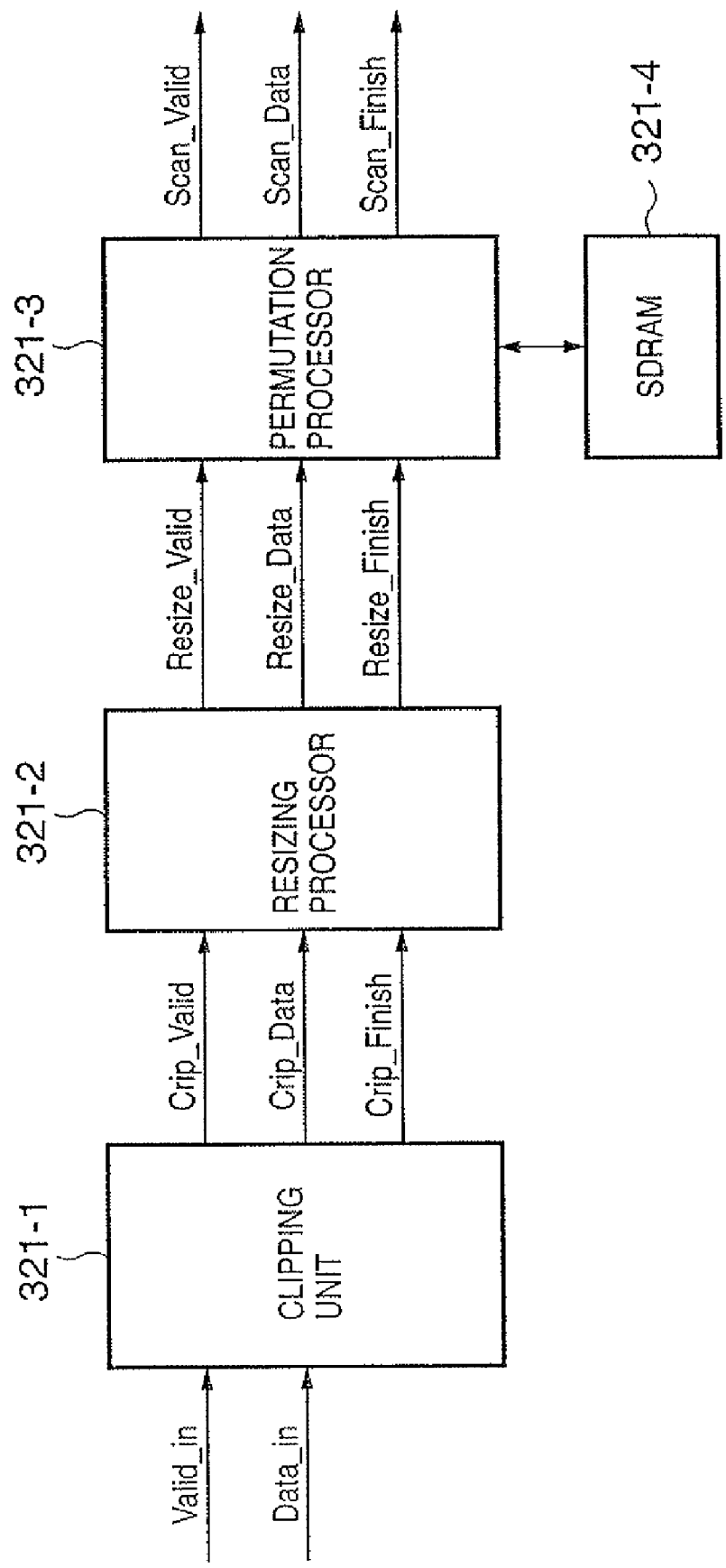
FIG. 24 is a block diagram for explaining the detailed arrangement of an image preprocessor 321 in FIG. 23.

FIG. 24 is a block diagram for explaining the detailed arrangement of the image preprocessor 321 in FIG. 23. As shown in FIG. 24, the image preprocessor 321 in this embodiment is comprised of a clipping unit 321-1 which designates a processing range from the range of input image data, a resizing processor 321-2 which resizes image data, a permutation processor 321-3 which permutates image data, and an SDRAM 321-4 which is used as a band buffer for rasterization.

Referring to FIG. 24, reference symbol Data_in denotes image data input to the clipping unit 321-1 which is the first processor; and Data, image data output from each processor. A term representing processing is attached to the front of "Data" representing output image data, for the sake of descriptive convenience. Reference symbol Valid_in denotes a valid signal associated with image data input to the clipping unit 321-1 which is the first processor; and Valid, a valid signal associated with image data processed by each processor. A term representing processing is also attached to the front of "Valid". The image preprocessor 321 according to this embodiment receives and processes input image data by using the input image data Data_in and the valid signal Valid_in associated with the input image data only when the input image is valid (valid signal Valid_in=H is input).

First of all, the input unit 301 in FIG. 23 inputs the image data Data_in and valid signal Valid_in to the clipping unit 321-1 of the image preprocessor 321. As described above, in this embodiment, input image data is block-coded image data. For example, image data is input as the image data Data_in to the clipping unit 321-1 on an 8×8 pixel block basis.

If the input image data is valid data, valid signal Valid_in=H is simultaneously input. Note that if the input image is invalid data, valid_in=L is input.

The clipping unit 321-1 determines on a block basis whether the input image data falls within a clipping range (clipping valid range). If it is determined that the input image data is valid data and falls within the clipping valid range, a valid signal (Crip_Valid=H) is output. If the image data falls outside the clipping valid range or is invalid data, no valid signal is output (Crip_Valid=L). Alternatively, if the image data falls outside the clipping valid range, another invalid signal may be output. With this operation of the clipping unit 321-1, the resizing processor 321-2 connected to the clipping unit 321-1 executes resizing for only a block determined as valid.

FIG. 25 is a schematic view for explaining clipping processing executed by the clipping unit 3211. As shown in 25A, the horizontal direction of image data is represented by X; and the vertical direction, Y. In this case, a clipping range is designated on a block basis as follows. Assuming that the clipping range is a rectangular area, the coordinates (XS, YS) of an upper left vertex Start_Point of the area are designated first. Likewise, the coordinates (XE, YE) of a lower right vertex End_Point of the rectangular area are designated. In this embodiment, the portion enclosed in the rectangular area that can be defined by these two points as shown in 25A is clipped and a valid signal Crip_Valid is output with respect to the block in this range. Note that a method of designating a clipping range is not limited to the above method, and a start point (or end point) and a size (width and height) may be used. Alternatively, block-basis clipping parameters may be generated from pixel-basis clipping parameters.

A block shape used for clipping processing in this embodiment is not limited to a square shape like that shown in 25A, and a horizontally oriented block like that shown in 25B or a vertically oriented block like that shown in 25C may be used. That is, this embodiment can be applied to an arbitrary block shape.

As described above, for blocked image data like a JPEG image on a DCT block (8×8 pixel) basis, clipping is performed on a block basis by the first clipping processing to reduce output pixels on a block basis, and the second clipping processing is performed in the subsequent image processing to realize clipping on a pixel basis. This clipping unit 321-1 determines on a block basis whether image data is valid or invalid data, and only the valid data is processed by the subsequent processors, thereby reducing unnecessary processing in the subsequent processing. This make it possible to reduce the overall image processing load.

When an output from the image preprocessor 321 is to be stored in a buffer, in particular, the buffer capacity can also be reduced. Note that since clipping is performed on a block basis, parameters such as the number of pixels in a block become the same throughout all the blocks, and no processing is added for clipping, including subsequent processing. In addition, since clipping processing is performed by operating a valid signal as described above, the interface (I/F) in the subsequent processing need not be modified. Note that in this embodiment, a clipping end signal (Crip_Finish) is transferred to the subsequent processing with the latency in each processing being compensated for to finish the subsequent processing at a proper timing. With this arrangement, the timing of the last pixel in the last processing can be detected, and hence unnecessary processing (time) can be reduced by notifying the CPU of the end of the last processing by using an interrupt signal or the like.

The resizing processor 321-2 performs resizing (resolution conversion) for a block corresponding to the valid signal Crip_Valid. In this embodiment, the resizing processor 321-2 reduces a block size. For example, the resizing processor 321-2 changes an 8×8 pixel block into a 4×4 pixel block. That is, the resizing processor 321-2 reduces output pixels by reducing a block size. Since resizing is performed within a block, simple resizing can be done. Assume that an input image is input in the form of a block having a size of 8×8 pixels. In this case, there are only eight block sizes after resizing: 8×8, 7×7, 6×6, 5×5, 4×4, 3×3, 2×2, and 1×1, and hence a coefficient can be easily generated. In addition, the same reducing circuit can be used in both the horizontal direction and the vertical direction, and no line memory is required. Note, however, that when linear interpolation is to be performed, a register corresponding to the number of pixels of a block in the horizontal direction is required between a reducing circuit in the horizontal direction and a reducing circuit in the vertical direction.

When image data is to be reduced to a size of 7×7 pixels or less, the resizing processor can be pipelined by invalidating a valid signal output (Resize_Valid=L) at a proper timing. That is, when pipelining is implemented, although an unnecessary signal is generated at a predetermined timing, pixel reducing processing can be easily executed by only invalidating a valid signal (Resize_Valid=L). With this operation, control based on reduction ratios can be implemented by only switching coefficients and valid signal outputs. This makes it possible to simplify the processing.

Resizing of image data can be easily realized by performing resizing in a block in accordance with the block size of input image data. Obviously, higher resolution conversion (resizing for enlargement) can be performed by the post-image processor 322 or the like. If the resizing block is valid image data, resizing image data Resize_Data_out and a valid signal Resize_valid associated with the image data are output to further reduce data to be permutated next. Note that resizing in the direction of enlargement is not executed because the number of output pixels increases.

In permutation processing in the permutation processor 321-3, formation of Y, Cr, and Cb parallel (pixel sequential) signals, rotation and rasterization processing are performed. In general, in block coding, in order to improve coding efficiency, data is coded after it is converted into luminance data Y and color difference data CrCb. Therefore, the luminance data and CrCb color difference data are input to the permutation processor 321-3 in this embodiment in block order. In order to convert YCrCb data into RGB data in the subsequent stage, the YCrCb data must be converted into parallel data. In this embodiment, conversion of YCrCb data into parallel data, intra-block rotation, and intra-block rasterization are simultaneously performed by using the buffer for the conversion of YCrCb data into parallel data.

First of all, when Y block data is input, it is stored in a Y block buffer (not shown). When Cr block data is input, it is stored in a Cr block buffer (not shown). When Cb block data is input, it is stored in a Cb block buffer (not shown). These data are then converted into parallel data by simultaneously reading them out from the Y, Cr, and Cb block buffers at the same pixel positions. If the luminance data Y and CrCb color difference data differ in their sampling rates, data with a lower sampling rate (color difference data in general) is interpolated and the resultant data is output. If such data is constituted by a plurality of blocks, the data is rasterized while the blocks are coupled to each other, and the resultant data is output.

Rasterization of the overall image is done when it is stored in a band buffer (formed on the SDRAM 321-4). Assume that in this case, the above YCrCb pixel sequential data is converted into RGB data first, and then the resultant data is stored in the band buffer. The image data having undergone intra-block coding and conversion of the YCrCb data into parallel data (pixel sequential data) is stored at a corresponding position in the band buffer in the form of a block. As a result, the rasterized image within the clipping range is stored in the band buffer.

Assume that rotation processing of image data is to be done concurrently with the execution of rasterization. In this case, after intra-block rotation is executed in the block buffer, data may be stored in the band buffer while the start address of a block is changed in accordance with the rotation mode. When intra-block rotation is executed in advance in the block buffer, differences between write sequences with respect to the band buffer depending on rotation modes concentrate on only settings of the start address of each block. The post-image processor 322 and the like can therefore execute image processing by using RGB pixel sequential image data having undergone rasterization and rotation processing.

Figure 26:
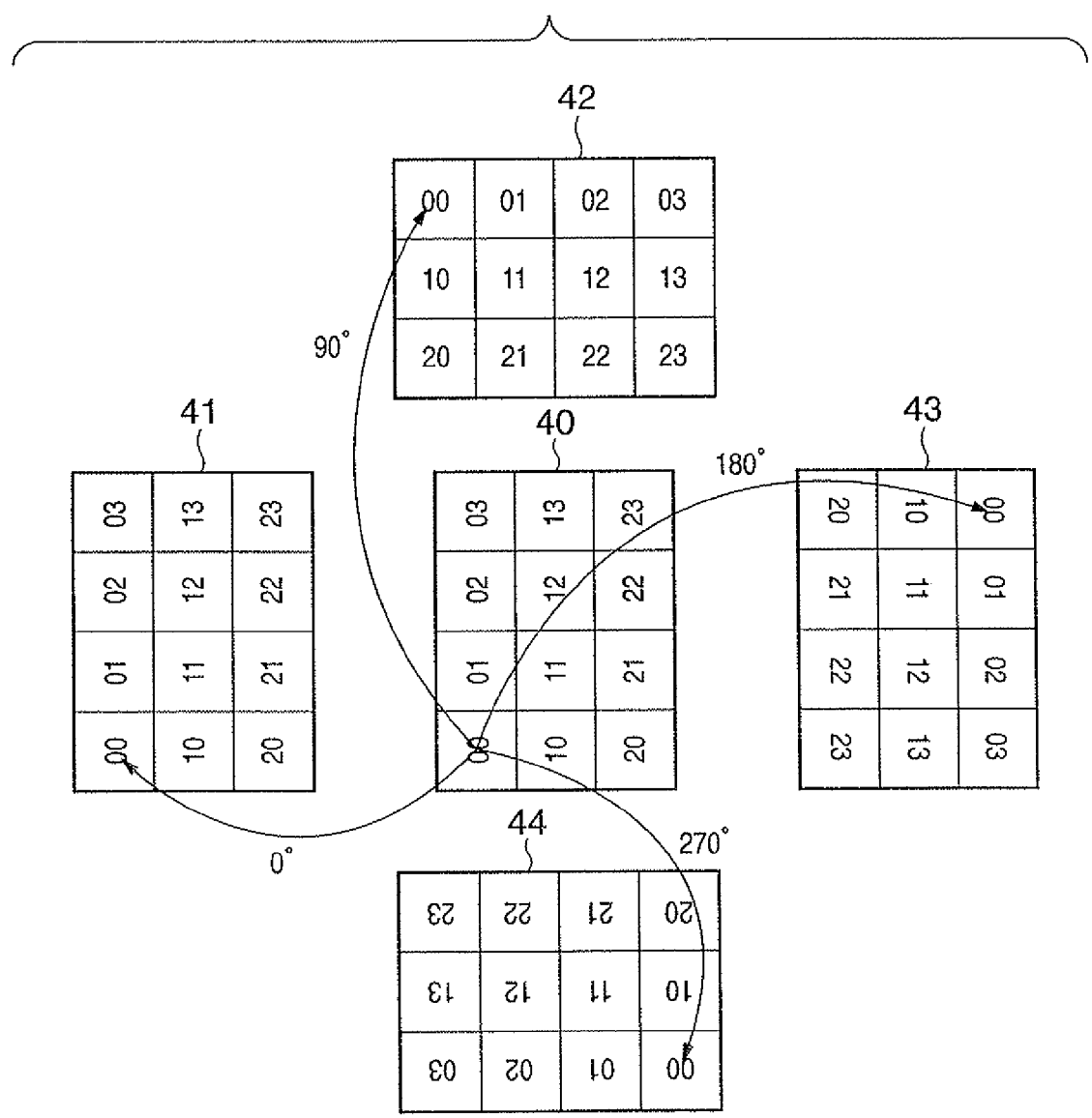
FIG. 26 is a schematic view for explaining rotation processing performed by a permutation processor 321-3.

FIG. 26 is a schematic view for explaining rotation processing done by the permutation processor 321-3. FIG. 26 shows an example of rotation processing in which image data is rotated through four angles, i.e., 0°, 90°, 180°, and 270°, respectively. The image data used in these examples is 4×3 block image including 4-block horizontal components and 3-block vertical components. As indicated by these examples, permutation (rotation) processing on a pixel basis can be executed in the same manner as permutation (rotation) processing on a block basis.

As shown in FIG. 26, in an image 40 to be subjected to permutation (rotation) processing, a number is assigned to each block in the image. The right and left numerals of each number represent the X and Y components of the image, respectively. That is, a block with X=0 and Y=0 is represented by "00", and a block shifted by one in the X direction, i.e., the block right adjacent to block 00 is expressed by "01".

When permutation processing with a rotation angle of 0° is executed for the image 40, an image 41 having the same arrangement as that of the image 40 is stored in, for example, the SDRAM 321-4.

When permutation with a rotation angle of 180° is done, block 00 located at the upper left in the image 40 must be moved to the lower right position, as indicated by an image 43. As indicated by this image 43, all the blocks from block 00 to block 23 are moved. In the cases of rotation angles of 90° and 270°, similar processing is performed on a block basis to obtain images 42 and 44. Note that in the cases of 90° and 270°, the vertical and horizontal sizes are exchanged.

Figure 27:
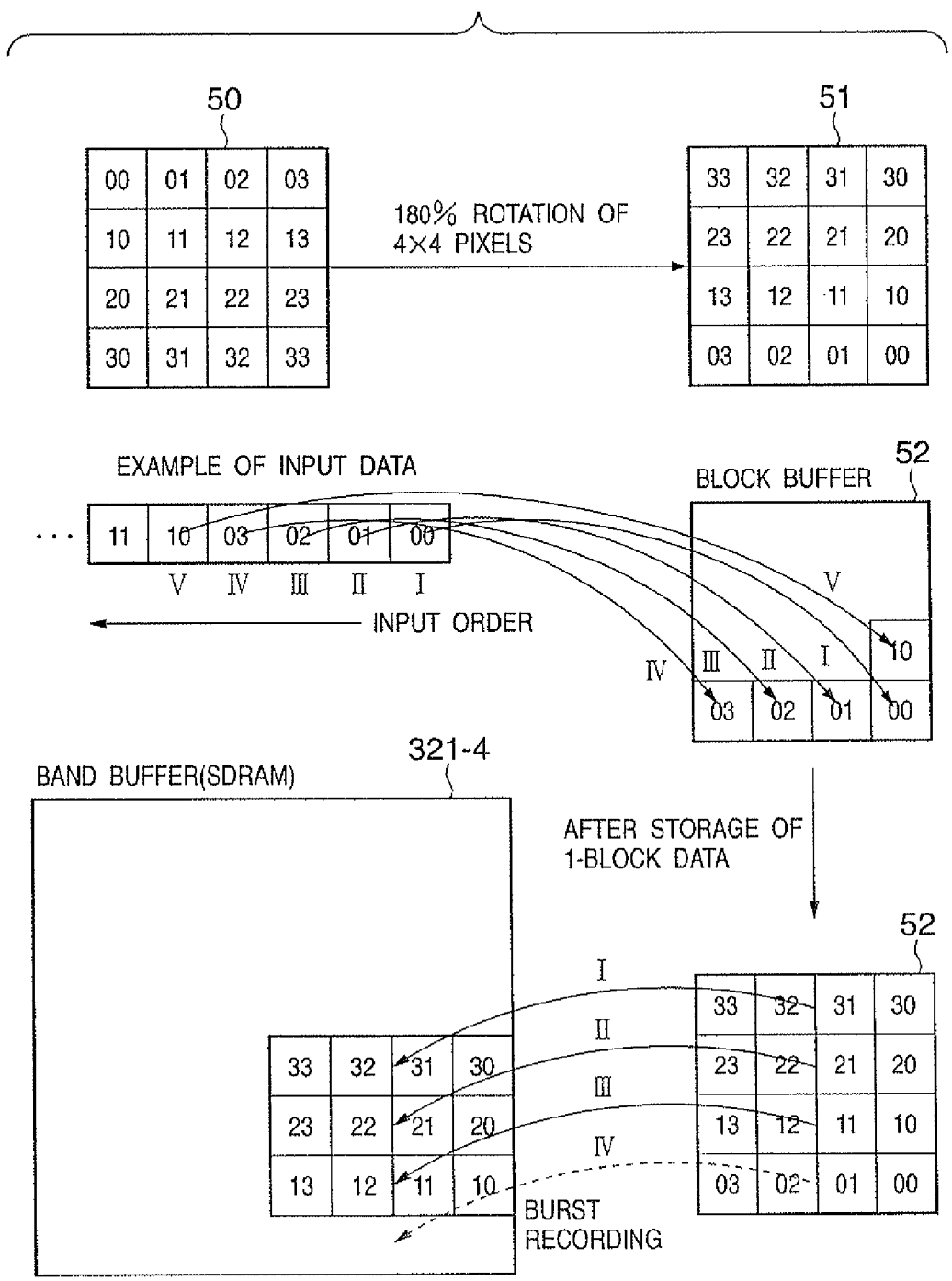
FIG. 27 is a view for explaining a detailed example of processing by the permutation processor 321-3 in the first embodiment.

Processing in the permutation processor 321-3 will be further described below. FIG. 27 is a view for explaining a detailed example of the processing operation of the permutation processor 321-3 in the eighth embodiment. The reason why an increase in transfer efficiency can be attained by improving the address continuity of image data will be described with reference to FIG. 27. Assume that the permutation processor 321-3 generates an image 51 by rotating an image 50 constituted by 4×4 pixel blocks through 180°. According to conventional processing, addresses corresponding to the positions in the image 51 are generated in input pixel order. When, therefore, the image data is recorded on the SDRAM 321-4, since addresses are set in a reducing direction, the burst mode cannot be used, and the SDRAM 321-4 is accessed pixel by pixel, resulting in very poor transfer efficiency.

In this embodiment, image data having undergone rotation processing is temporarily stored in a block buffer 52. This makes it possible to simultaneously record, on the SDRAM 321-4, a plurality of data (four data in FIG. 27) which are continuous in the direction in which addresses increase. That is, 16 accesses per block in the prior art can be reduced to four accesses per block. The address continuity is improved by performing permutation processing in a block. This makes it possible to improve the transfer efficiency.

Figure 28:
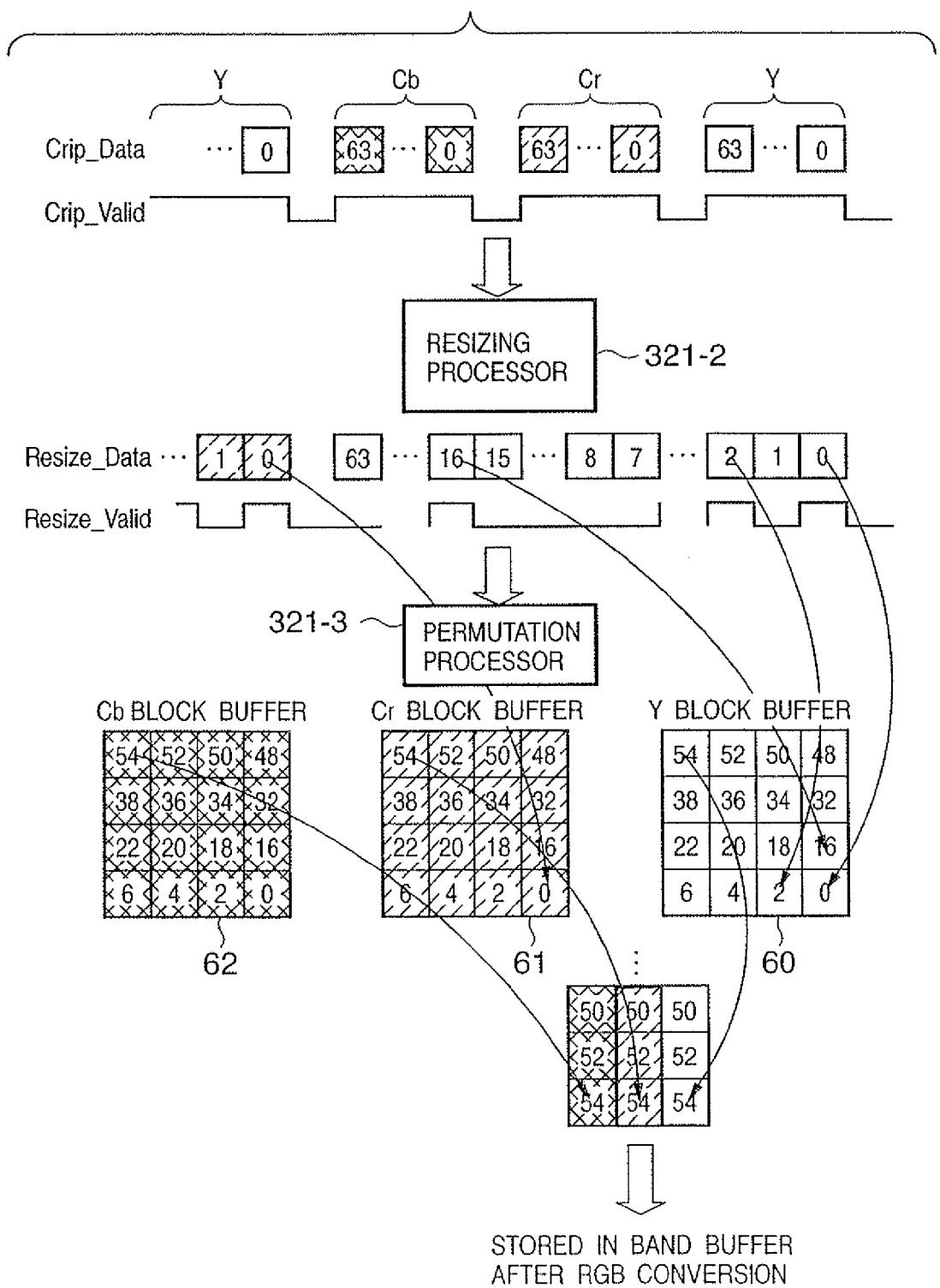
FIG. 28 is a view for explaining in detail resizing processing and permutation processing after clipping processing.

FIG. 28 is a view for explaining in detail resizing processing and permutation processing after clipping processing. Assume that image data having each block constituted by 8×8 pixels is input to the resizing processor 321-2, and is to be converted into blocks each having a size of 4×4 pixels by resizing. Assume also that the permutation processor 321-3 performs permutation processing of 180° rotation.

First of all, data having each block constituted by 8×8 pixels (0 to 63) are sequentially input to the resizing processor 321-2, together with the valid signal Crip_valid, starting from the 0th data of the luminance signal Y. The resizing processor 321-2 performs resizing to convert the data into image data having each block constituted by 4×4 pixels. The above permutation processing is performed for the converted image data, and the resultant data are temporarily stored in a Y block buffer 60, Cr block buffer 61, and Cb block buffer 62, respectively. When 1-block YCrCb data is stored, the data are sequentially read out from the Y block buffer 60, Cr block buffer 61, and Cb block buffer 62, starting from the first data of each buffer, and converted into RGB data. The RGB data are then stored at corresponding addresses in the band buffer, thereby completing the permutation.

The order of the respective processes in the image processor 302 described above is arbitrary. Any of the processes may be omitted. In addition, a mode (through mode) of outputting an input signal without any change in each process may be provided to allow arbitrary selection of execution of each process.

In the above embodiment, the apparatus using a storage device such as an SDRAM has been described above by taking a blocked image like block coding as an example. This may be implemented by software processing.

As described above, according to a characteristic feature of the present invention, an image processing apparatus having an image processing means for executing image processing with respect to image data for each predetermined block includes a determination means for determining on a block basis whether image processing is performed for image data, and the image processing means performs image processing for the image data of a block for which the execution of image processing is determined.

In addition, the present invention is characterized by including a designation means (e.g., the clipping unit 321-1) for designating a range in which image processing is executed for image data. The present invention is also characterized by including a resolution conversion means (e.g., the resolution conversion processor 321-2) for converting image data into data having a predetermined resolution. The present invention is further characterized by including a permutation means (e.g., the permutation processor 321-3) for permutating the position of each block constituting image data to a predetermined position.

Furthermore, the present invention is characterized in that input image data is JPEG decoded data before rasterization, and a block used for image processing is a block (8×8 pixels or MCU) used when JPEG decoding is performed. The present invention is characterized in that image data is MPEG decoded data before rasterization, and a block used for image processing is a block (8×8 pixels or MB) used when MPEG decoding is performed.

Figure 30:
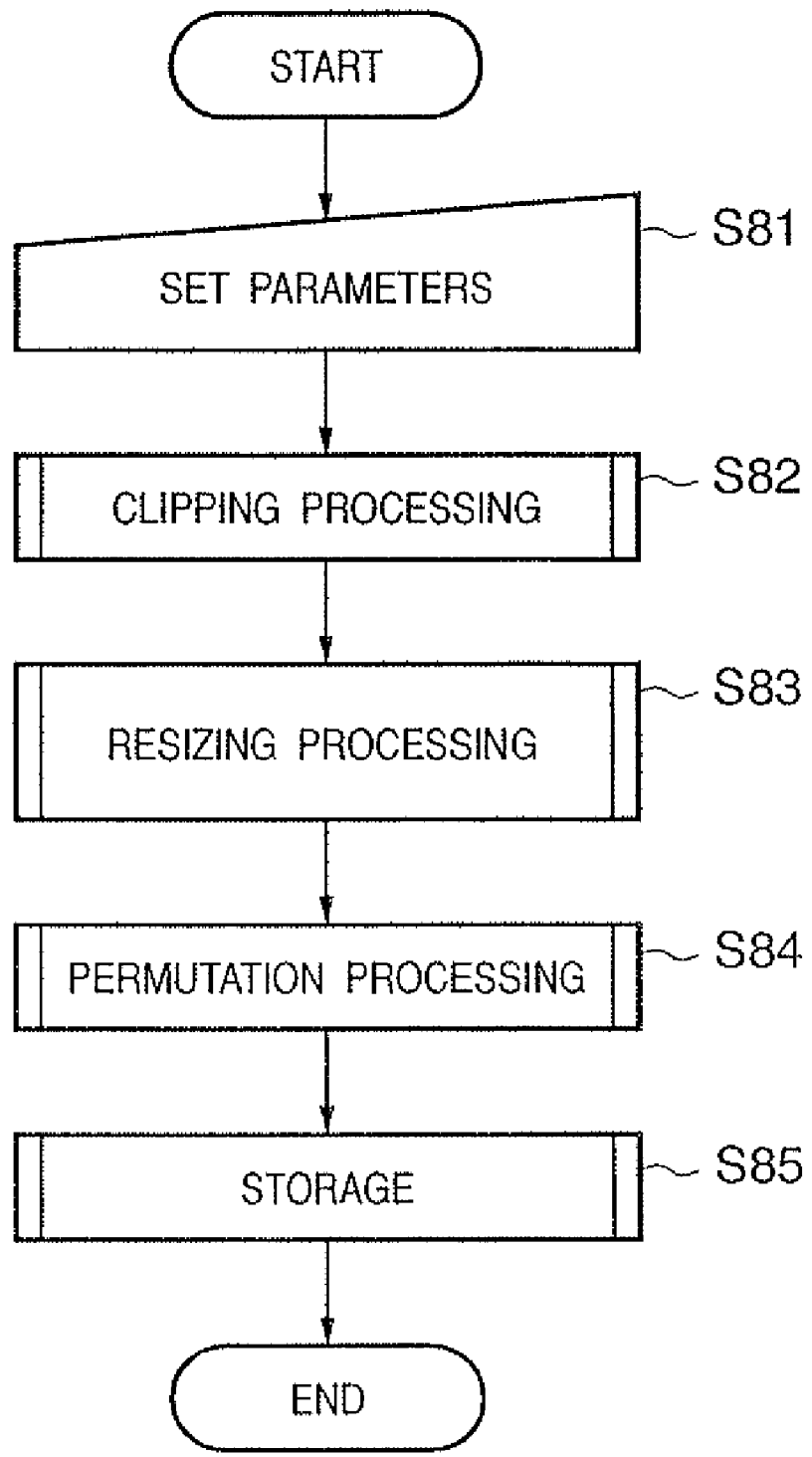
FIG. 30 is a flow chart for explaining an operation procedure of the image processing apparatus according to the eighth embodiment.

The processing operation of the image processing apparatus having the above arrangement will be described next. FIG. 30 is a flow chart for explaining a procedure executed by the image preprocessor 321 in the eighth embodiment.

First of all, image data as a processing target is input through the input unit 301 of the image processing apparatus, and parameters necessary for each image processing operation described above are set by using an operation unit or the like (not shown) (step S81). In this case, parameters in image processing include a range in which an image is clipped, a size for resize processing, a rotation mode necessary for permutation processing, a sampling mode (4:4:4, 4:2:2, 4:2:0, or the like in JPEG), an area for an output band buffer, and the like.

Figure 31:
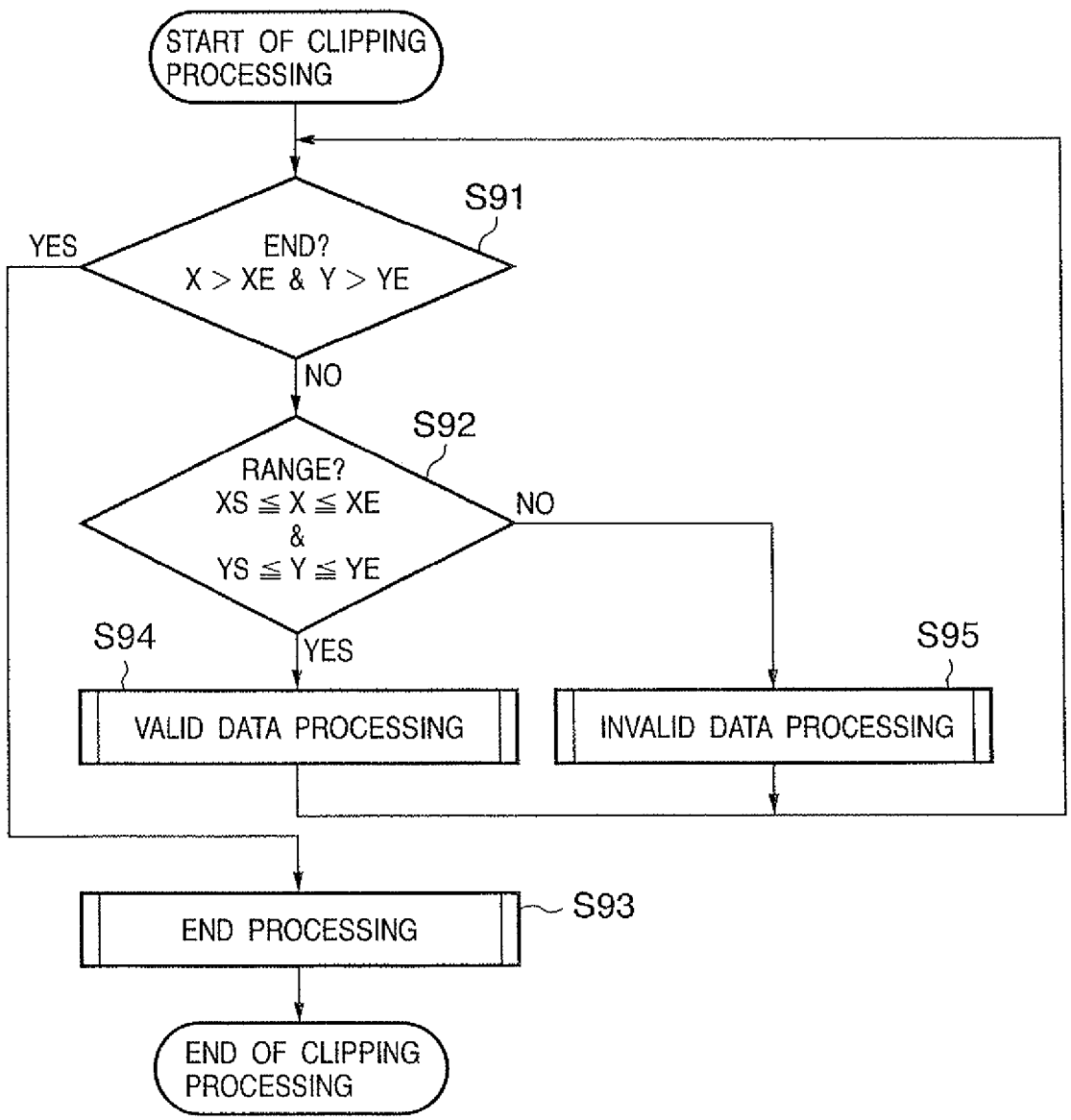
FIG. 31 is a flow chart for explaining in detail a clipping procedure in step S82.

The clipping unit 321-1 then performs clipping processing for the input image data (step S82). FIG. 31 is a flow chart for explaining in detail the clipping processing in step S82.

Consider a case wherein the start and end points of a clipping range are designated as (XS, YS) and (XE, YE), respectively, as shown in FIG. 25. As described above, in the present invention, clipping is performed on a given block basis. Note that finer clipping can be done in the subsequent processor. This block unit may be a unit of 8×8 pixels which is a DCT block or an MCU unit as an integration of Y, Cr, and Cb data in the case of JPEG data. By performing clipping processing on a block basis, the amount of data stored in the band buffer can be reduced. This makes it possible to reduce the load necessary for the processing by the post-image processor 322 and increase the processing speed of the overall image processing apparatus.

In step S91, it is checked whether clipping processing is finished. If the rectangular area defined by the start point (XS, YS) and end point (XE, YE) is designated as a clipping range, and the coordinates X and Y of an input image block exceeds the range defined by XE and YE (YES), since this indicates the input image block has exceeded the clipping range, the processing is finished (step S93). With this end processing, the subsequent processing in the image preprocessor 321 can be finished by transferring, to the post-image processor 322, a designation indicating the end (this activates the post-image processor 322) or an end signal (Crip_Finish).

If it is determined in step S91 that the clipping processing has not been finished (NO), it is checked whether the designated range falls within the clipping range (step S92). If it is determined that the designated range falls within the clipping range (YES), valid data processing is performed to indicate to the subsequent image processor (resolution conversion processing in step S83 in this case) that the input image is valid data (step S94). If it is determined in step S92 that the input image falls outside the valid range (NO), it is indicated that the data is invalid data (step S95). Note that invalid data processing may be performed by outputting no signal and the like to the subsequent image processor. When valid data processing step S94 and invalid data processing step S95 for the input block are finished, the flow returns to step S91 to repeat the above operation to determine the next block.

Figure 32:
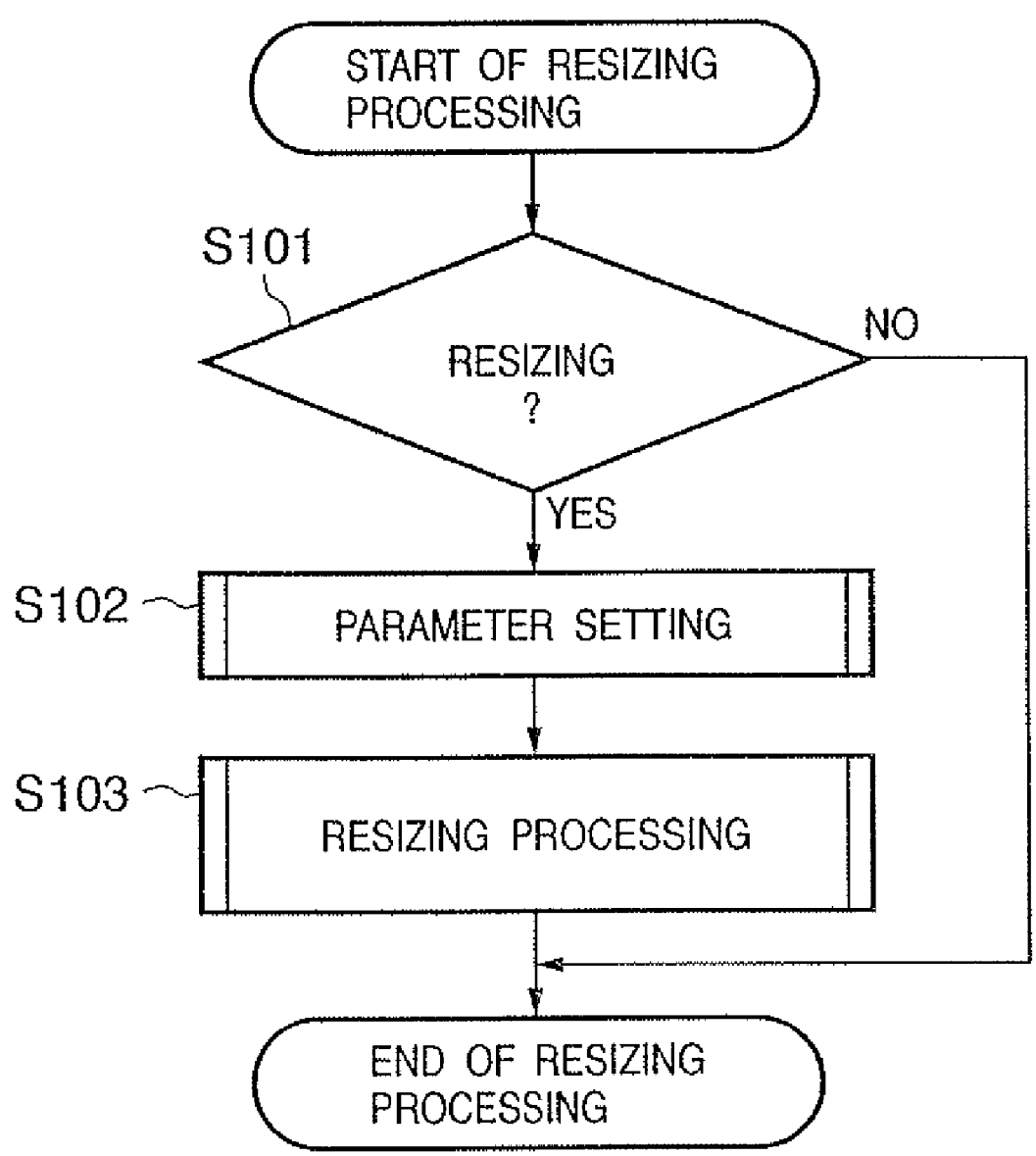
FIG. 32 is a flow chart for explaining in detail resizing processing executed in step S83.

Resizing processing is performed for a block which is determined as valid in the clipping processing in step S82 (step S83). FIG. 32 is a flow chart for explaining in detail the resizing processing performed in step S83. First of all, in the resizing processor 321-2, it is checked whether resizing is to be done (step S101). If it is determined that no resizing is to be done (NO), the processing is terminated without performing resizing processing, and the input image data is transferred to the subsequent image processor without any change. If it is determined that resizing is to be done (YES), parameters are set for resizing (step S102). Resizing processing is performed in accordance with the set parameters, and sub-sampling processing, linear interpolation processing, and the like are performed to reduce the size of the image data to a desired size (step S103). Note that parameter setting step S102 may be omitted by performing resizing processing determination step S101 in accordance with the size after the resizing processing which is set in parameter setting step S81 in FIG. 30. If, for example, the horizontal size of a block of an input image is 8, and the horizontal size after resizing is less than 8, resizing is performed. In this case, if the horizontal size after resizing is a parameter for resizing, and is set to, for example, 4, an 8×8 pixel block is reduced to a 4×4 pixel block by resizing.

After resizing processing is performed in step S83, the permutation processor 321-3 performs permutation (rotation or the like) processing in a block (step S84). The processed image data is then stored in the SDRAM 321-4 (step S85). The execution of permutation processing in step S84 facilitates address generation at the time of storage, and allows data to be stored in plurality of pixels (burst write) instead of single pixels (single write), thus increasing the access time per pixel.

If a storage destination is an SDRAM, the transfer efficiency can be increased by improving the continuity of write addresses for the SDRAM. If accesses are generated by many bus masters as in a case wherein a storage destination is a main memory in an embedded device, the influences not only on image processing in the post-image processor 322 but also other processing can be reduced by increasing the access efficiency.

Take a JPEG image as an example. Clipping on a pixel basis or more detailed resizing processing in the post-image processor, and the like can be easily performed by roughly cutting data on a block basis in clipping processing as in this embodiment, performing resizing for a cut block, and storing the block as rasterized RGB pixel sequential data.

That is, an image processing apparatus according to the present invention is characterized by including a condition setting means for setting conditions for image processing of image data, a designation means for designating a range in which image processing is executed for image data, a resizing means for converting image data into data having a predetermined size, a permutation means for permutating the order of blocks constituting image data, and a recording means for recording the permutated blocks at predetermined positions in a recording device.

As described above, the execution of clipping processing, resizing processing, and permutation processing on a block basis can reduce the load on the subsequent processor as well as facilitating the processing operation itself. In addition, when image data is stored during each processing, the capacity required for the storage of such data can also be reduced.

Furthermore, since the data have already been permutated on a block basis, addresses for a storage destination and the like can be easily generated, and a plurality of data can be stored as continuous data at once, resulting in an increase in transfer efficiency.

Ninth Embodiment

Figure 33:
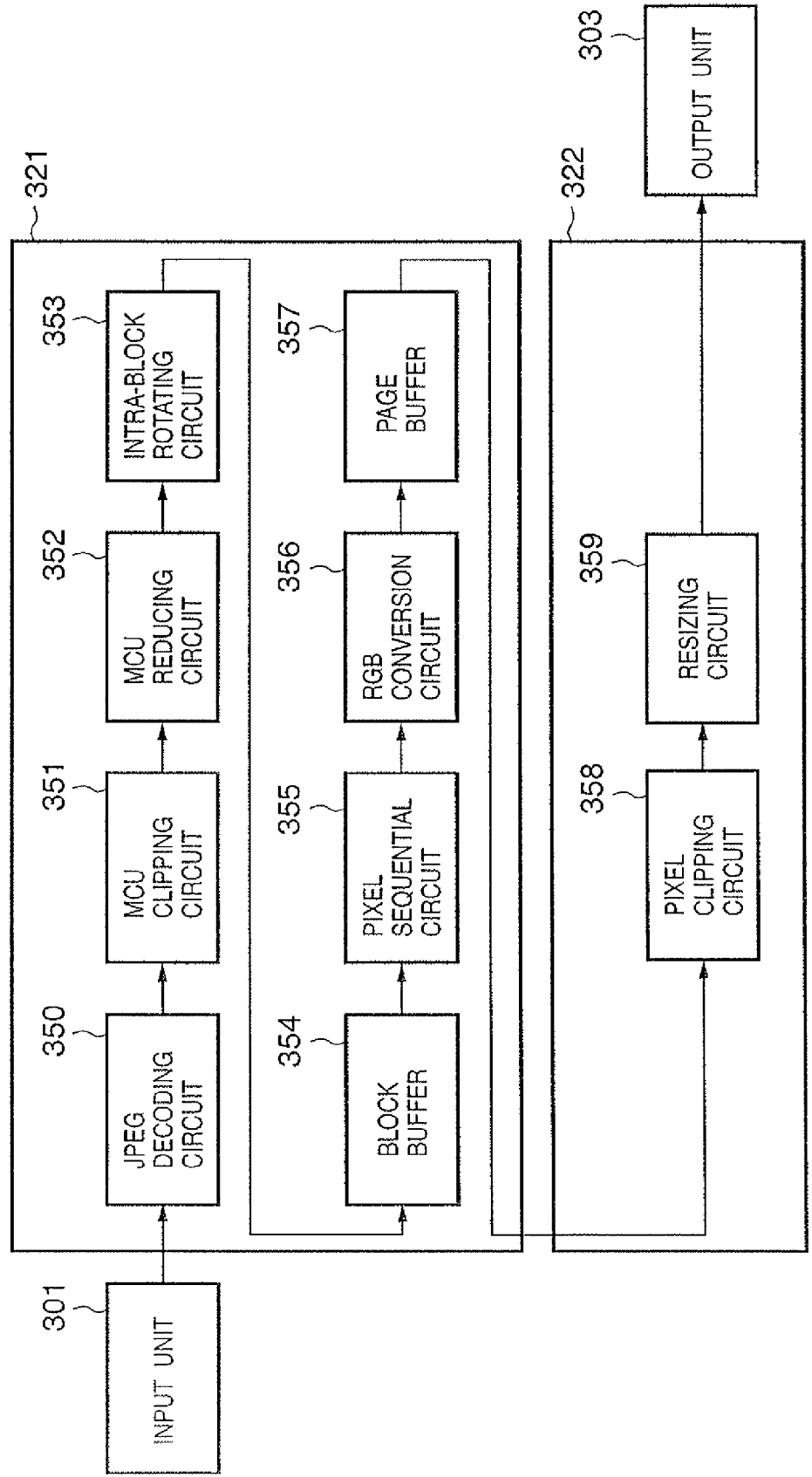
FIG. 33 is a block diagram showing the arrangement of an image processing apparatus according to the ninth embodiment of the present invention.

FIG. 33 is a block diagram showing the arrangement of an image processing apparatus according to the ninth embodiment of the present invention. Referring to FIG. 33, reference numeral 350 denotes a JPEG decoding circuit; 351, an MCU clipping circuit; 352, an MCU reducing circuit; 353, an intra-block rotating circuit; 354, a block buffer; 355, a pixel sequential circuit; 356, an RGB conversion circuit; 357, a page buffer; 358, a pixel clipping circuit; and 359, a resizing circuit. Only a portion different from the eighth embodiment will be described below.

JPEG compressed image is input to the JPEG decoding circuit 350 through an input unit 301. This image is decoded and output on an MCU basis. The MCU clipping circuit 351 determines the validity of data on an MCU basis. The MCU reducing circuit 352 reduces a valid MCU to a desired size. This MCU is then stored at a predetermined position in the block buffer 354 after rotation when an address is generated by the intra-block rotating circuit 353. When data corresponding to one MCU is stored in the block buffer, the pixel sequential circuit 355 simultaneously reads out Y, Cr, and Cb data from the block buffer 354. The RGB conversion circuit 356 then converts these data into RGB data. Note that when the Cr and Cb data have been sub-sampled, the data are interpolated in pixel sequential processing. The resultant data are output. The converted RGB data are stored at addresses corresponding to a rotation mode in the page buffer 357 on an MCU basis.

When data corresponding to one page are stored in the page buffer 357, the RGB data are read out from the page buffer 357, starting from the page top, in synchronism with a sync signal from a print engine (not shown). The pixel clipping circuit 358 clips a pixel that has not been clipped by the MCU clipping circuit 351. The resizing circuit 359 converts the clipped data into data having a desired size. This data is output from an output unit to the print engine.

Detailed operation will be described next.

Figure 34:
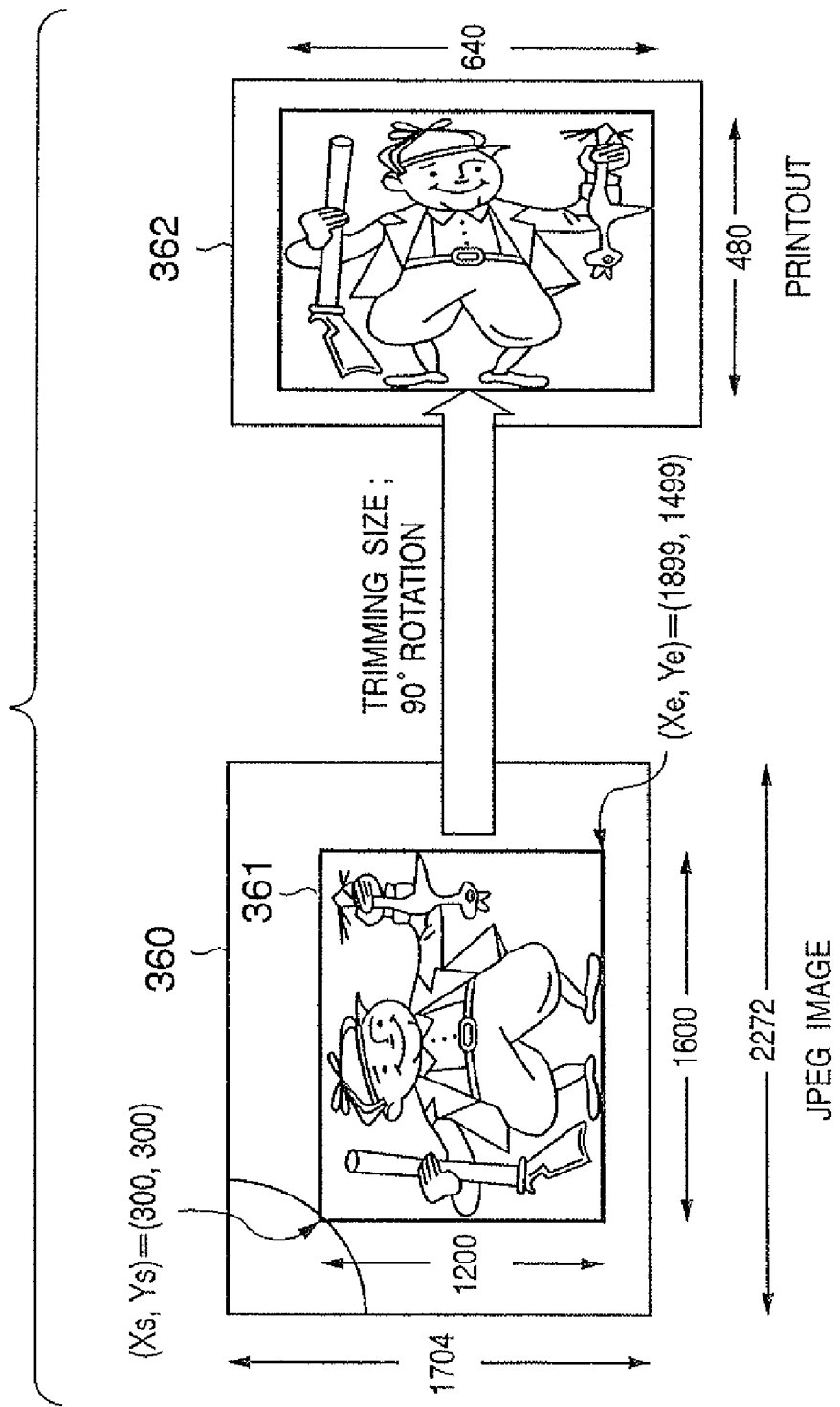
FIG. 34 is a view for explaining a detailed example of image processing by the image processing apparatus according to the ninth embodiment.

FIG. 34 is a view for explaining in detail image processing by the image processing apparatus according to the ninth embodiment. Assume that in this embodiment, a 1-page image constituted by 680×480 pixels is output by a printer by trimming 1,600×1,200 pixels from a JPEG image constituted by 2,272×1,704 pixels in the 4:2:2 sampling mode, as shown in FIG. 34. Assume that the trimming range is a rectangular range (including a boundary) defined by a start point (300, 300) and an end point (1899, 1499) when the upper left vertex is represented by (0, 0).

Since the sampling mode is 4:2:2, the MCU size becomes 16×8. Therefore, the number of MCUs in the horizontal direction is 2,272/16=142, and the number of MCUs in the vertical direction is 1,704/8=213 (each may be constituted by eight bits). A horizontal MCU counter in the MCU clipping circuit 351 is set to 142 as a base. Since the start and end coordinates of the trimming range are set to (300, 300) and (1899, 1499), respectively, an MCU valid range is defined by start coordinates (XS, YS)=(18, 37) and end coordinates (XE, YE)=(119, 187). Note that since a trimming region does not always coincide with an MCU boundary, the start point (XS, YS) is rounded down, and the end point (XE, YE) is rounded up. More specifically, XS is set to the value obtained by a shift to the right by four bits, YS is set to the value obtained by a shift to the right by three bits, XE is set to the sum of the value obtained by a shift to the right by four bits and the OR (0 or 1) of lower four bits before the shift, and YE is set to the sum of the value obtained by a shift to the right by three bits and the OR of lower three bits before the shift.

The MCU clipping circuit 351 compares (XS, YS)=(18, 37) and (XE, YE)=(119, 187) with the MCU counter value, and set the above valid signal Crip_Valid at "H" only for an MCU that falls within the valid range.

Figure 35:
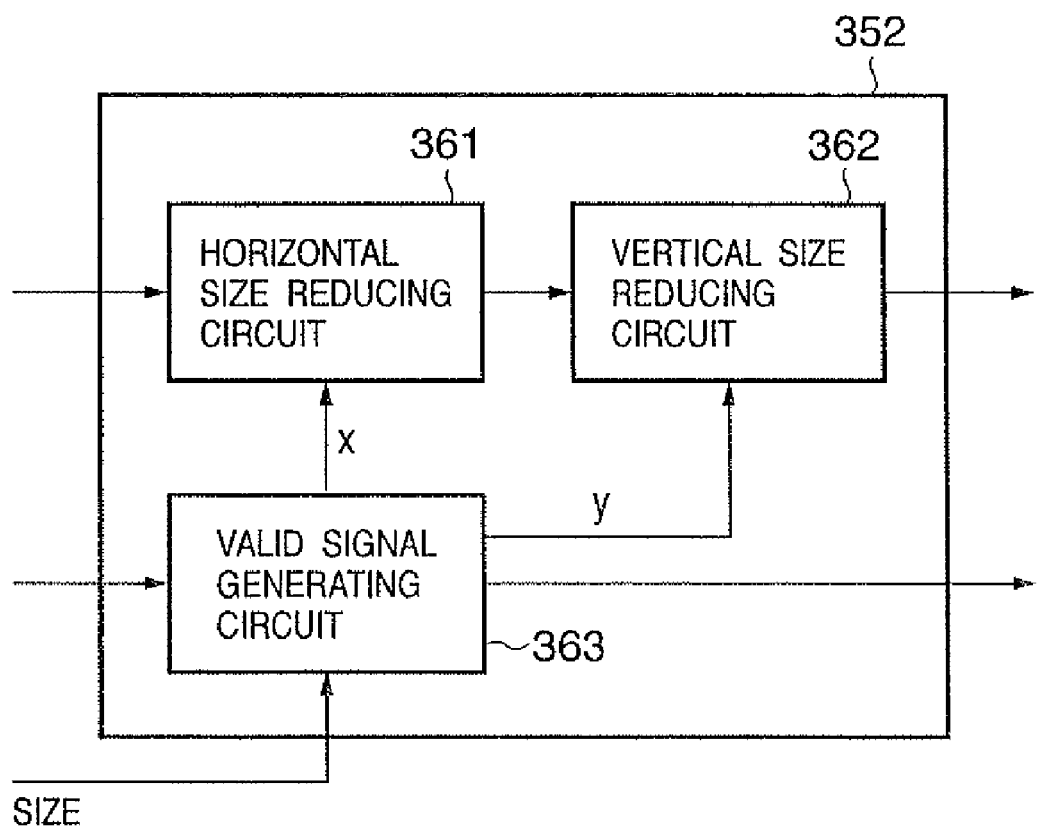
FIG. 35 is a block diagram showing the detailed arrangement of an MCU reducing circuit 352.

The MCU reducing circuit 352 reduces an MCU size in the valid range to a predetermined size. FIG. 35 is a block diagram showing the detailed arrangement of the MCU reducing circuit 352. As shown in FIG. 35, the MCU reducing circuit 352 is comprised of two reducing circuits, i.e., a horizontal size reducing circuit 361 and vertical size reducing circuit 362, and a valid signal generating circuit 363.

The valid signal generating circuit 363 increments the internal horizontal and vertical counters in accordance with the input valid signal Crip_Valid. With these two counters, a pixel position in a block is grasped. In this embodiment, since the block size is 8×8 pixels, both the horizontal and vertical counters are 3-bit counters, and the vertical counter is incremented by a carry of the horizontal counter. A value x from the horizontal counter is supplied to the horizontal size reducing circuit 361. A value y from the vertical counter is supplied to the vertical size reducing circuit 362. Each value is used to select an interpolation coefficient. The values x and y from the horizontal and vertical counters are input to a valid signal table and converted into valid signals. The valid signal table has an 8-bit output for each reduction size, and selects one bit in accordance with the value of each counter. In this case, for the sake of descriptive convenience, a table configuration is used. As will be described later, however, a valid signal may be directly generated from a counter value. The generated vertical and horizontal valid signals are ANDed in accordance with the timing of the valid signal Crip_Valid, and the resultant signal is output as an MCU reducing circuit valid signal Resize_Valid.

Figure 36:
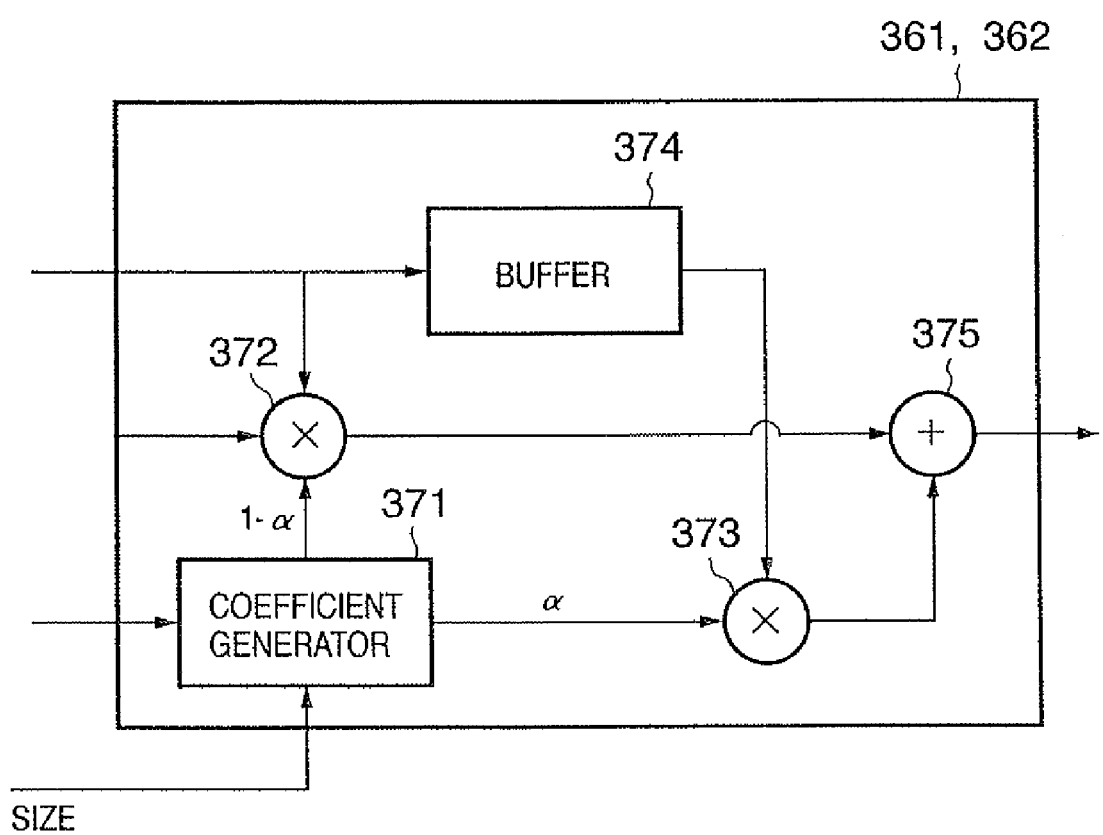
FIG. 36 is a block diagram showing the detailed arrangement of a horizontal size reducing circuit 361 or vertical size reducing circuit 362.

FIG. 36 is a block diagram showing the detailed arrangement of the horizontal size reducing circuit 361 or vertical size reducing circuit 362. The horizontal and vertical size reducing circuits differ in the delay amounts of buffers 374. The delay amount in the horizontal size reducing circuit corresponds to one pixel, whereas that in the vertical size reducing circuit corresponds to one line (eight pixels). In this case, the value of an interpolation point is obtained by linear interpolation from the positions of adjacent pixels and an interpolation pixel. If, for example, a sampling point after reduction is located between pixels A and B, and the ratio of the distance from the sampling point to the pixel B to the distance from the sampling point to the pixel A is α: (1−α), a value P of the interpolation point is given by $$P = \alpha A + (1-\alpha)B \qquad (2)$$

FIG. 37 is a view showing in detail sampling points after MCU reduction. The points indicated by the circles represent points after reduction.

Referring to 37A indicates a case wherein image data is reduced to 7×7 pixels; 37B indicates a case wherein the image data is reduced to 6×6 pixels; 37C indicates a case wherein the image data is reduced to 5×5 pixels; 37D indicates a case wherein the image data is reduced to 4×4 pixels; 37E indicates a case wherein the image data is reduced to 3×3 pixels; and 37F indicates a case wherein the image data is reduced to 2×2 pixels. Note that when the image data is reduced to 1×1 pixel, the pixel position coincides with (x, y)=(3, 3) of the image data before reduction. As is obvious from FIG. 37, eight pixels are cyclically repeated in the vertical and horizontal directions. That is, reduction is completed within each block. Assume that in order to remove aliasing noise, the JPEG decoding circuit 350 performs an inverse DCT after removing high-frequency components that will become aliasing noise by operating the Q table, and when image data is reduced to 1×1 pixel, 2×2 pixels, and 4×4 pixels, data at each corresponding position is output without interpolation. The numbers enclosed with the circles in FIG. 37 indicate valid timings.

FIG. 29 shows interpolation coefficients (converted into integers upon being multiplied by 256) at the respective sampling points shown in FIG. 37. In this case, α=256 indicates a case wherein a sampling point after reduction coincides with the position of an input pixel. In this case, the input pixel data is output without interpolation. As described above, since the interpolation circuits for the horizontal size reducing circuit and vertical size reducing circuit are identical, interpolation coefficients are also identical. In the vertical size reducing circuit 362, therefore, x in FIG. 29 is replaced with y.

Note that each cell in FIG. 29 in which the background is formed from dots indicates invalid data. A valid signal is set at "L" (invalid) at the timing of this data. Therefore, an interpolation coefficient can be set to any value. In order to simplify the circuit, therefore, an interpolation coefficient for invalid data is also prescribed. For example, the occurrence order of all coefficients is reversed ($\alpha$ and $(1-\alpha)$ are also interchanged) when $x \geq 4$. In addition, identical coefficients are set when a size W after reduction is 6 and 3. If, for example, W=7, a coefficient table is set to (255, 219, 183, 146, 110, 73, 37, 0). In this case, $\alpha$ may be read out from the left, whereas $(1-\alpha)$ may be read out from the right. Note that in order to reduce the number of bits of the coefficient table, when the coefficient is 255, input data is directly output without any interpolation (through mode).

In addition, when the size W after reduction is the square of two, no coefficient is required because the through mode is set in all operations. In addition, $(1-\alpha)$ is a two's complement of $\alpha$, and hence may be generated from a bit inversion of $\alpha+1$. In this case, for example, when W=7, the coefficient table may include only four coefficients, i.e., (0, 37, 73, 110). In this case, $\alpha$ is generated from a bit inversion of $(1-\alpha)+1$, and when $x \geq 4$, a value read out in the reverse order is set to $\alpha$, and a bit inversion+1 of the read value is set to $(1-\alpha)$.

Note that invalid data is set when x=7 (or y=7) to compensate for the delay caused by the buffer 374. In general, a latency (delay) corresponding to one pixel occurs in the horizontal size reducing circuit, and a latency corresponding to eight pixels occurs in the vertical size reducing circuit. For this reason, an interpolation output is output from the MCU reducing circuit 352 with a latency (delay) corresponding to nine pixels, and an input valid signal and a valid signal for horizontal size reduction must be ANDed in accordance with the timing of a valid signal for vertical size reduction. By setting invalid data when x=7 (or y=7) in the above manner, the internal operation timing can be synchronized with the input valid signal, thereby eliminating the necessity of the above timing adjustment. When, however, outputs from the above horizontal and vertical size reducing circuits are to be latched, a latency corresponding to two pixels must be compensated for. In addition, data for x=0 (or y=0) is not used if possible. This is because, since distortion due to the reduction of high-frequency components of DCT greatly affects a peripheral portion, the influences of the distortion are reduced by avoiding the use of pixels in the peripheral portion.

Valid signals for the above reducing circuits can be easily generated.

When W=1, a valid signal is set at "H" for x=3.

When W 2, a valid signal is set at "H" for lower two bits of x=01.

When W=3, a valid signal is set at "H" for x=1, 4, 6.

When W=4, a valid signal is set at "H" for LSB of x=0.

When W=5, a valid signal is set at "H" for x other than x=(2, 5, 7).

When W=6, a valid signal is set at "H" for x other than x=(3, 7).

When W=7, a valid signal is set at "H" for x other than x=(7).

If a valid signal is always set at "L" for x=7, this processing can be further simplified. For example, no determination is required when W=7, and W=6 may be an inversion of W=1. In addition, W=5 is an inversion of the sum of W=3 and 1. Since 2 and 5 (1 and 6 when W=3) have a relationship of one's complement, determination may be made by EXORing the MSB and lower two bits of x.

As described above, the block buffer 374 executes intra-block rotation and pixel sequential processing. According to JPEG, the pixel size of an MCU becomes maximum when the sampling mode is 4:2:0. At this time, six blocks, i.e., four blocks (Y0, Y1, Y2, Y3) of luminance signals and each of blocks (Cr, Cb) of color difference signals, are sequentially input as MCUs from the JPEG decoding circuit 350 on an 8×8 pixel block basis. The buffer 374 incorporates three block buffers (Y block buffer, Cr block buffer, and Cb block buffer), and the respective buffers are formed from different RAMs (since the Cr and Cb block buffers can share addresses, they may be formed on a single RAM by separately storing data in higher- and lower-order bit positions in a data bus).

The intra-block rotating circuit 353 increments the internal write horizontal counter, vertical counter, and block counter in accordance with the input valid signal Resize_Valid. The intra-block rotating circuit 353 grasps a pixel position in a block through the vertical and horizontal counters, and grasps a block position through the block counter. In this embodiment, since the maximum block size is 8×8 pixels, both the horizontal and vertical counters are 3-bit counters. If the size is changed by the MCU reducing circuit 352, the horizontal and vertical counters become counters corresponding to the size. If the size after reduction is represented by W, a carry is generated when the counter is W−1, and the counter returns to 0 (base-W counter). Note that the vertical counter is incremented in accordance with a carry of the horizontal counter. Since the maximum number of Y blocks in an MCU is four, the block counter becomes a 2-bit counter and is incremented in accordance with the AND of a carry of the horizontal counter and a carry of the vertical counter.

If the values of the write horizontal counter, vertical counter, and block counter are respectively represented by Xw, Yw, and Bw, a write address for the Y block buffer is (Bw, Yw, Xw) (in this case, "," indicates bit coupling). Likewise, a write address for the Cr block buffer and Cb block buffer is (Yw, Xw).

Figure 38:
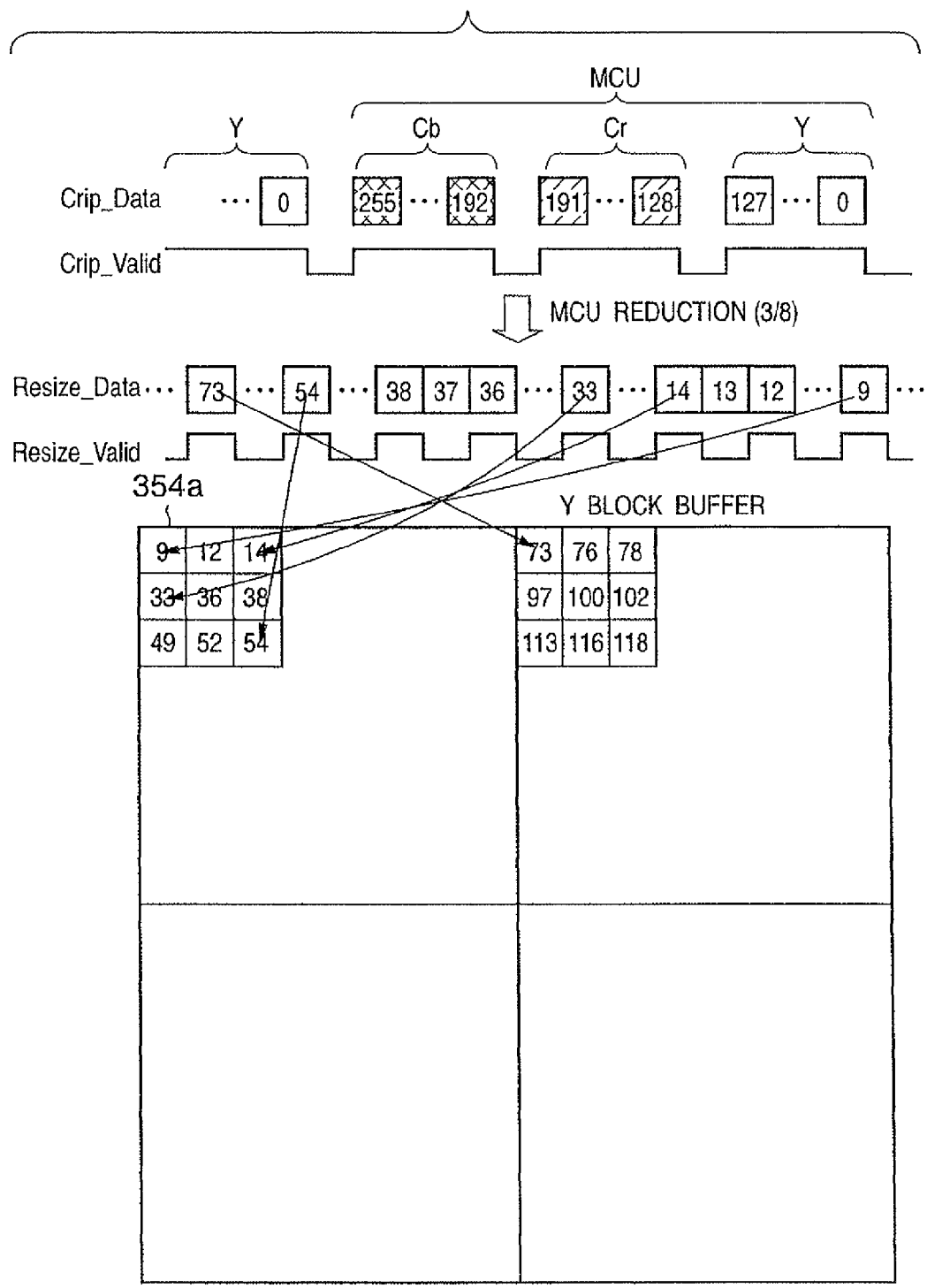
FIG. 38 is a view showing how luminance signal data in the detailed example shown in FIG. 34 is stored in a Y block buffer.

FIG. 38 is a view showing how luminance signal data in the detailed example shown in FIG. 34 are stored in the Y block buffer. Note that the number in each rectangle indicates the storage timing. In this embodiment, even if data has undergone MCU reduction, the data is stored an 8×8 pixel (before reduction) basis without permutation. With this operation, an address at the time of storage becomes independent of the rotation mode to facilitate address generation (in the address generator, only control of Y, Cr, and Cb block sequences and carry control based on the size W after reduction are required).

Figure 39:
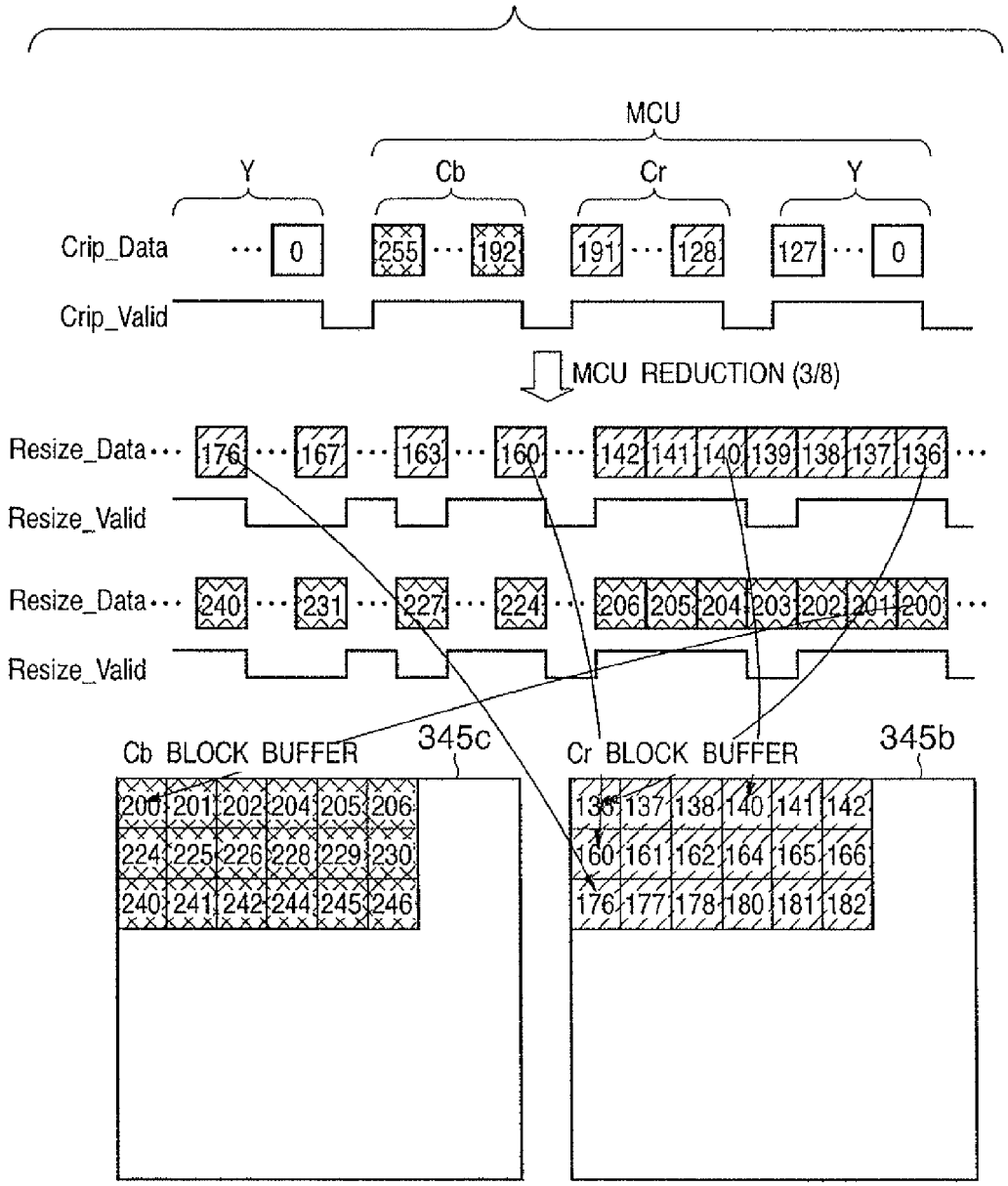
FIG. 39 is a view showing how color difference signal data in the detailed example shown in FIG. 34 are stored in Cr and Cb block buffers.

FIG. 39 is a view showing how the color difference data in the detailed example shown in FIG. 34 are stored in the Cr and Cb block buffers (they may be formed on a single memory). Note that the number in each rectangle represents the storage timing. As shown in FIG. 39, in this embodiment, when data is reduced to ½ or less (W≦4) by MCU reduction, the pixel size after reduction in the sub-sampling direction is doubled. That is, if the pixel size after reduction of a luminance signal is represented by W, the size after reduction of pixel data in the sub-sampling direction becomes 2W. With this arrangement, a deterioration in the resolution of color difference signals due to reduction is minimized.

In read operation, addresses are generated by a read horizontal counter, vertical counter, and block counter. The arrangements of the above counters vary depending on the sampling mode and rotation mode. In this case, in order to cope with each sampling mode, a horizontal counter, vertical counter, and block counter for a Y block buffer are constituted by three bits, four bits, and one bit, respectively, and a horizontal counter and vertical counter for a C (common to Cr and Cb) block buffer are constituted by four bits and three bits, respectively.

In the case of the Y block buffer counters, in the 4:4:4 mode, both the horizontal and vertical counters operate as base-W up/down counters (three bits). In the 4:2:2 mode, the horizontal counter operates as a base-W up/down counter, and the vertical counter operates as a base-2W up/down counter (0°, 180°) or a base-W up/down counter+1-bit block counter (90°, 270°). In the 4:2:0 mode, the horizontal counter operates as a base-W up/down counter, the vertical counter operates as a base-2W up/down counter+1-bit block counter. The above counter configurations are switched by a carry (borrow) generating method. Note that the initial value in down count operation is W−1 (base-W) or 2W−1 (base-2W).

Figure 40:
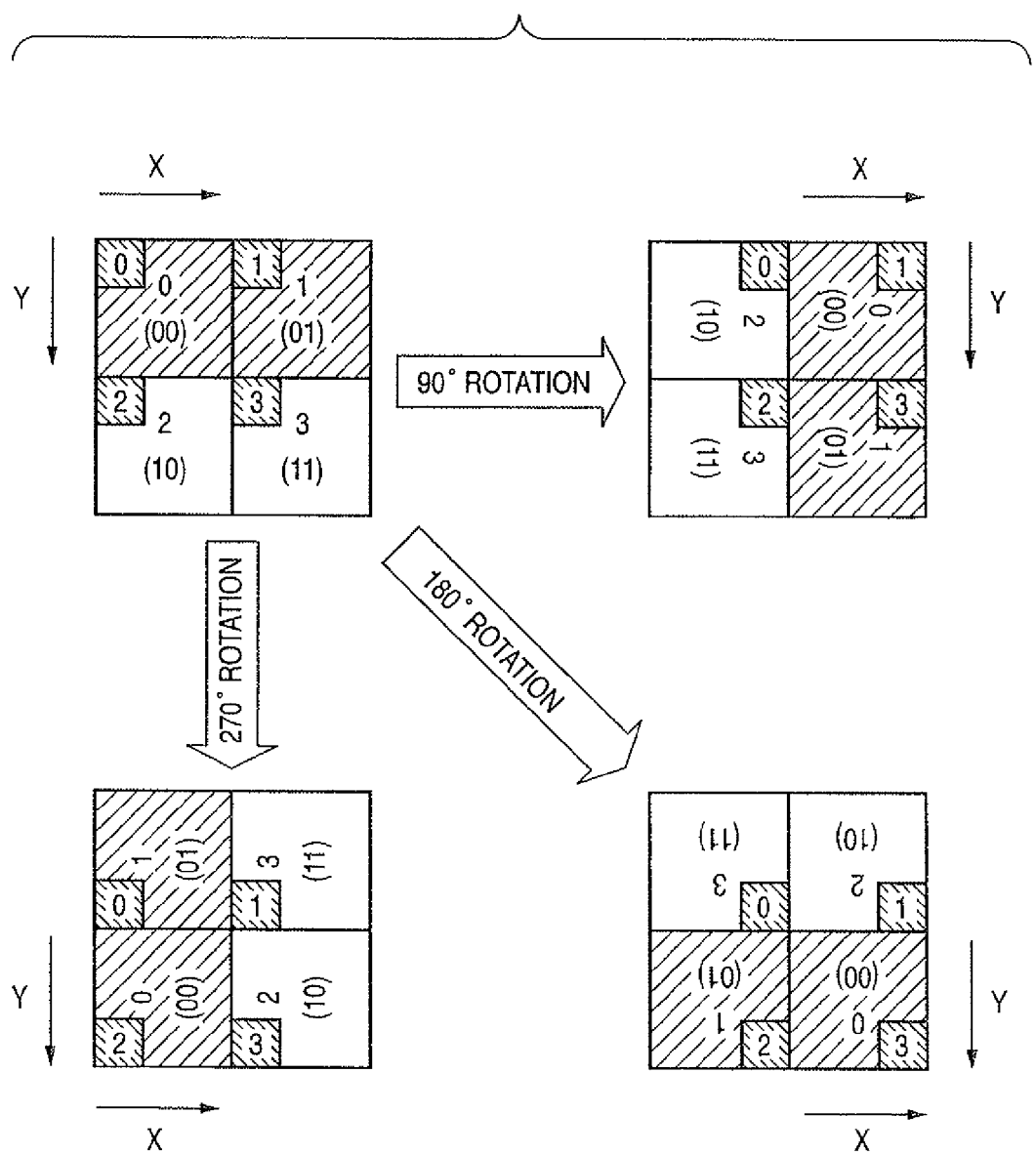
FIG. 40 is a view showing the relationship between a rotation mode and a read position in the Y block buffer.

FIG. 40 is a view showing the relationship between the rotation mode and the read position in the Y block buffer. Referring to FIG. 40, each rectangle indicates an 8×8 pixel block, the numbers in the respective rectangles indicate the input order of the blocks, and the small rectangles indicate block positions after reduction. In addition, each arrow indicates the direction in which data is read out. The blocks indicated by the dots indicate target blocks in the 4:2:2 mode.

Letting Xr be the value of the read horizontal counter for the Y block buffer, Yr (or Yr') be the value of the vertical counter, Br be the value of the block counter, Xcr (or Xcr') be the value of the read horizontal counter for the C (Cr, Cb) block buffer, and Ycr (or Ycr') be the value of the vertical counter, read addresses for the respective block buffers are given by the following expressions from FIG. 40. Note that in the following expressions, "," represents bit coupling, and "!" represents a down count.

(1) In sampling mode=4:4:4 (common to Y, Cr, and Cb)
    for 0°: Yr, Xr
    for 90°: !Xr, Yr
    for 180°: !Yr, !Xr
    for 270°: Xr, !Yr (2) In sampling mode=4:2:2
    [Y block address] (Yr' is base-2W)
    for 0°: Yr'[0], Yr'[3..1], Xr
    for 90°: Br, !Xr, Yr
    for 180°: !Yr'[0], !Yr'[3..1], !Xr
    for 270°: !Br, Xr, !Yr
    [Cr, Cb block address] (when W>4, Xcr' and Ycr' are base-2W)
    for 0°: Ycr, Xcr'[3..1]
    for 90°: !Xcr, Ycr'[3..1]
    for 180°: !Ycr, !Ycr'[3..1]
    for 270°: Xcr, !Ycr'[3..1]
    [Cr, Cb block address] (when W≦4, Xcr' and Ycr' are base-2W)
    for 0°: Ycr, Xcr'
    for 90°: !Xcr, Ycr'
    for 180°: !Ycr, !Xcr'
    for 270°: Xcr, !Ycr'

(3) In sampling mode=4:2:0
    [Y block address] (Yr' is base-2W)
    for 0°: Br, Yr'[0], Yr'[3..1], Xr
    for 90°: !Yr'[0], Br, !Xr, Yr'[3..1]
    for 180°: !Br, !Yr'[0], !Yr'[3..1], !Xr
    for 270°: Yr'[0], !Br, Xr, !Yr[3..1]
    [Cr, Cb block address] (when W>4, Xcr' and Ycr' are base-2W)
    for 0°: Ycr'[3..1], Xcr'[3..1]
    for 90°: !Xcr'[3..1], Ycr'[3..1]
    for 180°: !Ycr'[3..1], !Xcr'[3..1]
    for 270°: Xcr'[3..1], !Ycr'[3..1]
    [Cr, Cb block address] (when W≦4, Xcr' and Ycr' are base-2W)
    for 0°: Ycr'[3..1], Xcr'
    for 90°: !Xcr'[3..1], Ycr'
    for 180°: !Ycr'[3..1], !Xcr'
    for 270°: Xcr'[3..1], Ycr'

Note that arbitrary portrait and landscape mirror images can be obtained by reversing the function (up count and down count) of a predetermined counter of the above counters.

In addition, a counter can be shared among the respective block buffers by operating a valid signal. In this case, the read horizontal counter, vertical counter, and block counter may be 3-bit, 4-bit, and 1-bit binary counters, respectively, and read addresses for the Y block buffer are obtained as follows:
    for 0°: Br, Yr[0], Yr[3..1], Xr
    for 90°: !Yr[0], Br, !Xr, Yr[3..1]
    for 180°: !Br, !Yr[0], !Yr[3..1], !Xr
    for 270°: Yr[0], !Br, Xr, !Yr[3..1]
Assume that "," indicates bit coupling, and "!" indicates a bit inversion (ditto).

Read addresses for the C (Cr, Cb) block buffer are given as follows:
    In the 4:2:2 mode with W>4,
    for 0°: Yr[3..1], Yr[0], Xr[2..1]
    for 90°: !Yr[0], !Xr[2..1], Yr[3..1]
    for 180°: !Yr[3..1], !Yr[0], !Xr[2..1]
    for 270°: Yr[0], Xr[2..1], !Yr[3..1]
    In the 4:2:0 mode with W>4,
    for 0°: Br, Yr[3..2], Yr[0], Xr[2..1]
    for 90°: !Yr[0], !Xr[2..1], Br, Yr[3..2]
    for 180°: !Br, !Yr[3..2], !Yr[0], !Xr[2..1]
    for 270°: Yr[0], Xr[2..1], !Br, !Yr[3..2]
    In the 4:2:2 mode with W≦4,
    for 0°: Yr[3..1], Yr[0], Xr[1..0]
    for 90°: !Xr, Br, Yr[2..1]
    for 180°: !Yr[3..1], !Yr[0], !Xr[1..0]
    for 270°: Xr, !Br, !Yr[2..1]
    In the 4:2:0 mode with W≦4,
    for 0°: Br, Yr[2..1], Yr[0], Xr[1..0]
    for 90°: !Yr[0], !Xr[1..0], Br, Yr[2..1]
    for 180°: !Br, !Yr[2..1], !Yr[0], Xr[1..0]
    for 270°: Yr[0], Xr[1..0], !Br, !Yr[2..1]

In addition, a mirror image in the horizontal direction can be output by only reversing the addresses in the horizontal direction (the X direction in FIG. 40), and a mirror image in the vertical direction can be output by only reversing the addresses in the vertical direction (Y direction in FIG. 40).

In this case, the valid signal is validated under the following conditions:
    for 0°: Xr<W and Yr<W
    for 90°: Xr<W and Yr<W
    for 180°: !Xr< and !Yr<W
    for 270°: Xr<W and !Yr<W In addition, in order to reduce the number of invalid blocks read out in the 4:2:2 mode, read addresses for the Y block buffer may be set as follows:
    for 0°: 0, Yr[0], Yr[3..1], Xr
    for 90°: 0, Yr[3], !Xr, Yr[2..0]
    for 180°: 0, !Yr[0], !Yr[3..1], !Xr
    for 270°: 0, !Yr[3], Xr, !Yr[2..0]

In addition, when W>4, read addresses for the C (Cr, Cb) block buffer may be set as follows:
for 0°: Yr[3..1], Yr[0], Xr[2..1]
for 90°: !Xr, Yr[3..1]
for 180°: !Yr[3..1], !Yr[0], !Xr[2..1]
for 270°: Xr, !Yr[3..1]
Furthermore, when W≧4, read addresses for the C (Cr, Cb) block buffer may be set as follows:
for 0°: Yr[3..1], Yr[0], Xr[1..0]
for 90°: !Xr, Yr[3], Yr[1..0]
for 180°: !Yr[3..1], !Yr[0], !Xr[1..0]
for 270°: Xr, !Yr[3], !Yr[1..0]
In this case, only the shaded blocks in FIG. 40 are read out.

Figure 41:
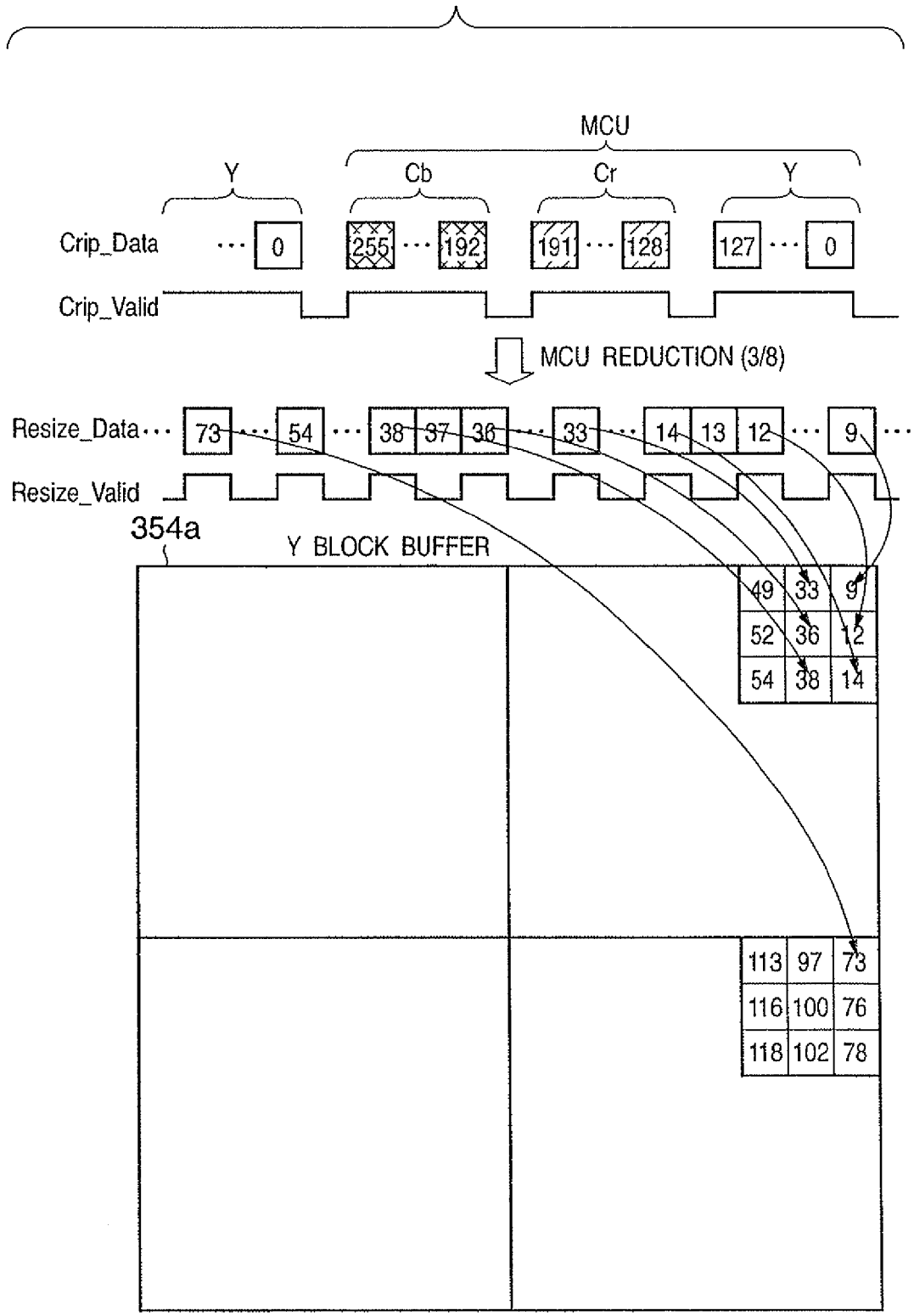
FIG. 41 is a view showing how luminance signal data having undergone intra-block rotation in the write mode is stored in the Y block buffer.
Figure 42:
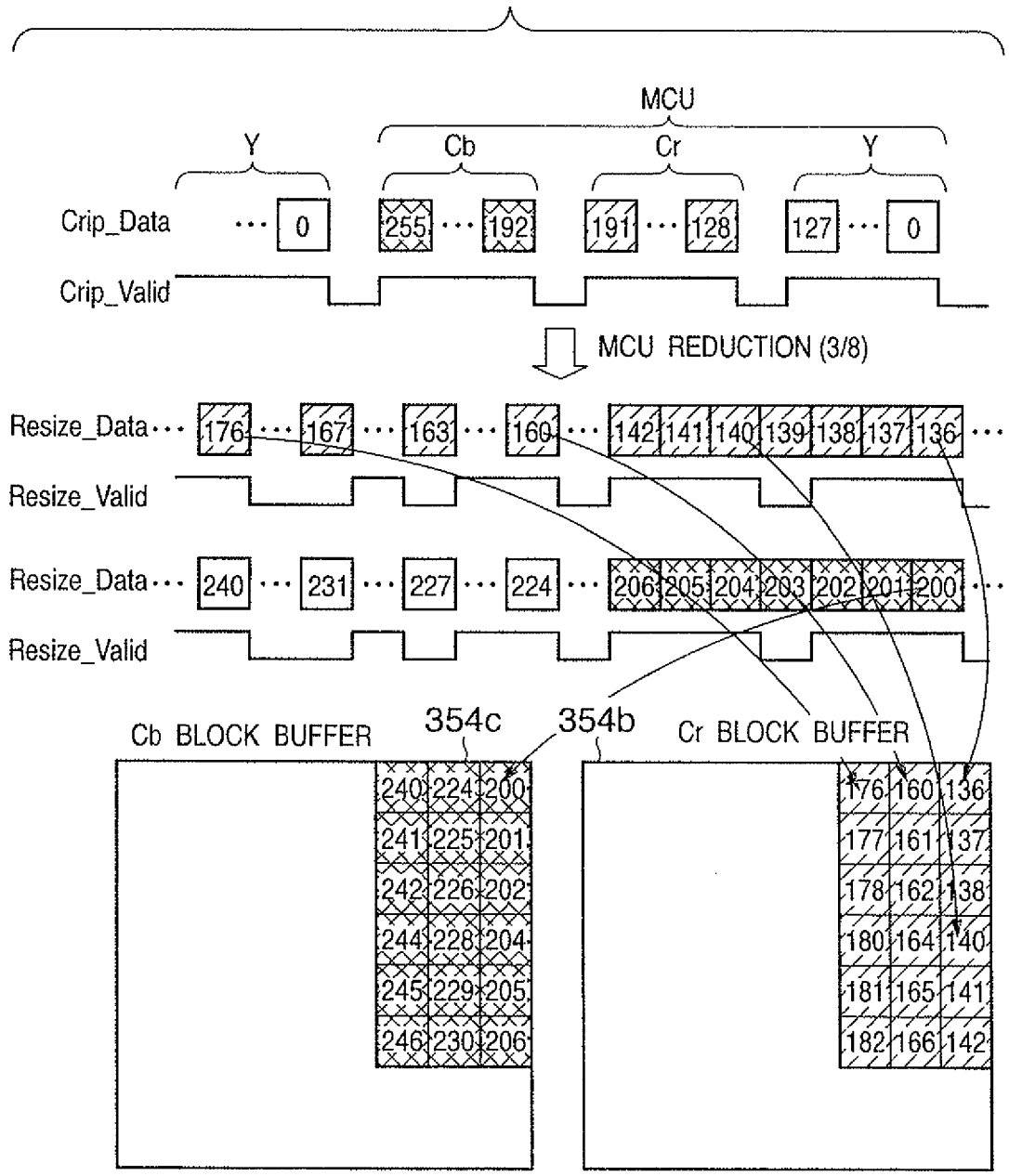
FIG. 42 is a view showing how color difference signal data having undergone intra-block rotation in the write mode are stored in the Cr and Cb block buffers.

In this embodiment, intra-block rotation is performed in read operation of the block buffer. However, as shown in FIGS. 41 and 42, data may be stored at positions after intra-block rotation in data write operation of the block buffer. FIG. 41 is a view showing how luminance signal data are stored in the Y block buffer when intra-block rotation is done in write operation. FIG. 42 is a view showing how color difference signal data are stored in the Cr and Cb block buffers when intra-block rotation is done in write operation.

In this embodiment, since data can be identified on an 8×8 pixel basis in read operation, clipping can be done on an 8×8 pixel basis. In this case, clipping is performed in three stages, i.e., on an MCU basis, DCT block (3×8 pixel) basis, and pixel basis. Alternatively, clipping may be performed in two stages, i.e., on a DCT block (8×8 pixel) basis and pixel basis, by omitting clipping on an MCU basis.

The YCrCb pixel sequential data is converted into RGB data by the RGB conversion circuit 356 and stored in the page buffer 357.

The data is stored in the RGB conversion circuit 356 on an MCU basis.

The start address of an MCU can be generated by a horizontal MCU counter and vertical MCU counter as in the case of the above intra-block permutation. In this case, however, a complicated multiplication is required, and address generation is complicated. For this reason, a storage address in the page buffer is generated by a method of obtaining the address of the next pixel by adding a difference address to the address of the current pixel (to be referred to as a "difference addressing method" hereinafter). Letting A(n−1) be the address of the immediately preceding pixel, and D be a difference address, an address A(n) of the current pixel is given by $$A(n)=A(n-1)+D \quad (3)$$

The difference address D changes in the following sequence depending on the rotation and sampling mode. Let D1 be a difference address at an MCU line end (the last pixel of the rightmost MCU), Dm be a difference address at an MCU end (the last pixel of the MCU) other than the MCU line end, and Db be the difference address at the intra-block line end (the rightmost pixel in the MCU) other than the MCU end. In addition, let x be the value of a horizontal counter in an MCU, y be the value of a vertical counter in the MCU, Mx be the value of a horizontal MCU counter, My be the value of a vertical MCU counter, Wx×Wy be the MCU size after rotation, Wm be the number of MCUs in the horizontal direction, and Hm be the number of MCUs in the vertical direction. The following are the switching timings of the respective difference addresses:

D=D1: x=Wx−1, y=Wy−1, and z=m−1
D=Dm: x=Wx−1, y=Wy−1, and z≠m−1
D=Db: x=Wx−1 and y≠Wy−1
D=1: other than those above In this case, z=Mx and m=Wm: 0 and 180° rotations
z=My and m=Hm: 90° and 270° rotations
In addition, letting As be the start address of the page buffer, each difference address and an initial value A(0) of an address are given as follows:
Db=Wm×Wx−Wx+1: common to each rotation mode
[0° Rotation]
A(0)=As
D1=1
Dm=−Wm×Wx×(Wy−1)+1
[90° Rotation]
A(0)=As+(Wm−1)×Wx
D1=−Wm×Wx×(Hm×Wy−1)−2Wx+1
Dm=Wm×Wx−Wx+1
[180° Rotation]
A(0)=As+Wm×Wx×(Hm−1)×Wy+(Wm−1)×Wx
D1=−Wm×Wx×(2Wy−1)+(Wm−2)×Wx+1
Dm=−Wm×Wx×(Wy−1)−2Wx+1
[270° Rotation]
A(0)=As+Wm×Wx×(Hm−1)×Wy
D1=Wm×Wx×((Hm−2)×Wy+1)+1
Dm=−Wm×Wx×(2Wy−1)−Wx+1

In the case shown in FIG. 34, for example, the original image is reduced to 101×151 MCU image by the MCU clipping circuit 351. The MCU reducing circuit 352 then reduces a 16×8 pixel MCU into a 6×3 pixel MCU. The intra-block rotating circuit 353 rotates the image through 90° and outputs the resultant image data. Therefore, the MCU size after MCU reduction/rotation becomes 3×6. That is, Wx=3, Wy=6, Wm=151, and Hm=101. If the start address of the page buffer is set to As=0, A(0)=450, D1=−274070, and Dm=Db=451. The horizontal counter x in an MCU is a base-3 counter, and the vertical counter y in the MCU counts up in accordance with a carry of this counter. The vertical counter y in the MCU is a base-6 counter, and an MCU counter My counts up in accordance with a carry of this counter. The MCU counter My is a base-101 counter, which counts up from 0 to 100 and returns to 0. Note that no horizontal MCU counter is required.

The difference address D switches to 451 once every three times, and to −274070 once every 1818 times (101×6×3 times), like 1, 1, 451, 1, 1, 451, . . . , 1, 1, −274070, . . . . That is, the difference address switches in synchronism with a carry of the above counter.

As described above, the above parameters Wx, Wy, Wm, and Hm are determined by the rotation mode, the MCU size after MCU reduction/rotation, the numbers of MCUs of an image in the vertical and horizontal directions, and the configurations of the horizontal counter in an MCU, the vertical counter in the MCU, and the MCU counter are determined. In addition, the above difference addresses D1, Dm, and Db are uniquely determined by the above parameters and remain constant unless the parameters change. An address can therefore be generated without any complicated computation by storing the difference addresses D1, Dm, and Db and the initial value A(0) of an address in a register. As described above, in general, D=1 (addresses continuous in the direction in which they increase), the utilization ratio of the memory can be increased by burst write.

Since image data is stored in the page buffer 357 in a rotated state, the data are sequentially (consecutively) read out from the page buffer 357, starting from the start address As of the page buffer, regardless of the mode. The pixel clipping circuit 358 clips pixels of the read image data which are not clipped by the MCU clipping circuit 351. The resizing circuit 359 converts the image into an image having a desired size. The resultant image data is output from the output unit to the print engine. In the case shown in FIG. 34, image data having a size of 453×606 pixels is stored in the page buffer. This image is clipped into an image with 450×600 pixels (3/8 the image with 1,200×1,600 pixels) defining a user set area. The image is then enlarged into an image with 480×640 pixels corresponding to an output image size (16/15 times). The resultant image data is output from the output unit 303.

In this embodiment, the MCU reducing circuit 352 reduces an image to a size near a target size. In the case shown in FIG. 34, since 1,200×1,600 pixels are to be reduced to 480×640 pixels, the reduction ratio is 480/1200=0.4. This value is closest to 3/8 (=0.375) in reduction ratios set in increments of 1/8 (=0.125). The MCU reducing circuit 352 therefore reduces the image to 3/8, and the subsequent resizing circuit 359 enlarges the image by 16/15 times, thereby realizing 3/8×16/15=0.4.

In the above case wherein an image signal is output in accordance with a sync signal from the print engine, if reduction of 1/2 or less is executed at once, sampling points after reduction come apart from each other, pixels used for interpolation are read out discontinuously. If, therefore, a page buffer is formed on a DRAM, the utilization ratio of the memory decreases. In this embodiment, for a reduction ratio of 1/16 or more, the reduction ratio in the resizing circuit 359 becomes 1/2 or more. This allows continuous read operation (if a line memory is provided for the resizing circuit 359, such operation can be realized by only reading out image data from the start). That is, the continuity of memory accesses improves, and the memory utilization ratio increases. In addition, this embodiment is configured to perform an inverse DCT after removing high-frequency components which become aliasing noise by operating the Q table of the JPEG decoding circuit 350. This eliminates the necessity of a prefilter for removing aliasing noise. In addition, at a reduction ratio of 1/2 or less, interpolation is performed by the double reduction ratio at sub-sampling color difference signals. This makes it possible to suppress a deterioration in the solution of the color difference signals.

According to the above description, permutation is done by using the page buffer. However, the present invention is not limited to this. Permutation may be done by using the band buffer (part of the page buffer).

As has been described above, according to the present invention, a range necessary for processing is designated with respect to image data on a predetermined block basis, and image processing is executed for only the necessary range. In the subsequent image processing step, more detailed image processing is performed. Therefore, the image processing speed for overall image data can be increased, and the memory required for image processing can be reduced. In addition, this makes it possible to improve the continuity of memory accesses and increase the memory utilization ratio.

Other Embodiment

In each embodiment described above, if each sub-module is implemented by a thread, and each module is implemented by a process (task), similar functions can be implemented by software.

It is therefore easily understood that the object of the present invention is realized even by supplying a storage medium storing software program codes for realizing the functions of the above embodiments to a system or apparatus, and causing the computer (or a CPU or an MPU) of the system or apparatus to read out and execute the program codes stored in the storage medium. In this case, the program codes read out from the storage medium realize the functions of the above embodiments by themselves, and the storage medium storing the program codes constitutes the present invention.

As a storage medium for supplying the program codes, for example, a flexible disk, hard disk, optical disk, magnetooptical disk, CD-ROM, CD-R, magnetic tape, nonvolatile memory cards ROM, or the like can be used.

The functions of the above embodiments are realized not only when the readout program codes are executed by the computer but also when the OS running on the computer performs part or all of actual processing on the basis of the instructions of the program codes.

The functions of the above embodiments are also realized when the program codes read out from the storage medium are written in the memory of a function extension board inserted into the computer or a function extension unit connected to the computer, and the CPU of the function extension board or function extension unit performs part or all of actual processing on the basis of the instructions of the program codes.

Obviously, the present invention can be applied to a case wherein programs are distributed from the storage medium, which stores the program codes of the software for implementing the functions of the above embodiments, to requesters through communication lines such as PC communication lines.

As has described above, according to the present invention, by making I/F for data processing modules (processors) versatile, data processing modules can be easily added/modified on a module basis in accordance with processing contents.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:
   block decoding means for decoding block-coded data into image data;
   block image processing means for performing image processing for the decoded image data on a processing block basis in block coding;
   conversion means for rasterizing the image data subjected to image processing on the processing block basis; and
   pixel image processing means for executing the image processing executed by the block image processing means on a pixel basis by using the rasterized image data,
   wherein image processing to be executed for input image data is performed in two stages including said block image processing means and said pixel image processing means.

2. An image processing method comprising:
   a block decoding step of decoding block-coded data into image data;
   a block image processing step of performing image processing for the decoded image data on a processing block basis in block coding;
   a conversion step of rasterizing the image data subjected to image processing on the processing block basis; and
   a pixel image processing step of executing the image processing executed by the block image processing step on a pixel basis by using the rasterized image data,
   wherein an image processing to be executed for input image data is performed in two stages including the block image processing step and the pixel image processing step.

3. A computer-readable memory medium on which is stored a computer-executable program for causing a computer to execute:
- a block decoding step of decoding block-coded data into image data;
- a block image processing step of performing image processing for the decoded image data on a processing block basis in block coding;
- a conversion step of rasterizing the image data subjected to image processing on the processing block basis; and
- a pixel image processing step of executing image processing executed by the block image processing step on a pixel basis by using the rasterized image data, wherein
- an image processing to be executed for input image data is performed in two stages including the block image processing step and the pixel image processing step.

* * * * *